US011226721B2

(12) United States Patent
Ristow et al.

(10) Patent No.: US 11,226,721 B2
(45) Date of Patent: Jan. 18, 2022

(54) MEASURING AND VISUALIZING FACILITY PERFORMANCE

(71) Applicant: Lineage Logistics, LLC, Irvine, CA (US)

(72) Inventors: Eric Ristow, San Francisco, CA (US); Mandar Prabhu Gaunker, Irvine, CA (US)

(73) Assignee: Lineage Logistics, LLC, Irvine, CA (US)

( * ) Notice: Subject to any disclaimer, the term of this patent is extended or adjusted under 35 U.S.C. 154(b) by 0 days.

(21) Appl. No.: 16/452,324

(22) Filed: Jun. 25, 2019

(65) Prior Publication Data

US 2019/0391707 A1 Dec. 26, 2019

Related U.S. Application Data

(60) Provisional application No. 62/689,520, filed on Jun. 25, 2018.

(51) Int. Cl.
| | |
|---|---|
| *G06F 3/048* | (2013.01) |
| *G06F 3/0482* | (2013.01) |
| *G06F 3/0484* | (2013.01) |
| *G06F 21/31* | (2013.01) |
| *G06T 11/00* | (2006.01) |
| *G06T 11/20* | (2006.01) |

(52) U.S. Cl.
CPC ........ *G06F 3/0482* (2013.01); *G06F 3/04845* (2013.01); *G06F 21/31* (2013.01); *G06T 11/001* (2013.01); *G06T 11/206* (2013.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 9,218,676 | B2 * | 12/2015 | Brugler | ................. G06T 11/001 |
| 10,320,633 | B1 * | 6/2019 | Wong | ...................... H04L 67/02 |
| 10,379,987 | B1 * | 8/2019 | Chari | .................. G06F 11/3495 |
| 10,812,335 | B2 * | 10/2020 | Tabak | ................. H04L 41/0893 |
| 10,846,783 | B2 * | 11/2020 | Aide | .................. G06Q 30/0633 |

(Continued)

OTHER PUBLICATIONS

International Search Report & Written Opinion in International Application No. PCT/US2019/039066 dated Aug. 2, 2019, 15 pages.

*Primary Examiner* — Hua Lu
(74) *Attorney, Agent, or Firm* — Fish & Richardson P.C.

(57) ABSTRACT

The subject matter of this specification generally relates to measuring the performance of facilities and generating user interfaces that present the performance. In one aspect, a method includes detecting, at a user interface of an application and based on data received from a device on which the application is executing, a first selection of a particular facility. In response to detecting the first selection, data that causes presentation of a dashboard user interface that includes a summary of information for the particular facility is provided. The summary includes a composite score for the particular facility that is computed based on multiple metrics for the particular facility and a value for each metric. In response to detecting a second selection of one or the metrics at the dashboard user interface, data that causes presentation of a second user interface that includes a detailed view of the one metric is provided.

18 Claims, 33 Drawing Sheets

(56) References Cited

U.S. PATENT DOCUMENTS

| | | | | |
|---|---|---|---|---|
| 11,033,455 B2* | 6/2021 | Freeman | | A61B 5/0006 |
| 2008/0059292 A1* | 3/2008 | Myers | | G06Q 50/10 |
| | | | | 705/7.39 |
| 2009/0063193 A1* | 3/2009 | Barton | | A61N 1/37282 |
| | | | | 705/3 |
| 2009/0076845 A1* | 3/2009 | Bellin | | G16H 40/20 |
| | | | | 705/2 |
| 2009/0228330 A1* | 9/2009 | Karras | | G16H 40/63 |
| | | | | 705/7.41 |
| 2010/0017231 A1* | 1/2010 | Galbraith | | G16H 50/20 |
| | | | | 705/3 |
| 2011/0061013 A1* | 3/2011 | Bilicki | | G06Q 10/06393 |
| | | | | 715/771 |
| 2011/0161854 A1* | 6/2011 | Shukla | | G16H 10/60 |
| | | | | 715/771 |
| 2012/0117476 A1* | 5/2012 | Siegrist | | G16H 40/20 |
| | | | | 715/733 |
| 2012/0278134 A1* | 11/2012 | Papay | | G06Q 10/06375 |
| | | | | 705/7.37 |
| 2014/0033176 A1* | 1/2014 | Rama | | G06F 11/008 |
| | | | | 717/124 |
| 2014/0143025 A1* | 5/2014 | Fish | | G06Q 30/0282 |
| | | | | 705/7.42 |
| 2015/0113422 A1* | 4/2015 | Pfeiffer | | G16H 10/60 |
| | | | | 715/739 |
| 2015/0379429 A1* | 12/2015 | Lee | | G06N 20/00 |
| | | | | 706/11 |
| 2016/0044170 A1* | 2/2016 | Porter | | H04M 3/2218 |
| | | | | 379/265.03 |
| 2016/0112341 A1* | 4/2016 | Lui | | H04L 43/0817 |
| | | | | 709/226 |
| 2016/0335262 A1* | 11/2016 | Tedjamulia | | G06F 16/24578 |
| 2016/0378932 A1* | 12/2016 | Sperling | | G06Q 40/08 |
| | | | | 705/3 |
| 2017/0053080 A1* | 2/2017 | Geppert | | G16H 40/20 |
| 2017/0083585 A1* | 3/2017 | Chen | | G06F 11/323 |
| 2018/0174060 A1* | 6/2018 | Velez-Rojas | | H04W 4/02 |
| 2018/0200142 A1* | 7/2018 | Freeman | | A61H 31/007 |
| 2018/0366021 A1* | 12/2018 | Zertuche | | G06F 40/20 |
| 2020/0104337 A1* | 4/2020 | Kelly | | G06F 16/906 |

\* cited by examiner

MEASURING AND VISUALIZING FACILITY PERFORMANCE

CROSS REFERENCE TO RELATED APPLICATIONS

This application claims the benefit under 35 U.S.C. § 119(e) of the filing date of U.S. Patent Application No. 62/689,520, filed Jun. 25, 2018, entitled "MEASURING AND VISUALIZING FACILITY PERFORMANCE," the entire contents of which are hereby incorporated by reference.

BACKGROUND

Vast amounts of data can be collected for organizations and facilities of the organization. As each facility may collect different data or collect the data in different ways, it can be difficult to organize the data and present the data in a way that allows users to quickly assess the relative performance of each facility or to compare data across multiple facilities.

SUMMARY

This specification describes systems, methods, devices, and techniques for generating user interfaces that present performance metrics and other data for facilities.

In general, one innovative aspect of the subject matter described in this specification can be implemented in methods that include detecting, at a user interface of an application and based on data received from a device on which the application is executing, a first selection of a particular facility from a list of facilities. In response to detecting the first selection, data that causes presentation, at the application, of a dashboard user interface that includes a summary of information for the particular facility is provided to the device. The summary of information includes a (i) composite score for the particular facility that is computed based on multiple metrics for the particular facility and (ii) a value for each of the multiple metrics. A second selection of one or the multiple metrics is detected at the dashboard user interface based on data received from the device. In response to detecting the second selection data that causes presentation of a second user interface that includes a detailed view of the one metric is provided to the device. Other implementations of this aspect include corresponding apparatus, methods, systems, and computer programs, configured to perform the actions of the methods, encoded on computer storage devices.

These and other implementations can optionally include one or more of the following features. Aspects can include determining the composite score for the particular facility in response to detecting the first selection. The composite score can be based on a combination of two or more of: an incident rate for the particular facility, the incident rate indicating a rate of injuries or sicknesses of workers at the particular facility; a performance indicator for the particular facility, the performance indicator being indicative of operating performance for the particular facility; a turnover indicator for the particular facility, the turnover indicator being indicative of employee turnover for the particular facility; a labor indicator for the particular facility, the labor indicator being indicative of labor cost relative to revenue for the particular facility; an overtime indicator for the particular facility the overtime indicator being indicative of an amount of employee overtime for the particular facility; or a compliance indicator for the particular facility that is based on one or more of a safety compliance indicator, a food safety compliance indicator or a process safety score.

In some aspects, the performance indicator represents earnings before interest, taxes, depreciation, and amortization for the particular facility. Some aspects can include receiving data specifying a command to view a third user interface that presents different data for the particular facility; generating the third user interface, including populating a user interface element with the composite score for the facility and adjusting a color of the composite score or a background of the user interface element based on a value of the composite score; and providing, to the client device, data that causes the client device to present the third user interface.

In some aspects, adjusting a color of the composite score or a background of the user interface element based on a value of the composite score can include comparing the value of the composite score to two or more score ranges that each have a respective color; determining, based on the comparing, that the value of the composite score is within a particular score range of the two or more score ranges; and in response to determining that the value of the composite score is within the particular score range; adjusting the color to match the respective color for the particular score range.

Some aspects can include identifying a user associated with the client device; identifying data that the user is not eligible to view; and preventing the application from presenting the data that the user is not eligible to view or links to user interfaces that present the data that the user is not eligible to view.

In some aspects, the composite score is based on a combination of all of: (i) the incident rate for the particular facility, (ii) the performance indicator for the particular facility, (iii) the turnover indicator for the particular facility, (iv) the labor indicator for the particular facility, and (v) the overtime indicator for the particular facility. The combination can be a weighted combination.

Particular embodiments of the subject matter described in this specification can be implemented so as to realize one or more of the following advantages. User interfaces described herein allow users to quickly view relative performance of multiple facilities that may have different data collection and data reporting techniques. By determining and presenting a composite score for each facility that is based on a combination of performance metrics, users can compare relative performance and other data between different facilities. The composite score can incorporate different metrics as business needs change and can also be presented differently based on the value of the composite score allowing users to even more quickly determine how a facility is performing and compare the performance to other facilities. For example, rendering the composite score in a different color based on a range of a values in which the composite score falls can allow users to quickly view the number of facilities that have the same color and therefore similar overall performance.

Data that may be presented on multiple user interfaces and/or data that is more likely to be viewed by a user can be cached to reduce latency in presenting the data. For example, composite scores for each facility can be determined and cached for quick retrieval. Data that is used to determine the composite scores can be periodically obtained from each facility so that the data does not have to be queried from each facility in response to a user requesting the composite score for a facility, e.g., by requesting a user interface that presents the composite score for the facility.

This further reduces latency that would otherwise be caused by network communications between a data management system and the facilities to obtain the data prior to determining the composite score.

Various features and advantages of the foregoing subject matter is described below with respect to the figures. Additional features and advantages are apparent from the subject matter described herein and the claims.

DETAILED DESCRIPTION

In general, systems and techniques described herein can organize data for multiple facilities and generate user interfaces that present data for the facilities. For example, a system can aggregate and manage data for cold storage facilities that are used to distribute products that must remain below a specified temperature. Each facility can store products, e.g., for customers, and maintain the products at their respective temperatures until the products are ready to be delivered to another destination. As products are regularly being moved in and out of these facilities, it can be important to monitor certain metrics, such as the utilization of each facility's capacity, the accuracy of the inventory at each facility, and the overall performance of the facilities.

The user interfaces can present data related to each of the cold storage facilities and can act as a single source metrics package that provides indications of whether the facilities are meeting performance standards. In this way, employees can quickly determine how the facilities are performing and identify areas for improvement. The user interfaces can be part of a mobile application (e.g., a native application), web pages of a web site, and/or other types of applications that maintain facility data and generate user interfaces that present the data in a meaningful way. The user interfaces can also provide information as to the nature of the business and the operations in general, e.g., what percentage of the outbound volume is case pick, what the customer mix is, operation size, etc.

The system can determine, for each facility, a composite score that represents the overall performance of the facility, e.g., over a given time period. The composite score for a facility can be based on a combination of multiple different metrics, each of which can be based on data obtained from the facility. For example, the composite score for a facility can be based on two or more of an incident rate for the facility, a performance indicator for the facility, a turnover indicator for the facility, a labor indicator for the facility, an overtime indicator for the facility, and/or other appropriate metrics.

Figure 1:
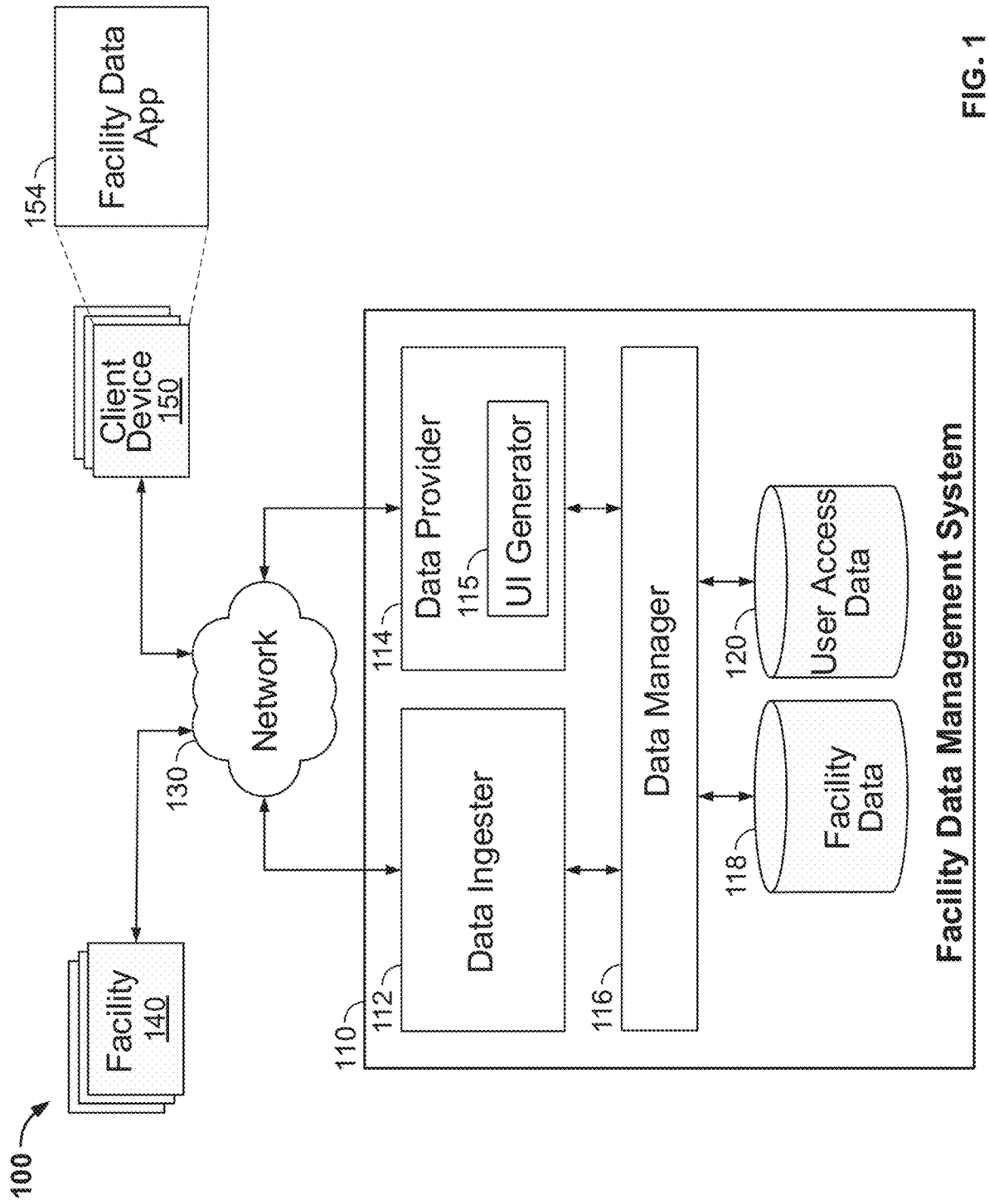
FIG. 1 is an example environment in which a facility data management system aggregates and provides facility data for presentation at client devices.

FIG. 1 is an example environment 100 in which a facility data management system 110 aggregates, organizes, and provides facility data for presentation at client devices 150. The facility data management system 110 includes a data ingester 112 that receives data from multiple facilities 140 over a data communication network 130. The network 130 can include a local area network (LAN), a wide area network (WAN), a mobile network, the Internet, or a combination thereof. The data ingester 112 can include one or more servers that receive the data from the facilities 140.

The facilities 140 can include distribution centers, storage facilities (e.g., warehouses), manufacturing facilities, retail facilities, and/or other types of facilities. In a particular example, the facilities 140 include cold storage facilities for storing products that must be stored at specified temperatures, e.g., cold foods. Each facility 140 can include one or more computers that provide data to the data ingester 112, e.g., periodically based on a specified time period, in response to requests received from the data ingester 112 and/or in response to a user command. For example, the data ingester 112 may periodically request data from each facility 140 so that the data can be more quickly provided to the client devices 150.

The computer(s) at each facility 140 can obtain the data from one or more sensors (e.g., inventory sensors), databases (e.g., labor, financial, and/or safety incident databases), and/or other data sources. Each facility 140 can provide, to the data ingester 112, data related to the operations of the facility 140, labor performed at the facility 140, financial data for the facility 140, and/or other appropriate data for the facility 140.

The facility data management system 110 also includes a data manager 116. The data manager 116 can aggregate, organize, and/or normalize the data for the facilities 140 and store the data in a facility data storage unit 118 that includes one or more data storage devices, e.g., hard drives, flash memory, etc. The data manager 116 can store the data with a reference to the facility from which the data was received (e.g., with a reference to a facility identifier for the facility) and/or with references to other relevant data, such as a time for the data, one or more people associated with the data (e.g., a supervisor responsible for certain data), a customer associated with the data (e.g., a customer identifier for certain inventory, etc.). In this way, the data can be filtered based on time, supervisor, etc.

The data manager 116 can also determine (e.g., compute) various metrics for each facility 140, for groups of facilities 140, and/or aggregate metrics for all facilities combined. For example, the data manager 116 can determine a composite score for each facility and/or for groups of facilities. The composite score for a facility represents the overall performance of the facility. The data manager 116 can determine the composite score for a facility for one or more time periods, e.g., weekly, monthly, yearly, and/or since data for the composite score has been collected, using metrics for the one or more time periods.

The composite score for a facility 140 can be based on a combination of multiple different metrics, which can be based on data obtained from the facility 140 and stored in the facility data storage unit 118. For example, the composite score for a facility 140 can be based on two or more of an incident rate for the facility 140, a performance indicator for the facility 140, a turnover indicator for the facility 140, a labor indicator for the facility 140, an overtime indicator for the facility 140, and/or other appropriate metrics.

The incident rate for a facility 140 indicates a rate of injuries, claims, and/or other reportable incidents at the facility 140. The incident rate can be based on a number of recordable incidents and the number of labor hours at the facility 140. In some implementations, the incident rate is an industry standard incident rate, such as the Total Incident Rate used by the Occupational Safety and Health Administration (OSHA). For example, the data manager 116 can determine the incident rate for a facility 140 by multiplying the number of recordable cases during the time period by 200,000 and dividing by the number of labor hours worked during the time period, as used by OSHA to determine the Total Incident Rate. In this example, if the facility 140 has 50 incidents (e.g., OSHA reportable incidents) over the previous twelve months and there were a total of 2,000,000 hours worked at the facility over the previous twelve months, the incident rate would be 5 (i.e., 50*200,000/2,000,000). This example incident rate represents the incident rate per 100 employees. The data manager 116 can obtain the number of reportable incidents and the number of labor hours from the facility 140, e.g., from a labor database of the facility 140.

The performance indicator for a facility 140 indicates the operating performance for the facility. The performance indicator can be based on the facility's earnings before interest, tax, depreciation, and amortization (EBITDA) over a time period. The data manager 116 can obtain this earnings data from the facility 140, e.g., from a financial database of the facility 140.

The turnover indicator for a facility 140 indicates employee turnover for the facility 140. The turnover indicator can be based on (e.g., equal to or proportional to) a number of employee separations (i.e., number of employees that no longer work at the facility) over a time period divided by an average number of employee at the facility during the time period. For example, the data manager 116 can determine, for each facility 140, the turnover rate for a previous twelve-month period, e.g., the trailing twelve months (TTM), and/or for the year to date. In this example, if 50 employees quit working for the facility 140 during the previous twelve months and the average number of employees for the facility 140 over the previous twelve months was 100, the turnover indicator would be 0.5 or 50% (i.e., 50/100). The data manager 116 can obtain the number of employee separations and the average number of employees at the facility 140, e.g., from an employee database of the facility 140.

The labor indicator for a facility 140 indicates a labor cost for the facility 140 relative to revenue for the facility 140. The labor indicator can be based on (e.g., equal to or proportional to) a ratio between a cost of labor over a time period and an amount of revenue over the time period. For example, if the cost of labor for the facility 140 over the time period is $10,000 and the revenue for the facility 140 over the time period is $20,000, the labor indicator for the facility 140 over the time period would be 0.5 or 50% (i.e., $10,000/$20,000). The data manager 116 computes a total labor indicator using the total cost of labor for the facility 140 (e.g., excluding benefit costs) and the total revenue for the facility 140. The data manager 116 can also computer an activity-based labor indicator based on the revenue generated from activities that require product to be handled relative to direct labor for the facility 140.

The overtime indicator for a facility 140 indicates an amount on employee overtime for the facility. The overtime indicator can be based on (e.g., equal to or proportional to) a number of overtime hours worked at the facility divided by a number of regular hours worked at the facility 140. For example, if the number of overtime hours for a month at the facility 140 was 2,000 and the number of regular hours for the month at the facility was 20,000, the overtime indicator would be 0.1 or 10% (i.e., 2,000/20,000). In another example, the overtime indicator can be based on an amount spent on overtime, e.g., a number of dollars spent on overtime at the facility or a number of hours of overtime at the facility.

The data manager 116 can compute a composite score for the facility 140 using a combination of metrics. The combination of metrics can change, e.g., as the business needs change. The composite score can be the same for each facility or vary from facility to facility.

In some implementations, the composite score for a facility 140 is based on a normalized value for each of (i) an incident rate for the facility 140, (ii) a performance indicator for the facility 140, (iii) a turnover indicator for the facility 140, (iv) a labor indicator (e.g., the total labor indicator) for the facility 140, and (v) an overtime indicator for the facility 140. The normalized value for each metric can be based on where the actual value for the metric falls with respect to a range of values for the metric. For example, the range of values can include a target value for the metric and a subpar value for the metric. If the actual value of the metric is equal to or better than the target value, the normalized value for the metric may be 100%. If the actual value of the metric is equal to or worse than the subpar value, the normalized value for the metric may be 0%. If the actual value for the metric is between the subpar value and the target value, the normalized value can be between 0% and 100% based on where the actual value falls in the range of values between the subpar value and the target value. For example, the normalized value may increase linearly with an improvement (e.g., increase in the performance indicator or decrease in turnover indicator) in the metric from the subpar value to the target value.

In some implementations, the composite score for the facility 140 can be based on a safety compliance score, the performance measure for the facility 140, the labor indicator (e.g., the total labor indicator) for the facility 140, and the turnover indicator for the facility 140. In this example, the turnover indicator can be based on customized targets for the facility 140.

In some implementations, the normalized value for each metric is weighted. For example, the normalized value for the incident indicator may have a higher weight, and therefore greater effect on the composite score, than the overtime indicator. To determine the composite score for a facility 140, the data manager 116 can determine each normalized value and multiple each normalized value by its respective weight. An example of how a composite score is determined for a facility is described below with reference to FIG. 2.

The data manager 116 can store the composite score for each facility 140 in a cache at the facility data management system 110 and/or at a cache at the client devices 150. As described below, the composite score can be presented in many different user interfaces and may be requested often by client devices 150. By predetermining the composite scores for the facilities and storing the composite scores in a cache, the facility data management system 110 can provide the composite scores for presentation at the client devices 150 much quicker than if the data manager 116 was required to obtain the data from the facilities 140, compute the composite scores, and then send the composite scores to the client devices 150. The reduced latency can allow the client device 150 to present user interfaces more quickly, allow for smooth transitions between user interfaces, and reduce the number of errors caused by the client devices 150 waiting for data.

In some implementations, the data manager 116 also computes, for employees of the facility 140, a bonus indicator that projects the employee's bonus. For example, the bonus can be based on a combination of the performance of the employee and the performance of the facility 140. The data manager 116 can determine the bonus indicator based on the year-to-date (or other time period) performance of the employee and the year-to-date (or other time period) performance of the facility 140.

The data management system 110 includes a data provider 114 that provides data and/or user interfaces for the facilities 140 to the client devices 150. The data can be presented in various user interfaces that may be generated by a user interface generator 115 of the data provider 114 or by the client device 150. The user interfaces can be interactive web pages presented in web browsers or user interfaces of a facility data application 154 executing on the client devices 150. For example, the user interface generator 115 can generate interactive web pages that present the facility data and provide the web pages to the client devices 150. In another example, the facility data application 154 can be a software application that can run on multiple different types of devices or a native application developed for a particular type of device or particular platform. In this example, the data provider 114 can provide to the client devices 150 facility data that can be presented in user interfaces of the facility data application 154. Example user interfaces that present facility data are illustrated in FIGS. 2-20 and described below.

The user interface generator 115 can adjust the user interfaces based on the client device on which the user interfaces will be displayed. For example, the user interface generator 115 can remove some data or portions of the user interfaces when the user interfaces will be displayed on mobile devices that have small screens, such as smartphones and tablets.

The data manager 116 can control access to certain types of data and/or certain user interfaces based on the user or type of user requesting the data. For example, some users may not be allowed access to overall financial data for all facilities. Some users, such as facility managers, may have access to financial data for their facilities but not other facilities. Some employees may have access to any financial data, just the composite score.

The data manager 116 can store data specifying access rights for users and/or types of users in a user access data storage unit 120 that includes one or more data storage devices, e.g., hard drives, flash memory, etc. The data provider 114 can use the data to determine whether to provide certain data in response to requests for data. The data provider 114 can also use the data to generate user interfaces. For example, if a user is not eligible to view data that is to be presented on a particular user interface, the data provider 114 can prevent the data from being presented on the user interface. The data provider 114 can also hide, for a particular user, links to user interfaces to which the particular user does not have access.

Figure 2:
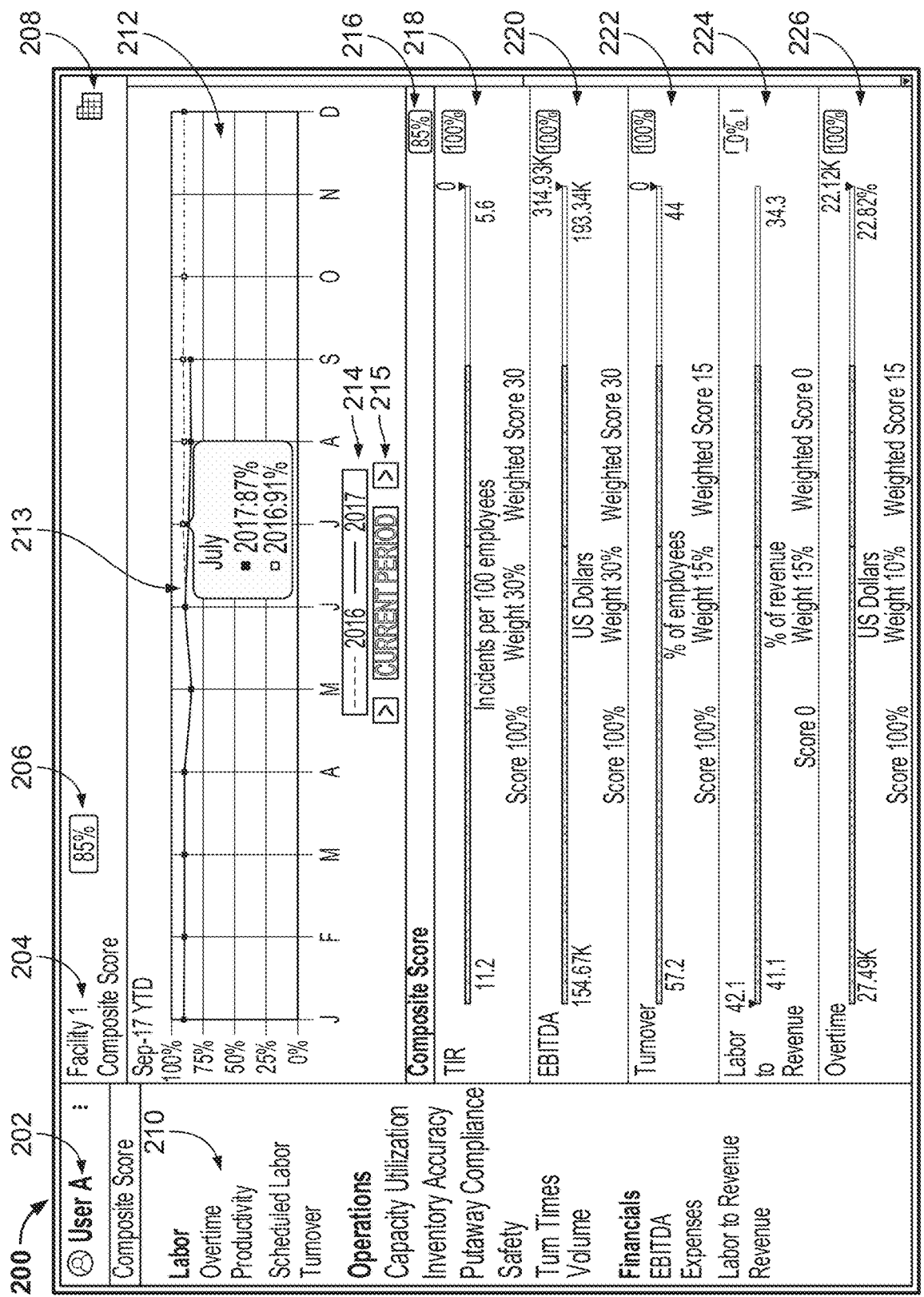
FIG. 2 depicts an example user interface in which data related to a composite score for a facility is presented.

FIG. 2 depicts an example composite score user interface 200 in which data related to a composite score for a facility is presented. The composite score user interface 200 includes a user login element 202 that displays the name of the user ("User A") that is logged into a facility data management system and that allows a user to log into the system, e.g., by selecting the three dots to the right of the user name. The composite score user interface 200 also includes a facility identifier 204 that identifies the name of the facility ("Facility 1") for which data is being presented.

The composite score user interface 200 includes two current composite score indicators 206 and 216 that present the current composite score for Facility 1. The current composite score can be for a current time period. In this example, the current composite score is the year-to-date value of the composite score as of a current month, i.e., September 2017. The composite score indicators 206 and 216 can vary based on the value of the current composite score. For example, the background color of the composite score indicators 206 and 216 can vary based on which range of values the value of the current composite score falls. In a particular example, the composite score can vary from 0-100%. The background color may be red if the current composite score is between 0-59.9%, yellow if the current composite score is between 60.0-79.9%, and green if the current composite score is 80.0-100.0%. Other values and value ranges can also be used. In addition, other ways of adjusting the composite score indicators 206 and 216 can be used to reflect the current composite score value, such as adjusting the color of the text used to present the current composite score, adjusting the font size, or highlighting particular value ranges (e.g., above 90% or below 50%).

As the current composite score for a facility is presented on multiple user interfaces, the current composite score can be predetermined and cached at the client device or in high speed memory at the facility management system. In this way, the composite score indicators 206 and 216, and those presented on other user interfaces, can be presented with reduced latency. Similarly, the color for the background of the composite score indicators 206 and 216 can be predetermined and cached so that the color can be presented with reduced latency.

The composite score user interface 200 also includes a user interface navigational element 210 that allows the user to navigate to other user interfaces that present other data related to Facility 1. User interaction with the user interface navigational element 210 can cause other user interfaces to be presented. For example, selection of "Overtime" within the user interface navigational element 210 can cause an overtime user interface to be presented. In this example, the client device presenting the composite score user interface 200 can detect the selection of "Overtime" and request the overtime user interface for Facility 1 from the facility data management system or request data from the facility data management system for the client device to use in generating the composite score user interface 200 at the client device. Once received, the client device can present the overtime user interface. An example overtime user interface is presented in FIG. 3 and described below.

Figure 3:
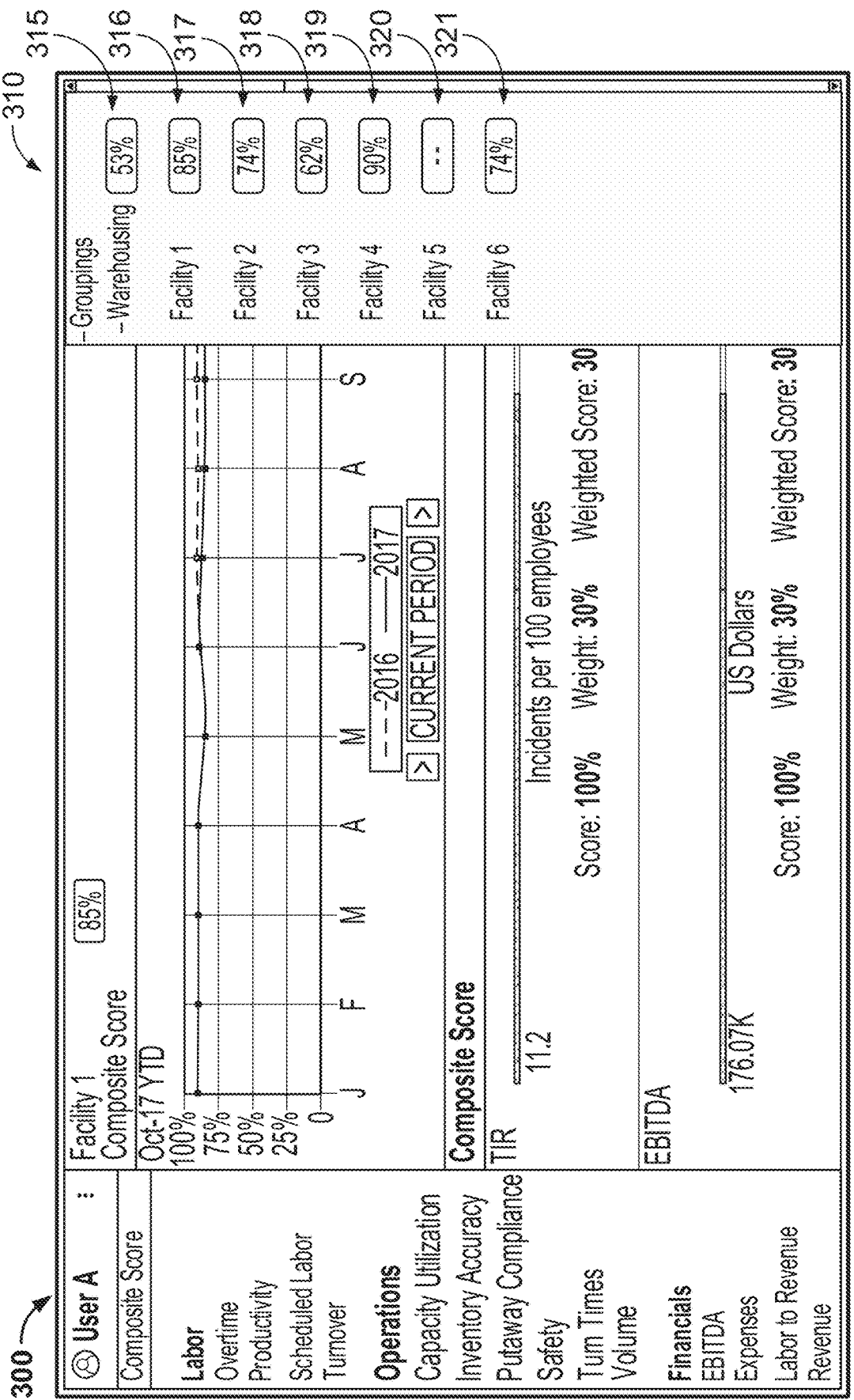
FIG. 3 depicts an example user interface in which a facility menu is presented.

The composite score user interface 200 also includes a facility icon 208 that allows a user to select another facility for which to view data. When selected, the client device can present a menu that allows the user to select one of the facilities. An example facility menu is shown in FIG. 3 and described below. In some implementations, the composite score user interface 200 is the default user interface for each facility. When a user selects the name of a facility from the facility menu (or another location at which the name of the facility is presented), the client device can present the composite score user interface 200 for the selected facility based on the composite score user interface 200 being the default user interface.

The composite score user interface 200 includes a graph 212 that shows the year-to-date value of the composite score for Facility 1 on a monthly basis for the years 2016 and 2017. In the graph 212, the solid line indicates the values for 2017 and the dashed line indicates the values for 2016. The graph 212 also includes a value element 213 that shows the value of the composite score for a particular month. In this example, the value element 213 shows the year-to-date value of the composite score for the month of July. The client device can display the value element 213 in response to detecting user interaction with the graph at the month of July. For example, the client device can display the value element 213 for July in response to the user hovering a pointer (e.g., a mouse cursor) over one of the lines at or near the value for the month of July or selecting one of the lines at the value for the month of July.

The graph 212 also includes a legend 214 that indicates that the solid line represents the values of the composite score for the year 2017 and the dashed line represents the values of the composite score for the year 2016.

The graph 212 also includes a time period selector element 215 that allows the user to change the time period for which composite score data is presented in the composite score user interface 200. If a user selects the left arrow of the time period selector element 215, the client device can update the graph 212 to present the composite scores for a previous year, e.g., the year prior to the year for which composite scores are currently being presented. Similarly, if the user selects the right arrow of the time period selector element 215, the client device can update the graph 212 to present composite scores for a later year, e.g., the year after the year for which composite scores are currently being presented. To update the graph 212, the client device can obtain the composite scores for the selected time period, e.g., from a cache at the client device or at the facility data management system, or from another type of data storage at the facility data management system. The client device can then update the lines in the graph 212 based on the composite scores for each month of the selected time period.

The composite score user interface 200 also presents the values of the metrics that are used to determine the composite score for Facility 1. In particular, the composite score user interface 200 includes an incident rate element 218 that presents the incident rate for Facility 1, a performance indicator element 220 that presents the performance indicator for Facility 1, a turnover indicator element 222 that presents the turnover rate for Facility 1, a labor indicator element 224 that presents the labor indicator for Facility 1, and an overtime indicator element 226 that presents the overtime indicator for Facility 1.

The incident rate element 218 presents the incident rate for Facility 1 on a line that represents a range of incident rates from a subpar value to a target value. In this example, the range of incident rates is from 11.2 incidents per 100 employees (subpar value on left side of the line) to 5.6 incidents per 100 employees (target value on right side of the line). The range of incident rates can be the same for each facility or the range can vary for different facilities as each facility may have a different target value and/or different subpar value.

The incident rate for the current time period is 0, as shown on the right side of the line. The incident rate can be determined by multiplying the number of recordable incidents for the current year by 200,000 and dividing by the number of labor hours worked at Facility 1 during the current year.

The normalized value for the incident rate that is used to determine the composite score for Facility 1 can be based on where along the range from 5.6-11.2 the current value of the incident rate falls. As the current incident rate is 0 and therefore better than the target incident rate, the normalized value for the incident rate is 100% as shown in the box on the right side of the incident rate element 218. If the current incident rate was 11.2 or greater, the normalized value would be 100%. The normalized value can range from 0% for an incident rate of 11.2 or greater to a value of 100% for an incident rate of 5.6 or less. For example, the normalized value can increase linearly from a value of 0% for an incident rate of 11.2 to a value of 100% for an incident rate of 5.6 as the current incident rate decreases from 11.2 to 5.6. In this example, the normalized value for the incident rate would be 50% for an incident rate of 8.4 incidents per 100 employees (value at the middle of the line) during the current time period.

The incident rate element 218 also presents the weight given to the normalized value for the incident rate in determining the composite score for Facility 1. In this example, the weight for the normalized value for the incident rate is 30%. The weight is used to determine a weighted score that is then used to determine the composite score. For example, the weighted score for the incident rate can be the product of the normalized value for the incident rate and the weight. In this example, the weighted value for the incident rate is 30% (30%*100%). To determine the composite score for Facility 1, the weighted score for each metric can be summed, as described below.

The performance indicator element 220 presents the performance indicator for Facility 1 on a line that represents a range of performance values from a subpar value to a target value. In this example, the performance indicator is the EBITDA for Facility 1 and the range of performance values is from 154.67K to 193.34K. This range represents the target and subpar values for the year-to-date total EBITDA for the current month, i.e., September 2017. As the year-to-date EBITDA is generally expected to increase (or at least change) each month, the target and subpar values vary based on the month. Thus, if the current month was August rather than September, the subpar and target values may be lower based on the expected year-to-date value of EBITDA in September.

The range of performance value can be the same for each facility or the range can vary for different facilities. For example, larger facilities may have a higher expected performance than smaller facilities.

The performance indicator for the current time period is 314.93K, as shown on the right side of the line. As the current value of the performance indicator is better than the target performance indicator, the normalized value for the performance indicator is 100% as shown in the box on the right side of the performance indicator element 220. Similar to the incident rate, the normalized value for the performance indicator can range from 0% for a performance indicator of 154.67K or less to a value of 100% for a performance indicator of 193.23K or more. For example, the normalized value can increase linearly from a value of 0% for performance indicator of 154.67K to a value of 100% for performance indicator of 193.23K as the current value of the performance indicator increases from 154.67K to 193.23K. In this example, the normalized value for the performance indicator would be 50% for an EBITDA of 174.01K (value at the middle of the line).

The performance indicator element 220 also presents the weight given to the normalized value for the performance indicator in determining the composite score for Facility 1. In this example, the weight for the normalized value for the performance indicator is 30%. The weight is used to determine a weighted score that is then used to determine the composite score. For example, the weighted score for the performance indicator can be the product of the normalized value for the performance indicator and the weight. In this example, the weighted value for the performance indicator is 30% (30%*100%).

The turnover indicator element 222 presents the turnover indicator for Facility 1 on a line that represents a range of turnover values from a subpar value to a target value. In this example, the turnover indicator is a year-to-date turnover that is equal to a number of employee separations in the year 2017 divided by the average number of employees at Facility 1 during the year 2017 times 100. This represents the percentage of total employees at Facility 1 that left Facility 1 during the year 2017.

In this example, the range of values for the turnover indicator is from 57.2% (subpar value) to 44% (target value). The range of values for the turnover indicator can be the same for each facility or the range can vary for different facilities. For example, some facilities may have different employee retention targets than others.

The turnover indicator for the current time period is 0, as shown on the right side of the line. As the current value of the turnover indicator is better than the target turnover indicator, the normalized value for the turnover indicator is 100% as shown in the box on the right side of the turnover indicator element 222. Similar to the incident rate, the normalized value for the turnover indicator can range from 0% for a turnover indicator of 57.2% or more to a value of 100% for a turnover indicator of 44% or more. For example, the normalized value can increase linearly from a value of 0% for a turnover indicator of 57.2% to a value of 100% for a turnover indicator of 44% as the current value of the turnover indicator decreases from 57.2% to 44%. In this example, the normalized value for the turnover indicator would be 50% for a turnover indicator of 50.7% (value at the middle of the line).

The turnover indicator element 222 also presents the weight given to the normalized value for the turnover indicator in determining the composite score for Facility 1. In this example, the weight for the normalized value for the turnover indicator is 15%. The weight is used to determine a weighted score that is then used to determine the composite score. For example, the weighted score for the turnover indicator can be the product of the normalized value for the turnover indicator and the weight. In this example, the weighted value for the turnover indicator is 15% (15%*100%).

The labor indicator element 224 presents the labor indicator for Facility 1 on a line that represents a range of labor indicator values from a subpar value to a target value. In this example, the labor indicator is a year-to-date value that is equal to a ratio between a cost of labor for Facility 1 during the year 2017 and an amount of revenue for Facility 1 during the year 2017.

In this example, the range of values for the labor indicator is from 41.1% (subpar value) to 34.3% (target value). The range of values for the labor indicator can be the same for each facility or the range can vary for different facilities. For example, some facilities may have higher revenue costs relative to the amount of revenue than other facilities and therefore the target values may differ.

The labor indicator for the current time period is 42.1%, as shown on the left side of the line. As the current value of the labor indicator is worse than the subpar value for the labor indicator, the normalized value for the labor indicator is 0% as shown in the box on the right side of the labor indicator element 224. Similar to the incident rate, the normalized value for the labor indicator can range from 0% for a labor indicator of 41.1% or more to a value of 100% for a labor indicator of 34.3% or less. For example, the normalized value can increase linearly from a value of 0% for a labor indicator of 41.1% to a value of 100% for a labor indicator of 34.3% as the current value of the labor indicator decreases from 41.1% to 34.3%. In this example, the normalized value for the labor indicator would be 50% for a labor indicator of 37.7% (value at the middle of the line).

The labor indicator element 224 also presents the weight given to the normalized value for the labor indicator in determining the composite score for Facility 1. In this example, the weight for the normalized value for the labor indicator is 15%. The weight is used to determine a weighted score that is then used to determine the composite score. For example, the weighted score for the labor indicator can be the product of the normalized value for the labor indicator and the weight. In this example, the weighted value for the labor indicator is 0% (15%*0%).

The overtime indicator element 226 presents the overtime indicator for Facility 1 on a line that represents a range of overtime indicator values from a subpar value to a target value. In this example, the overtime indicator is a year-to-date amount spent on overtime at Facility 1. In other examples, the overtime indicator can be based on a ratio between a number of overtime hours worked at Facility 1 divided by a number of regular hours worked at Facility 1.

In this example, the range of values for the overtime indicator is from 27.49K (subpar value) to 22.12K (target value). The range of values for the overtime indicator can be the same for each facility or the range can vary for different facilities.

The overtime indicator for the current time period is 22.12K, as shown on the right side of the line. As the current value of the overtime indicator is better than the subpar value for the overtime indicator, the normalized value for the overtime indicator is 100%, as shown in the box on the right side of the overtime indicator element 226. Similar to the incident rate, the normalized value for the overtime indicator can range from 0% for an overtime indicator of 27.49K or more to a value of 100% for an overtime indicator of 22.12K or less. For example, the normalized value can increase linearly from a value of 0% for an overtime indicator of 27.49K to a value of 100% for an overtime indicator of 22.12K as the current value of the overtime indicator decreases from 27.49K to 22.12K. In this example, the normalized value for the overtime indicator would be 50% for a labor indicator of 24.81K (value at the middle of the line).

The overtime indicator element 226 also presents the weight given to the normalized value for the overtime indicator in determining the composite score for Facility 1. In this example, the weight for the normalized value for the overtime indicator is 10%. The weight is used to determine a weighted score that is then used to determine the composite score. For example, the weighted score for the overtime indicator can be the product of the normalized value for the overtime indicator and the weight. In this example, the weighted value for the overtime indicator is 10% (10%*100%).

The composite score for Facility 1 that is presented in the current composite score indicators 206 and 216 can be determined by determining the sum of the weighted score for each of the five metrics (i.e., the weighted score for the incident rate, weighted score for the performance indicator, the weighted score for the turnover indicator, the weighted score for the labor indicator, and the weighted score for the overtime indicator. In this example, the composite score is 85% (i.e., 30%+30%+15%+0%+10%).

The data presented in the elements 218-226 can be updated in response to time period selections using the time period selector element 215. For example, the client device can update the graph 212 and the elements 218-226 to present data for a newly selected time period in response to the selection. Some or all of the data for other time period may be cached at the client device, e.g., in response to the user selecting the composite score user interface 200. In this way, the data for other time periods can be presented with reduced latency in response to selections of other time periods using the time period selector element 215.

The color of the box that presents the normalized value and/or the color of the text used to present the normalized value for each metric can vary based on the normalized value. For example, if the normalized value is between 0-59%, the box may be red; if the normalized value is between 60-79%, the color may be yellow, and if the normalized value is 80-100%, the color may be green. In this way, a user can quickly assess how Facility is performing with respect to each metric.

The weights used for each metric are exemplary and can vary. For example, the facility operator may adjust the weights based on the relative importance of the metrics. In addition, the subpar and target values for each metric can be adjusted, e.g., on a facility by facility basis.

FIG. 3 depicts an example user interface 300 in which a facility menu 310 is presented. The facility menu 310 can be presented over a user interface that was being presented when the facility icon 208 is selected. The facility menu 310 presents a list of facilities that can be selected. If the client device detects user interaction (e.g., selection) of one of the facilities, the client device can navigate to a user interface for the selected facility. For example, the client device can navigate to the default user interface (e.g., the composite score user interface) for the selected facility. In another example, the client device can navigate to the same user interface that was being presented when the facility icon 208 was selected, but for the selected facility.

The facility menu 310 also presents the current composite scores for the facilities. In this example, the facility menu 310 presents the current composite scores in current composite score indicators 316-321, similar to the current composite score indicators 206 and 216 of FIG. 2. The background color of each current composite indicators 316-321 can vary based on the value of its respective current composite score. For example, the background color may be red if the current composite score is between 0-59%, yellow if the current composite score is between 60-79%, and green if the current composite score is 80-100%. In this example, the background color for the current composite score indicator 316 can be green based on the current composite score for Facility 1 being 85% and thus in the range for green. By adjusting the background colors based on value, a user can quickly assess how the facilities are performing, e.g., by quickly seeing how many are green, yellow, and red. As shown by the current composite score indicator 320, a facility may not have a composite score, e.g., if the client device (or the facility data management system) does not have data for each metric that goes into the composite score for the facility. In this example, the background color of the current composite score indicator 320 may be grey or another color that is not used to designate a range of values.

Facilities can be grouped together in the facility menu 310. For example, the facility menu 310 includes a warehouse grouping that has been expanded to show the warehouse facilities. The facility menu 310 also presents an overall composite score indicator 315 that shows an overall composite score for the facilities in the warehouse grouping. The overall composite score can be based on the total values of each of the five metrics described above and their location within overall ranges set for the group. For example, the group may have an overall subpar value and an overall target value for each metric. The ranges can be used to determine a normalized value for each metric and each normalized value can be used to determine weighted value for the metric. The weighted values for the metrics can then be summed to determine the overall composite score for the group. The background color of the overall composite score indicator 315 can also vary based on its value, for example, using the same colors and ranges for the individual facilities.

Figure 4:
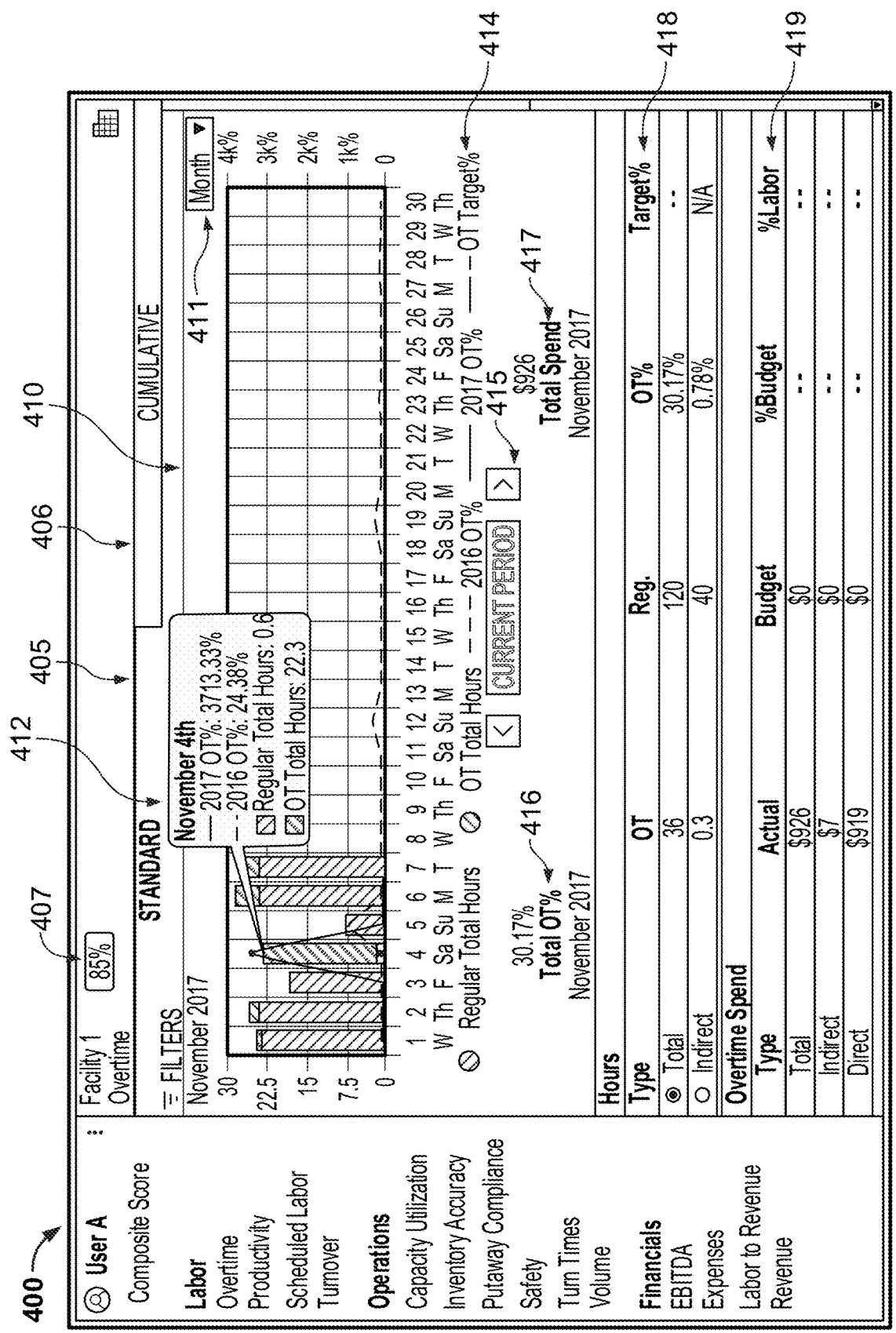
FIG. 4 depicts an example overtime user interface in which data related to overtime for a facility is presented.

FIG. 4 depicts an example overtime user interface 400 in which data related to overtime for a facility (Facility 1) is presented. The overtime user interface 400 includes tabs 405 and 406 to navigate between this user interface 400 that presents overtime data for each day and another overtime user interface 500 (FIG. 5) that presents cumulative overtime data. The client device can present the user interface 400 in response to user selection of the tab 405 and can present the user interface 500 in response to user selection of the tab 406. The client device can present a current composite score indicator element 407 in the user interface 400 and the user interface 500.

The overtime user interface 400 includes a graph 410 that presents overtime data for each day of a month. In this example, the graph 410 presents, for each day of the month, a bar that represents a total number of hours worked at Facility 1 that day. The total number of hours for a day can include regular hours and overtime hours. The portion of the bar that represents the regular hours can be a different color (or a different shade of the same color) than the portion of the bar that represents the overtime hours. For example, the bar for November $7^{th}$ includes a first, lower portion that represents the number of regular hours. This lower portion is lighter than a second, upper portion that represents the number of overtime hours. The total height of the bar represents the sum of the regular hours and the overtime hours.

The graph 410 also presents the percentage of overtime hours (e.g., the number of overtime hours divided the number of regular hours) using lines. The solid line represents the percentage of overtime hours worked each day at Facility 1 in the current month (November 2017) and the dashed line represents the percentage of overtime hours worked each day at Facility 1 in the same month of the previous year (November 2016). In this way, a user can quickly compare the two years. The graph 410 can include a third line that represents the target overtime percentage for each day. This line can be a different color (or different style, e.g., different dashing) than the line that represents the actual overtime percentage for the current month.

The graph 410 also includes a timing view selector element 411. The timing view selector element 411 allows a user to request the overtime data be presented on a different time basis, e.g., for a week or for a year. If data for a week is selected, the client device can update the graph 410 to present overtime data for each day of the current week, e.g., a bar for each day of the week along with lines for the overtime percentage for each day of the week. Similarly, if the data for a year is selected, the client device can update the graph 410 to present overtime data for each month of the year, e.g., a bar for each month of the year along with lines for the overtime percentage for each month of the year.

The graph 410 also includes a legend 414 that identifies what the colors of the bars represent and what the different lines in the graph represent. The graph 410 also includes a value element 412 that presents the actual values for a selected day. In this example, the value element 412 presents the actual values for Nov. 4, 2017. The value element 412 can be presented in response to a user hovering a pointer over the bar or lines at a particular day, e.g., over the bar for November $4^{th}$.

The graph 410 also includes a time period selector element 415 that allows the user to change the time period for which overtime data is presented in the overtime user interface 400. If a user selects the left arrow of the time period selector element 415, the client device can update the graph 410 to present the overtime data for a previous month if data for a month is being presented as shown in FIG. 4. If data for a year is being presented, selection of the left arrow can cause the client device to present overtime data for each month of the year. If data for a week is being presented, selection of the left arrow can cause the client device to present overtime data for each day of the previous week. Similarly, if the user selects the right arrow of the time period selector element 415, the client device can update the graph 410 to present overtime data for a later month, e.g., the month after the month for which overtime data is currently being presented. If data for a year or data for a week is being presented, selection of the right arrow can cause the client device to present overtime data for the previous year or week, respectively.

The overtime user interface 400 also includes a total overtime percentage indicator element 416 that presents a total overtime percentage for Facility 1 for the current time period, i.e., November 2017. This total overtime percentage represents the total number of overtime hours worked at Facility 1 in November 2017 divided by the total number of regular hours worked at Facility 1 in November 2017. If overtime data for a year is being presented, the total overtime percentage indicator 416 would present the total overtime percentage for the year. If overtime data for a week is being presented, the total overtime percentage indicator element 416 would present the total overtime percentage for the week.

The overtime user interface 400 also includes a total spend indicator element 417 that presents the total overtime spend for the current time period, i.e., November 2017. This can also be updated to present the total overtime spend for a year or week in response to user interaction with the timing view selector element 410.

The overtime user interface 400 also includes an hours table 418 that presents, for the current time period, the number of overtime hours, the number of regular hours, and the overtime percentage for all employees of Facility 1 or a breakdown of these hours for indirect employees of Facility 1. The hours table 418 also present the target overtime percentage for all or just indirect employees.

The overtime user interface 400 also includes an overtime spend table 419 that presents, for the current time period, the amount spent on overtime for all employees of Facility 1, the amount spent on overtime for indirect employees of Facility 1, and the amount spent on overtime for direct employees of Facility 1. The overtime spend table 419 also presents the budgeted amount of overtime for all employees, for indirect employees, and for direct employees, along with the percent of each budget that has been spent during the current time period. The overtime spend table 419 can also present, as the % labor, the overtime amount as a percentage of total labor dollars spent during the current time period.

The client device can update the values in the tables 418 and 419 in response to changes in the current time period using the selector elements 411 and 415. For example, if the user selects to view data for a year using the timing view selector element 411, the tables 418 and 419 can be updated to present the data for the selected year.

The overtime user interface 400 also includes a filtering element 430. The filtering element 430 allows a user to filter the overtime data based on one or more parameters. For example, the filtering element 430 can allow a user to filter the overtime so that the overtime user interface 400 presents overtime data for a particular supervisor or multiple supervisors. In this example, the client device can present a menu that identifies each supervisor at Facility 1. If the user selects one of the supervisors, the client device (or the facility data management system) can filter the overtime data so that the overtime user interface 400 only presents data for the selected supervisor. This allows a user to view the amount of overtime attributable to particular supervisors.

Figure 5:
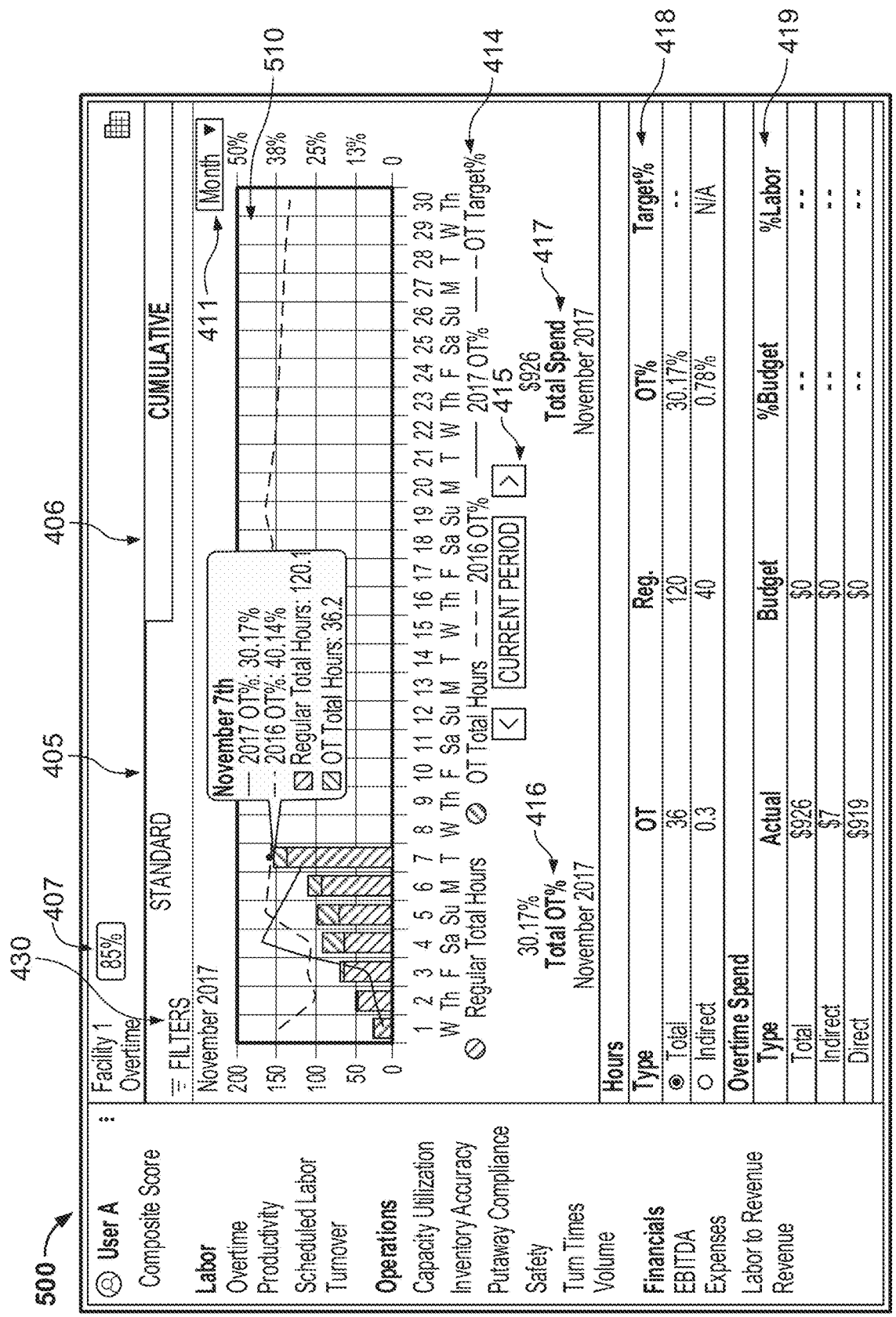
FIG. 5 depicts another example overtime user interface in which data related to overtime for a facility is presented.

FIG. 5 depicts another example overtime user interface 500 in which data related to overtime for a facility is presented. The overtime user interface 500 includes much of the same data as the user interface 400 of FIG. 4. However, the overtime user interface 500 includes a different graph 510 that presents cumulative overtime values for the current time period rather than the individual data for each day of the month. For example, the bar for November $2^{nd}$ represents the total number of hours worked at Facility 1 for the month of November 2017 up to the end of the day on November $2^{nd}$ (i.e., the number of hours for November $1^{st}$+the number of hours for November $2^{nd}$). The bar for each day represents the total number of hours worked at Facility 1 for the month up until the end of that day and includes a different color for regular hours and overtime hours, similar to the bars in the graph 410 of FIG. 4.

The lines of the graph 500 also indicate the cumulative overtime spend for the current time period up until the end of the day. For example, the portion of the solid line over November $7^{th}$ indicates that the percentage of overtime hours worked at Facility 1 for the month of November 2017 up until the end of the day on November $7^{th}$ was 30.17%. Similarly, the portion of the dashed line over November $7^{th}$ indicates that the percentage of overtime hours worked at Facility 1 for the month of November 2016 up until end of the day on Nov. 7, 2016 was 40.14%.

Figure 6:
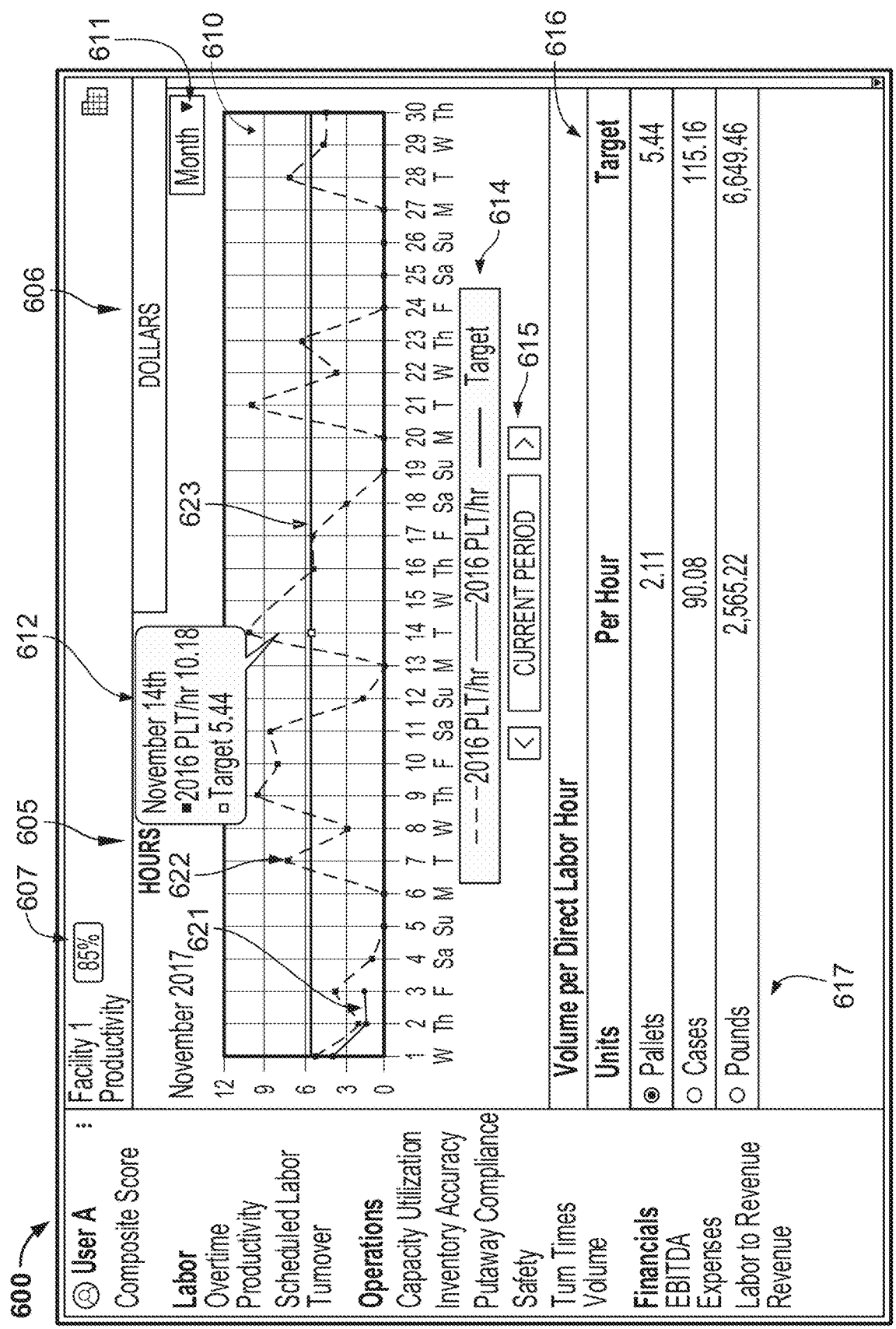
FIG. 6 depicts an example productivity user interface in which data related to productivity for a facility is presented.

FIG. 6 depicts an example productivity user interface 600 in which data related to productivity for a facility is presented. The productivity user interface 600 includes tabs 605 and 606 to navigate between this user interface 600 that presents productivity data in terms of volume per labor hour and a user interface 700 of FIG. 7 that presents productivity data in terms of volume per labor dollar. The client device can present the user interface 600 in response to user selection of the tab 605 and can present the user interface 700 in response to user selection of the tab 606. The client device can present a current composite score indicator element 607 in the user interface 600 and the user interface 700.

The productivity user interface 600 includes a graph 610 that presents productivity data for each day of a month. In this example, the graph 610 presents a line that represents the volume of products (e.g., of cold products) handled at Facility 1 for each hour of labor worked at Facility 1 for each day of the month. The volume can be depicted in terms of pallets, cases, or pounds based on the selection of a volume type selector element 617 described below. In this example, a first solid line 621 represents the number of pallets per labor hour for each day in the current time period, i.e., November 2017. A dashed line 622 represents the number of pallets per labor hour for the same month in the previous year, i.e., November 2016. A second solid line 623 represents the target number of pallets per labor hour for each day.

The graph 610 also includes a timing view selector element 611, which is similar to the timing view selector element 411 of FIG. 4. The timing view selector element 611 allows a user to request the productivity data be presented on a different time basis, e.g., for a week or for a year. If data for a week is selected, the client device can update the graph 610 to present productivity data for each day of the current week. Similarly, if the data for a year is selected, the client device can update the graph 610 to present productivity data for each month of the year.

The graph 610 also includes a legend 614 that identifies what each line in the graph 610 represents. The graph 610 also includes a value element 612 that presents the actual values for a selected day. In this example, the value element 612 presents the actual values for Nov. 14, 2017. The value element 612 can be presented in response to a user hovering a pointer over one of the lines at a particular day, e.g., over one of the lines for November 14th.

The graph 610 also includes a time period selector element 615 that allows the user to change the time period for which productivity data is presented in the productivity user interface 600. If a user selects the left arrow of the time period selector element 615, the client device can update the graph 610 to present the productivity data for a previous month if data for a month is being presented as shown in FIG. 6. If data for a year is being presented, selection of the left arrow can cause the client device to present productivity data for each month of the year. If data for a week is being presented, selection of the left arrow can cause the client device to present productivity data for each day of the previous week. Similarly, if the user selects the right arrow of the time period selector element 615, the client device can update the graph 610 to present productivity data for a later month, e.g., the month after the month for which productivity data is currently being presented. If data for a year or data for a week is being presented, selection of the right arrow can cause the client device to present productivity data for the previous year or week, respectively.

The productivity user interface 600 also includes a volume per labor hour table 616 that presents the average volume per labor hour for Facility 1 in terms of pallets, cases, and pounds. The volume per labor hour table 616 also presents a target for each of these values.

The volume per labor hour table 616 also includes a volume type selector element 617 that allows a user to select between pallets, cases, and pounds. The client device can update the graph 610 in response to a user selection. For example, as shown in FIG. 6, the graph 610 presents the number of pallets per labor hour. If the user selects the radio button for cases in the volume type selector element 617, the client device can update the graph to present the number of cases per labor hour handled at Facility 1 for the time period, e.g., for each day of the month of November 2017.

Figure 7:
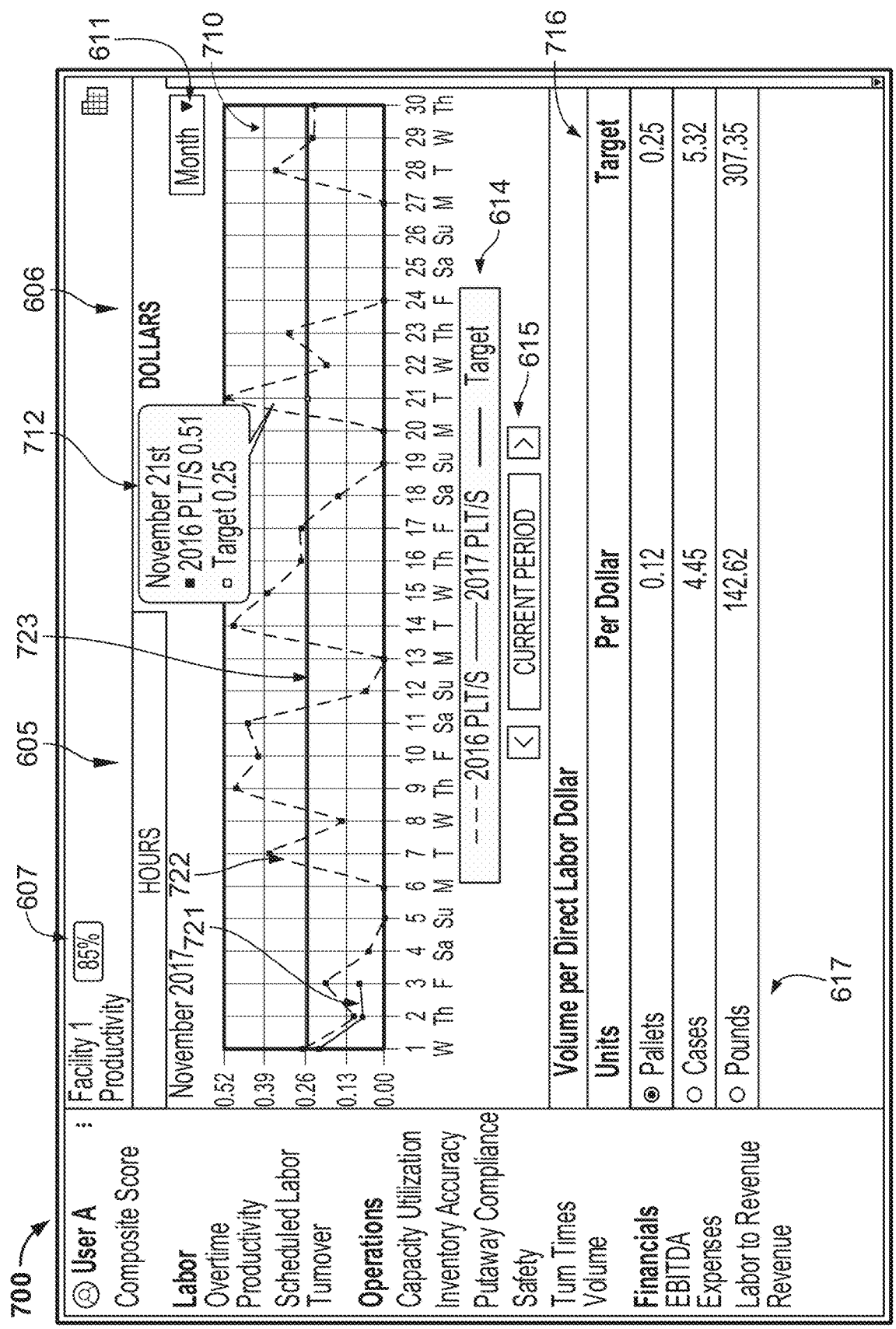
FIG. 7 depicts another example user interface in which data related to productivity for a facility is presented.

FIG. 7 depicts another example productivity user interface 700 in which data related to productivity for a facility is presented. The productivity user interface 700 includes much of the same data as the user interface 600 of FIG. 6. However, the productivity user interface 700 presents the productivity in terms of volume per labor dollar rather than volume per labor hour. For example, the productivity user interface 700 includes the current composite score indicator element 607, the timing view selector element 611, the tabs 605 and 606, the legend 614, the time period selector element 615, and the volume type selector element 617.

The productivity user interface 700 includes a graph 710 that is similar to the graph 610, but the lines of the graph 710 represent the volume per labor dollar. The graph includes a first solid line 721 that represents the number of pallets per labor dollar for each day in the current time period, i.e., November 2017, a dashed line 722 that represents the number of pallets per labor hour for the same month in the previous year, i.e., November 2016, and a second solid line 723 that represents the target number of pallets per labor hour for each day.

The graph 710 also includes a value element 712 that presents the actual values for a selected day. In this example, the value element 712 presents the actual values for Nov. 21, 2017. The value element 712 can be presented in response to a user hovering a pointer over one of the lines at a particular day, e.g., over one of the lines for November 21st.

The productivity user interface 700 also includes a volume per labor dollar table 716 that presents the average volume per labor dollar for Facility 1 in terms of pallets, cases, and pounds. The volume per labor dollar table 716 also presents target for each of these values.

Figure 8:
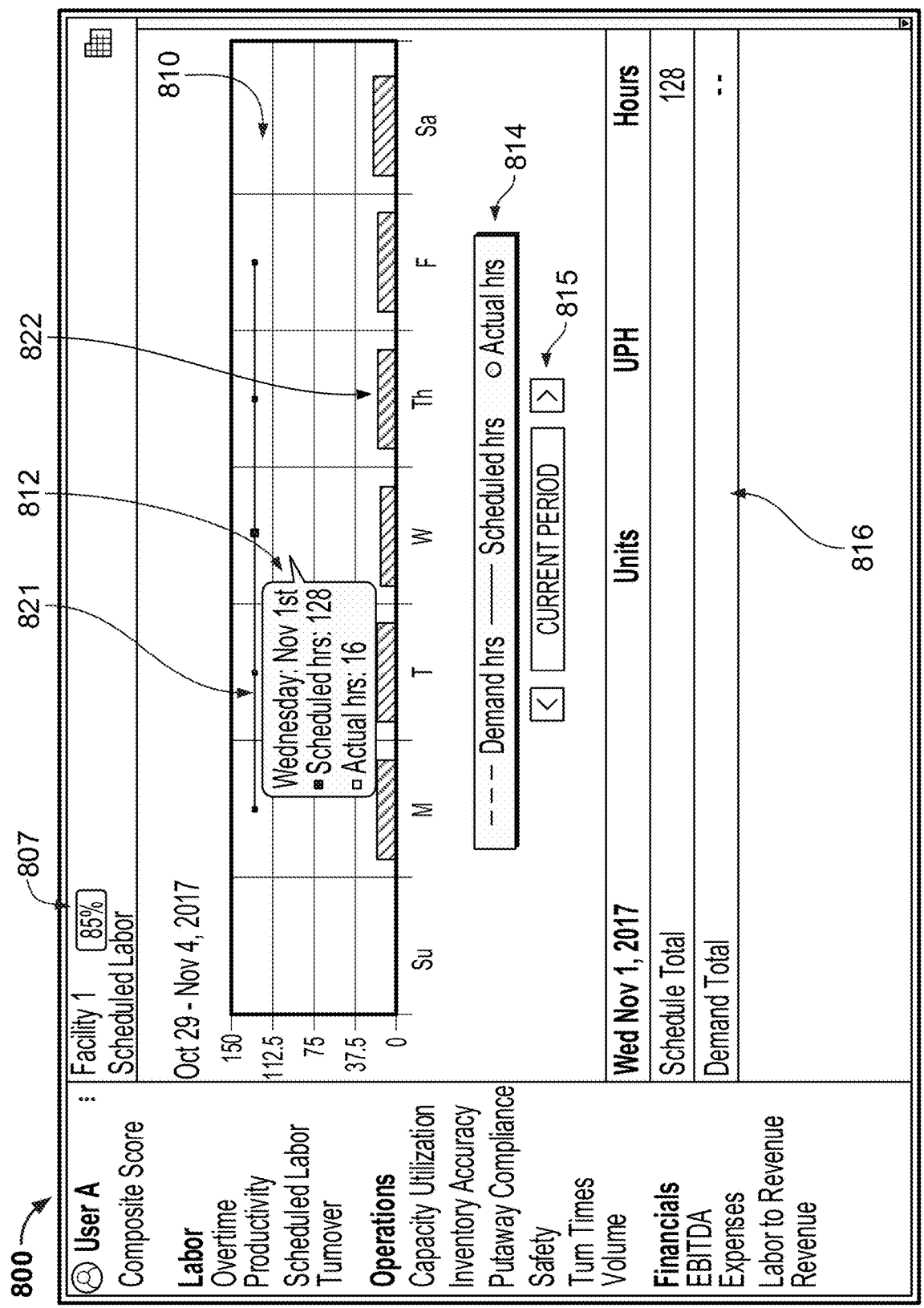
FIG. 8 depicts an example scheduled labor user interface in which data related to scheduled labor for a facility is presented.

FIG. 8 depicts an example scheduled labor user interface 800 in which data related to scheduled labor for a facility is presented. The scheduled labor user interface 800 can be used to compare labor supply and demand for a facility, e.g., Facility 1. The scheduled labor user interface 800 includes a graph 810 that presents a line 821 that represents the number of scheduled labor hours each day of a week for Facility 1. The scheduled hours can be the total number of hours available in the schedule for Facility 1. The graph 800 also includes, for each day of the week, a bar 822 that represents the number of actual hours worked at Facility 1 that day. A second line can present the number of hours demanded by Facility 1, e.g., based on projected work at Facility 1. A user can view the graph 810 and quickly see whether the number of hours actually worked exceeds or is below the number of scheduled hours. Although the data is being presented for each day of a week in this example, the graph 810 can present the data for days of a month or months of a year.

The graph 810 also includes a value element 812 that presents the actual values for a selected day. In this example, the value element 812 presents the actual values for Wednesday, Nov. 1, 2017. The value element 812 can be presented in response to a user hovering a pointer over the line 821 at a particular day or a bar 822 for a particular day.

The graph 810 also includes a legend 814 and a time period selector element 815 that allows the user to change the time period for which scheduler labor data is presented in the scheduled labor user interface 800. If a user selects the left arrow of the time period selector element 815, the client device can update the graph 810 to present the scheduled labor data for a previous week. Similarly, if the user selects the right arrow of the time period selector element 815, the client device can update the graph 810 to present scheduled labor data for a later week, e.g., the week after the week for which scheduled labor data is currently being presented.

The scheduled labor user interface 800 also includes a scheduled labor table 816 that presents the total number of scheduled hours and the total number of demand hours for the current time period, e.g., current week. The scheduled labor table 816 can show the demand hours broken down into the number of hours for each type of projected work, e.g., for unloading products, loading products, etc. The scheduled labor user interface 800 can also present a current composite score indicator element 807 for Facility 1.

Figure 9:
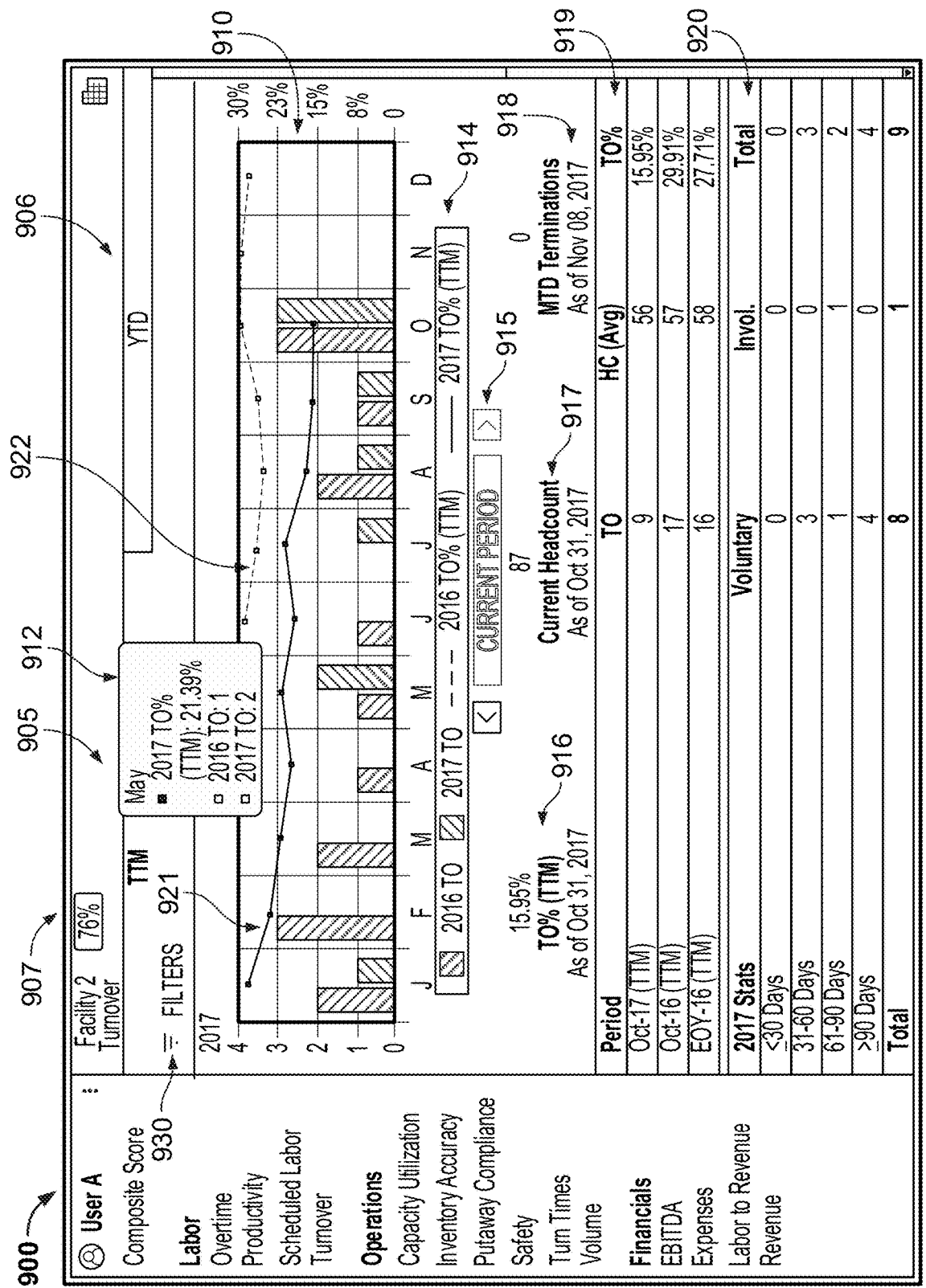
FIG. 9 depicts an example turnover user interface in which data related to turnover for a facility is presented.

FIG. 9 depicts an example turnover user interface 900 in which data related to turnover for a facility is presented. The turnover user interface 900 can be used to view the amount of employee turnover at a facility, e.g., Facility 2. The facility turnover user interface 900 presents a current composite score indicator element 907 for Facility 2.

The turnover user interface 900 also includes tabs 905 and 906 to navigate between this user interface 900 that presents turnover data in terms of trailing twelve months (TTM) and another user interface that presents turnover data in terms of year-to-date turnover.

The turnover user interface 900 also includes a graph 910 that presents turnover data for Facility 2 for each month of a year. For each month, the graph 910 includes a first bar that represents the total number of employee terminations in a 12-month time period that ends at the end of that month for the previous year (i.e., 2016 in this example) and a second bar that represents the total number of employee terminations in a 12-month period that ends at the end of the month for the current year (i.e., 2017 in this example). The graph 910 also includes a solid line 921 that represents the turnover percentage (e.g., number of terminated employees divided by average number of employees over the 12-month period, or the number of terminated employees divided by the number of employees at the end of the 12-month period) for each month of the current year (i.e., 2017). The graph 910 also includes a dashed line that represents the turnover percentage for each month of the previous year (i.e., 2016).

The graph 910 also includes a legend 914 and a time period selector element 915 that allows a user to change the time period for which turnover data is presented, similar to the time period selector elements described above. The graph 910 also includes value element 912 that presents the actual values for a selected month. In this example, the value element 912 presents the actual values for May of 2016 and 2017. The value element 912 can be presented in response to a user hovering a pointer over a line or bar at the month.

The turnover user interface 910 also includes a turnover percent value element 916 that presents the actual turnover percentage for the 12-months ending at the end of October, 2017. This value can be determined by dividing the number of employees terminated from Facility 2 during the twelve months by the average number of employees at Facility 2 during the twelve months.

The turnover user interface 910 also includes a current headcount value element 917 that presents the number of employees currently employed by Facility 2 as of Oct. 31, 2017. The turnover user interface 910 also includes a terminations value element 918 that presents the number of employees terminated in the current month, e.g., November, 2017, to date.

The turnover user interface 910 also includes a turnover period table 919 that presents the number of employees terminated from Facility 2 during twelve month periods, the average number of employees employed by Facility 2 during the twelve month periods, and the turnover percentages for each of the twelve month periods.

The turnover user interface 900 also includes a statistics table 920 that presents statistics that represent the number of employees that were terminated for various reasons (e.g., voluntary, involuntary) and the total number of employees terminated after working at Facility 2 for various lengths of time (e.g., less than or equal to 30 days, 31-60 days, etc.).

The turnover user interface 900 also includes a filter element 930 that allows a user to filter the turnover data based on a parameter, e.g., based on the employees' role at Facility 2. For example, a user may want to view the number of forklift operators that have left Facility 2 in the last twelve months. The user can select forklift operators from a menu that is presented in response to the user selecting the filter element 930. In response, the client device (or the facility data management system) can filter the turnover data to only present turnover data for forklift operators at Facility 2.

Figure 10:
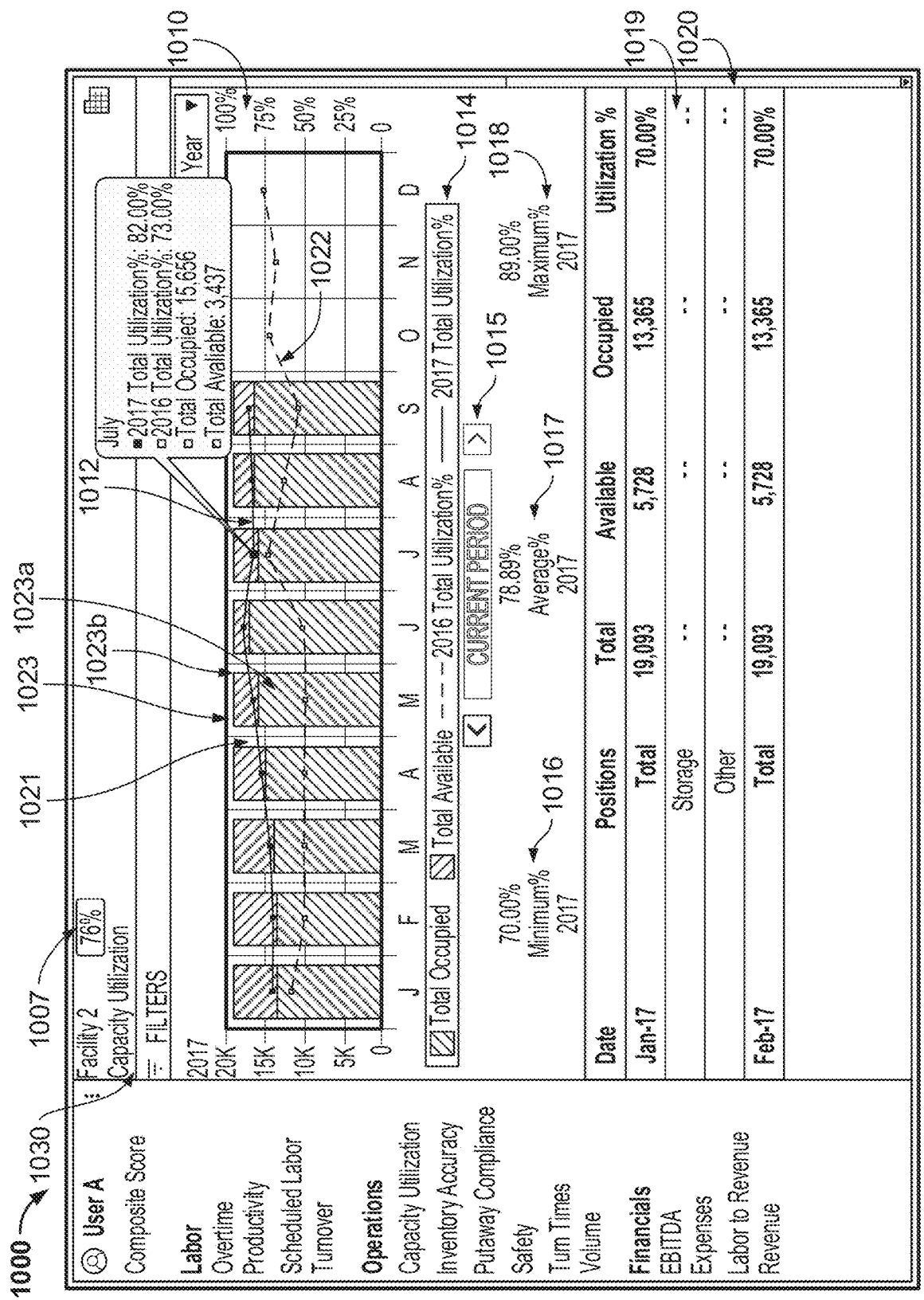
FIG. 10 depicts an example capacity utilization user interface in which data related to capacity utilization for a facility is presented.

FIG. 10 depicts an example capacity utilization user interface 1000 in which data related to capacity utilization for a facility is presented. The capacity utilization user interface 1000 can be used to view the amount of available storage capacity (or other types of capacity) is being used by a facility, e.g., Facility 2.

The capacity utilization user interface 1000 includes a graph 1010 that presents capacity utilization data for each month of a year. For each month, the graph includes a bar 1023 that has a lower portion 1023a that represents the total occupied capacity for the month and an upper portion 1023b that represents the total available capacity that is not occupied. The total bar 1023 represent the total capacity of the facility (e.g., occupied and unoccupied). The lower portion 1023a can be presented in a different color than the upper portion 1023b (or a different shade of the same color) so that a user can quickly view how much of the capacity is being used each month.

The graph 1010 also includes a solid line 1021 that represents the total utilization percentage for the current time period (the year 2017 in this example) and a dashed line 1022 that represents the utilization period for a previous time period (the year 2016 in this example). The utilization percentage at each month is the year-to-date utilization percentage as of that month. For example, a value element 1012 (which presents the actual values for a selected month) indicates that the year-to-date utilization percentage as of July of 2017 was 82%. The value element 1012 can be presented in response a user hovering a pointer over a line or bar at the month. Although the graph 1010 presents capacity utilization data for each month, the graph 1010 can present the capacity utilization data for each day of a week or each week of a year.

The graph 1010 also includes a legend 1014 and a time period selector element 1015 that allows a user to change the time period for which capacity utilization data is presented, similar to the time period selector elements described above.

The capacity utilization user interface 1000 also includes a minimum utilization percentage element 1016 that presents a minimum amount of the total capacity of Facility 2 that has been occupied at once during the current time period (the year 2017 in this example). The capacity utilization user interface 1000 also includes an average utilization percentage element 1017 that presents an average amount of the total capacity of Facility 2 that has been occupied during the current time period. The capacity utilization user interface 1000 also includes a maximum utilization percentage element 1018 that presents a maximum amount of the total capacity of Facility 2 that has been occupied at once during the current time period.

The capacity utilization user interface 1000 also includes a capacity utilization table 1019. The capacity utilization table 1019 presents capacity utilization data for each month of the year. For example, the capacity utilization table 1019 presents, for each month, the total capacity of Facility 2 (e.g., in terms of number of pallet positions in Facility 2), the amount of available capacity of Facility 2, the amount of occupied capacity of Facility 2, and the utilization percentage (amount occupied divided by total capacity). The amounts for each month can be the average for the month, e.g., the average available capacity for the month and the average occupied capacity for the month.

A scroll bar 1020 can be used to scroll down to view the data for other months. The capacity utilization user interface 1000 also presents a current composite score indicator element 1007 for Facility 2.

Figure 11:
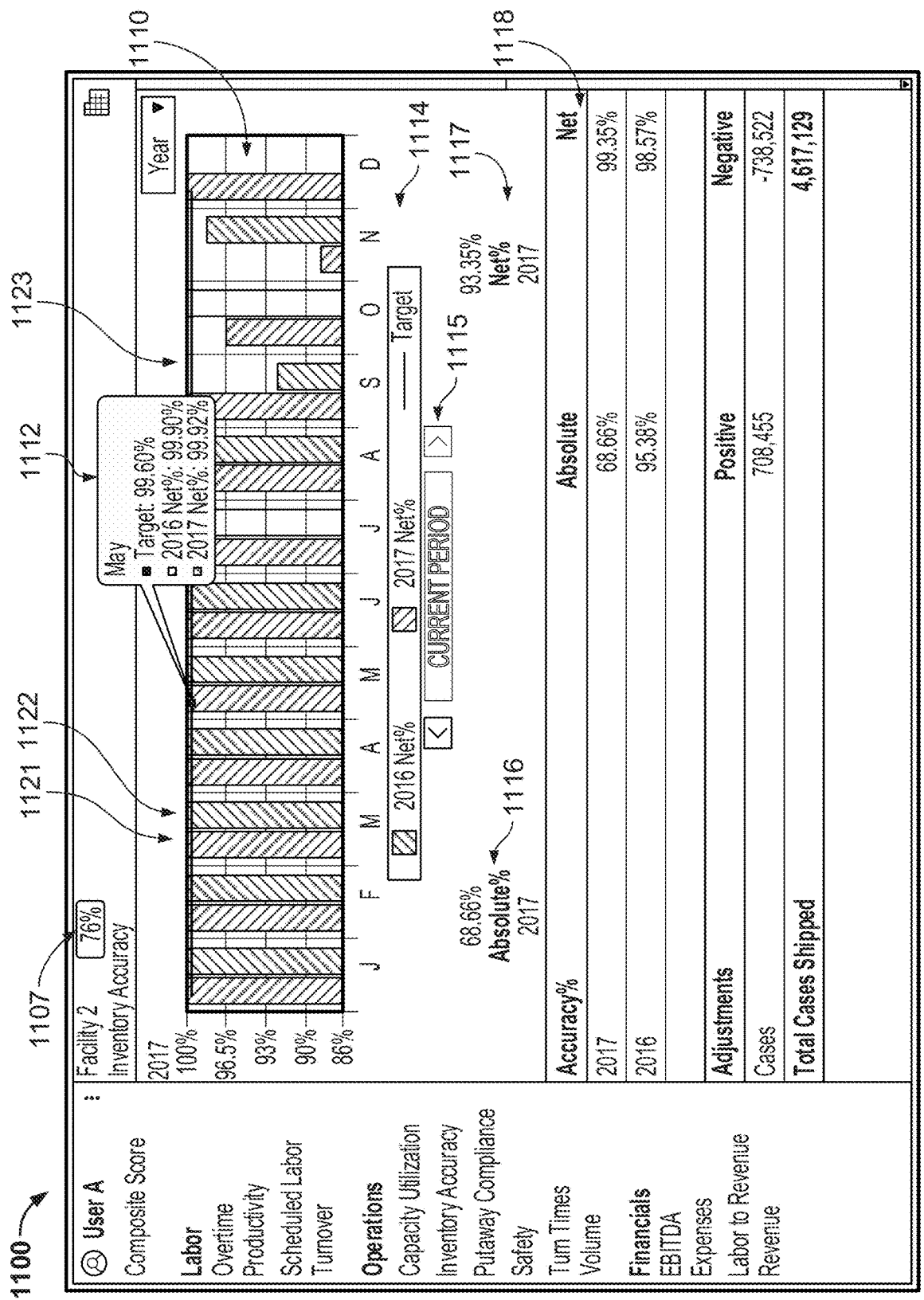
FIG. 11 depicts an example inventory accuracy user interface in which data related to inventory accuracy for a facility is presented.

FIG. 11 depicts an example inventory accuracy user interface 1100 in which data related to inventory accuracy for a facility is presented. The inventory accuracy user interface 1100 can be used to view the accuracy of inventory based on adjustments made to inventory data for the facility, e.g., Facility 2.

The inventory accuracy user interface 1100 includes a graph 1110 that presents inventory accuracy data for each month of a year (2017) and for each month of a previous year (2016). The graph 1110 includes, for each month, a first bar 1121 that represents the inventory accuracy for the month in the previous year and a second bar 1122 that represents the inventory accuracy for the month in the current year. In this example, each bar represents the net accuracy for the month.

Inventory accuracy can be represented at absolute accuracy and net accuracy. Absolute accuracy can be based on a total number of adjustments (positive and negative) and the volume of product shipped from the facility. An adjustment is a unit added to or subtracted from inventory numbers to correct the inventory number. A positive adjustment is an added unit (e.g., case) to an inventory number that specifies the number of cases in inventory. A negative adjustment is a subtracted unit (e.g., case) from an inventory number. The absolute accuracy can be equal to 100% minus the ratio between the number of adjustments and the number of cases shipped from the facility. Net accuracy can be based on a net number of adjustments (where negative and positive adjustments cancel each other out). For example, net accuracy can be equal to 100% minus the ratio between the net number of adjustments and the number of cases shipped from the facility.

The graph 1110 also includes a line 1123 that represents a target inventory accuracy for each month. The graph also includes a value element 1112 that shows the actual values for a month, e.g., a month that has been hovered over by a pointer. The graph also includes a legend 1114 and a time period selector element 1115 that allows a user to change the time period for which inventory accuracy data is presented, similar to the time period selector elements described above.

The inventory accuracy user interface 1100 also includes an absolute accuracy value element 1116 that presents the year-to-date absolute accuracy for Facility 2. The inventory accuracy user interface 1100 also includes a net accuracy value element 1117 that presents the year-to-date net accuracy for Facility 2.

The inventory accuracy user interface 1100 also includes an inventory accuracy table 1118. The inventory accuracy table 1118 presents absolute and net accuracy values for Facility 2 for various years, the number of adjustments made to the inventory data (in terms of the number of cases added to or subtracted from the inventory numbers), and the total number of cases shipped from Facility 2. The inventory accuracy user interface 1100 also presents a current composite score indicator element 1107 for Facility 2.

Figure 12:
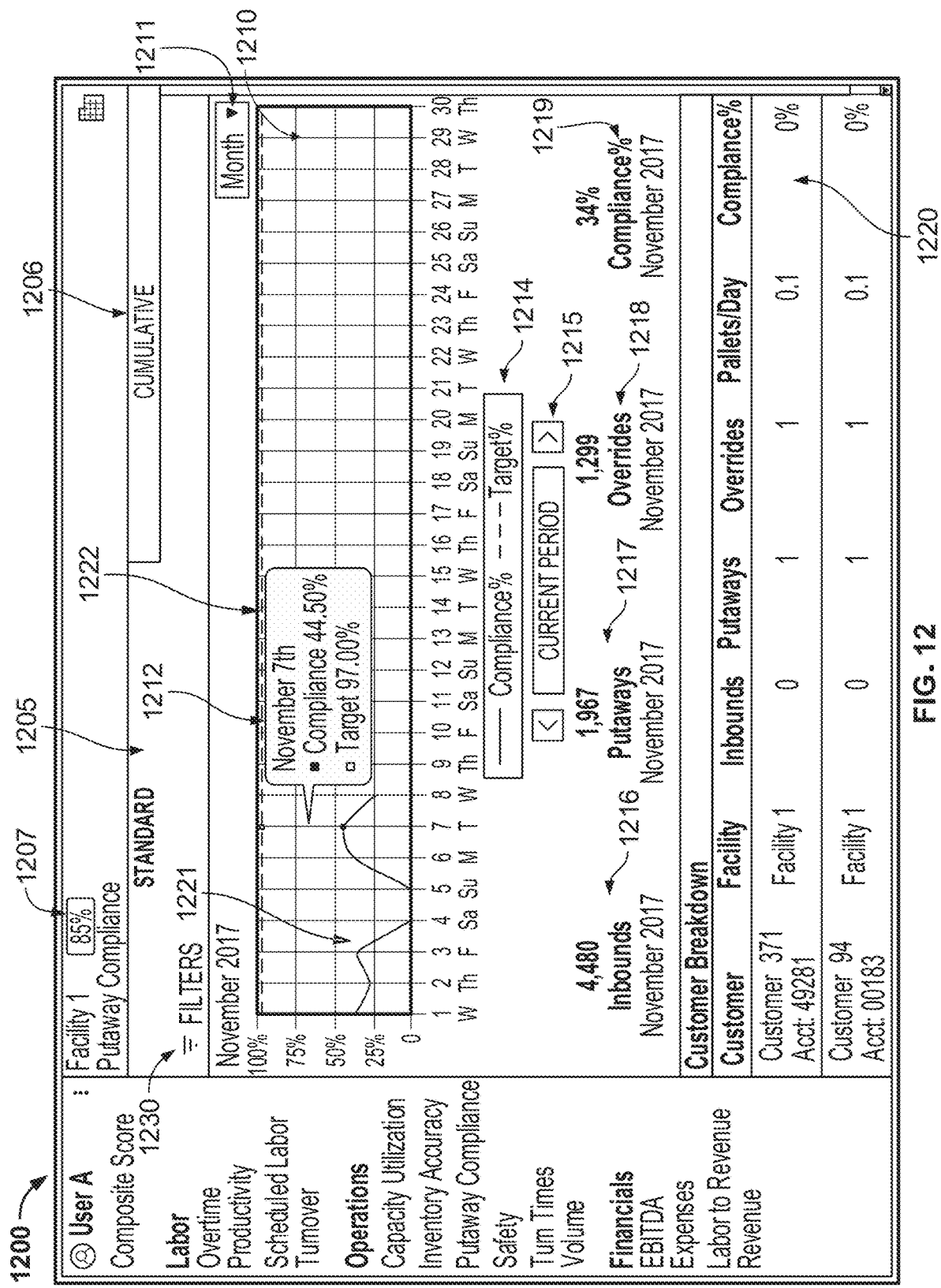
FIG. 12 depicts an example putaway compliance user interface in which data related to putaway compliance for a facility is presented.

FIG. 12 depicts an example putaway compliance user interface 1200 in which data related to putaway compliance for a facility is presented. Putaway compliance represents the number of units (e.g., cases, pallets, pounds, etc.) of product stored in the facility at its assigned location as a percentage of the total number of stored units that have been assigned a location at the facility. The putaway compliance user interface 1200 can be used to determine how well the facility and/or its customers are doing at storing products in the correct locations.

The putaway compliance user interface 1200 includes tabs 1205 and 1206 that allow a user to navigate between the user interface 1200 that presents the putaway compliance on a per-day (or other time period) basis and another user interface 1300 (FIG. 13) that presents cumulative putaway compliance. The client device can present the user interface 1200 in response to user selection of the tab 1205 and can present the user interface 1300 in response to user selection of the tab 1206. The client device can present a current composite score indicator element 1207 in the user interface 1200 and the user interface 1300.

The putaway compliance user interface 1200 includes a graph 1210 that presents a first line 1221 that represents the putaway compliance for each day of a month and a second line 1222 that represents a target putaway compliance for each day. The putaway compliance for a day can be equal to a number of units stored in its assigned location divided by the total number of units stored at the facility that day. The graph 1210 also includes a value element 1212 that presents the actual value for a day, e.g., a day that has been hovered over by a pointer.

The graph 1210 also includes a timing view selector element 1211. The timing view selector element 1211 allows a user to request the putaway compliance data be presented on a different time basis, e.g., for a week or for a year, similar to the timing view selector element 411 of FIG. 4.

The graph 1210 also include a legend 1214 and a time period selector element 1215 that allows a user to change the time period for which putaway compliance data is presented, similar to the time period selector elements described above.

The putaway compliance user interface 1200 also includes an inbounds value element 1216 that presents a number of inbound units for the current time period (November 2017 in this example). The putaway compliance user interface 1200 also include a putaways value element 1217 that presents a number of units that have been assigned a location at the facility for the current time period. The putaway compliance user interface 1200 also includes an overrides value element 1218 that presents a number of units placed in a location not assigned to the unit for the current time period. The putaway compliance user interface 1200 also includes a putaway compliance value element 1219 that presents the percentage of the units that have been assigned a location at the facility that are actually stored in the assigned location. This can be determined by subtracting the number of overrides from the number of units assigned a location and dividing the result by the number of units assigned a location (e.g., (1967−1299)/1967=34%).

The putaway compliance user interface 1200 also includes a putaway compliance data table 1220. The putaway compliance data table 1220 presents putaway compliance data for customers that have stored products at the facility. The data includes, for each customer, a number of inbound units, a number of units assigned a location (putaways), a number of overrides, a number of units stored at the facility per day, and a compliance percentage. This table 1220 can be used to view which customers are not storing their products at the assigned locations.

The putaway compliance user interface 1200 also includes a filter element 1230 that allows a user to filter the putaway compliance data. For example, a user can use the filter element 1230 to filter the putaway compliance by customer.

Figure 13:
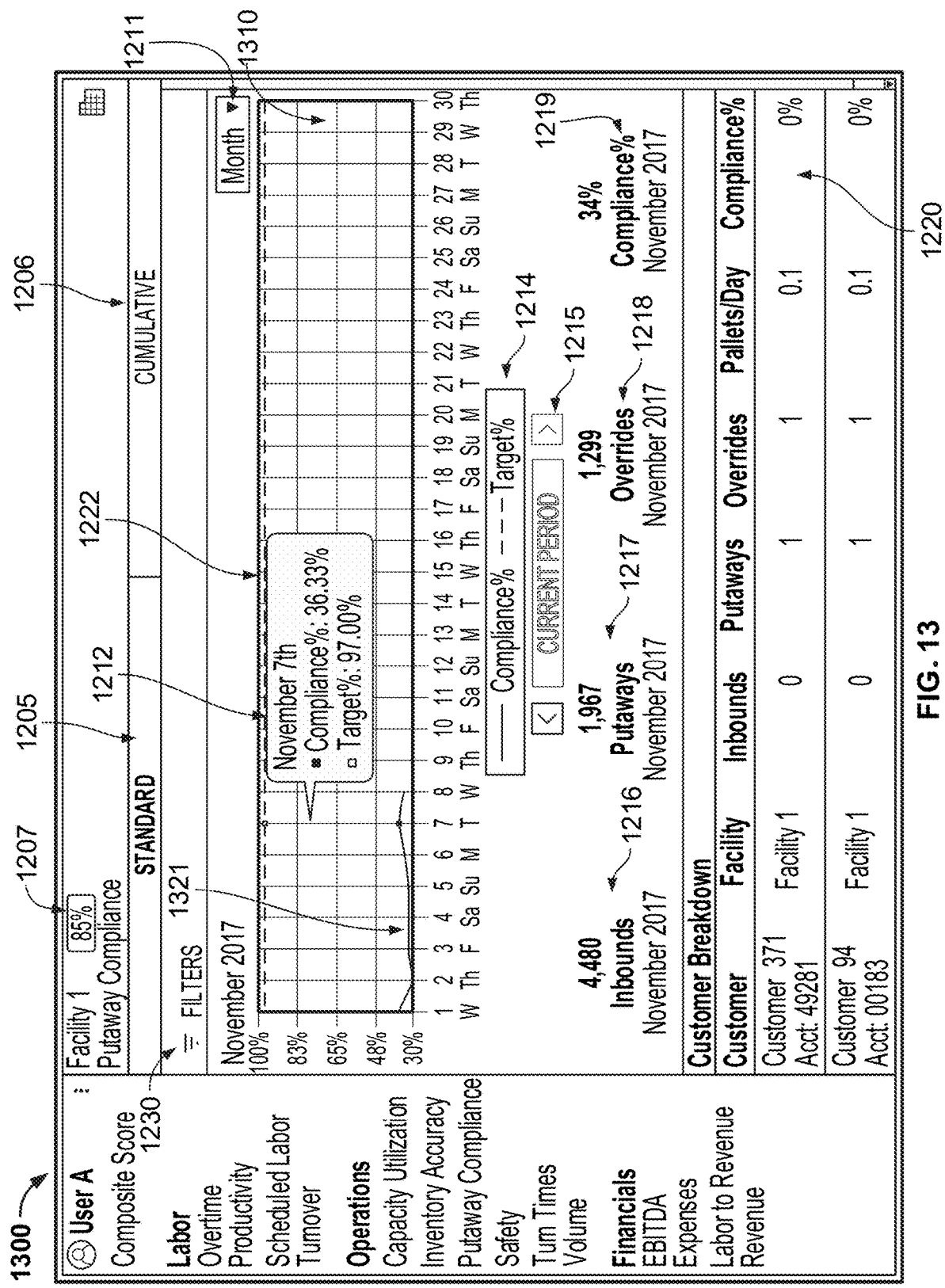
FIG. 13 depicts another example putaway compliance user interface in which data related to putaway compliance for a facility is presented.

FIG. 13 depicts another example putaway compliance user interface in which data related to putaway compliance for a facility is presented. The putaway compliance user interface 1300 includes much of the same data as the user interface 1200 of FIG. 12. However, the putaway compliance user interface 1200 includes a different graph 1310 that presents cumulative putaway compliance data for the current time period rather than the individual data for each day of the month. The line 1321 represents the cumulative putaway compliance for the month at each day. For example, the point on the line 1321 for Nov. 7, 2017 indicates a cumulative putaway compliance of 36.33% for the month of November as of November 7th as shown in the value element 1312.

Figure 14:
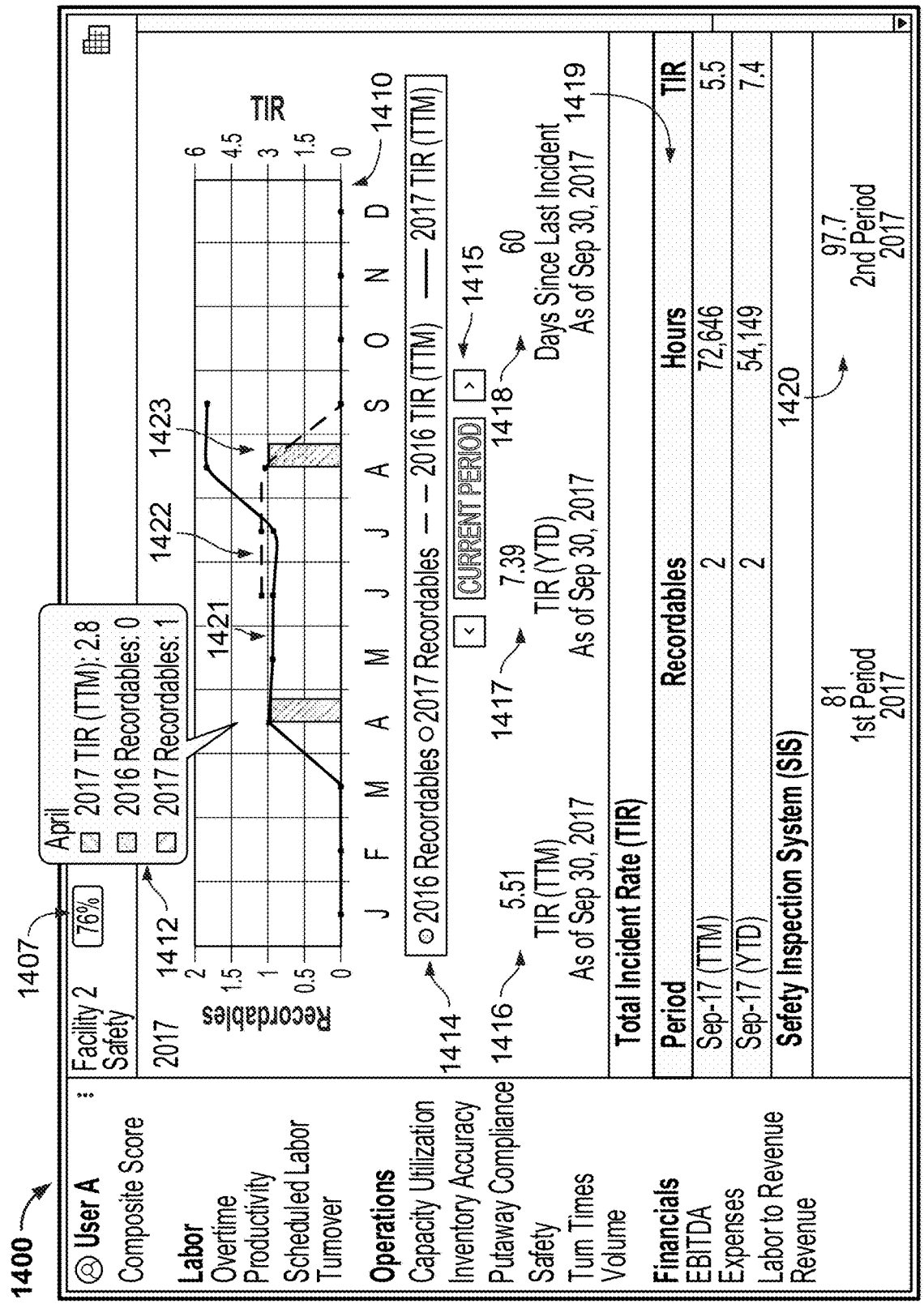
FIG. 14 depicts an example safety user interface in which data related to safety at a facility is presented.

FIG. 14 depicts an example safety user interface 1400 in which data related to safety at a facility is presented. The data related to safety can include an incident rate for the facility that is used in determining the composite score for the facility, which is presented in a current composite score indicator element 1407. As described above the incident rate indicates a rate of injuries, sicknesses, or other reportable incidents of workers at the facility, e.g., Facility 2. The incident rate can represent the incident rate per 100 employees.

The safety user interface 1400 includes a graph 1410 that presents data related to safety at Facility 2. The graph 1410 presents the data for each month of the year. In other examples, the graph 1410 can present the data for each day of the week, each day of the month, or another appropriate time period. The graph 1410 includes a solid line 1421 that represents the TTM incident rate for each month of the current year, i.e., 2017 in this example. The TTM incident rate for a particular month is the incident rate based on incidents that occurred over the twelve months leading up to and including the particular month. For example, the TTM incident rate for April 2017 is based on the number of incidents that occurred from May 1, 2016-Apr. 30, 2017. The graph 1410 also includes a dashed line 1422 that represents the TTM incident rate for each month for the previous year, i.e., 2016 in this example.

The graph 1410 also includes a bar 1423 for each month in which an incident was recorded for the facility. The bar 1423 for a month represents the number of incidents that occurred at the facility in that month. The graph 1423 can also include a bar for each month of the previous year in which an incident was recorded for the facility to allow a user to compare the two years. The bars for the different years can be different colors or otherwise be presented differently.

The graph 1410 also includes a legend 1414 and a time period selector element 1415 that allows a user to change the time period for which safety data is presented, similar to the time period selector elements described above.

The safety user interface 1400 also includes a TTM incident rate value element 1416 that presents the TTM incident rate for the current month. The safety user interface 1400 also includes a year-to-date incident rate value element 1417 that presents the year-to-date incident rate for the facility. The safety user interface 1400 also includes a last incident value element 1418 that presents the number of days that have passed since the last recordable incident occurred at the facility.

The safety user interface 1400 also includes a safety data table 1419 that presents safety data for the facility. The safety data includes TTM and year-to-date incident rates for the facility, the number of recordables for the facility for each incident rate, and the number of worked hours at the facility for each incident rate. For example, each incident rate can be determined using the OSHA equation provided above (number of incidents*200,000/number of hours worked).

The safety user interface 1400 also includes safety inspection system values for different time periods. The safety inspection system values can represent safety inspections values generated by an inspector based on an in-person inspection audit of the facility 140. For example, an inspector can assign a safety inspection system value to the facility 140 based on the in-person audit.

Figure 15:
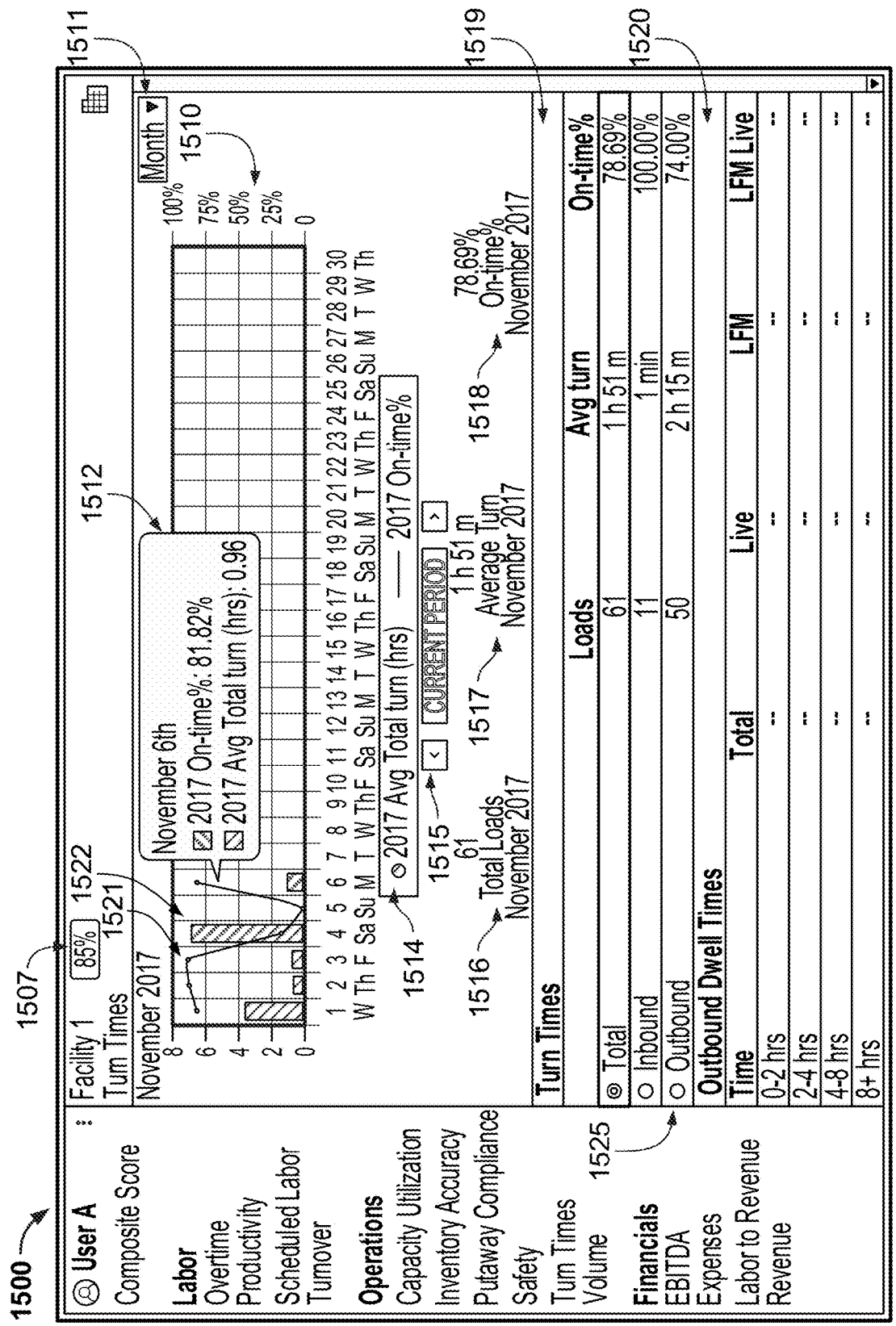
FIG. 15 depicts an example turn times user interface in which data related to turn times for a facility is presented.

FIG. 15 depicts an example turn times user interface 1500 in which data related to turn times for a facility is presented. The turn times represent the amount of time taken to turn a product truck. The turn time for a truck can equal the duration of time that elapses from the time at which a truck arrives at the facility until the time at which the truck leaves the facility, e.g., either to load or unload products. The turn times can be computed based on timestamps that indicate, for each truck, a time at which the truck arrived at the facility and the time at which the truck left the facility. In some implementations, sensors or scanners are used to determine the times at which the trucks arrive and leave. The turn times user interface also presents a current composite score indicator 1507 of the facility.

The turn times user interface 1500 includes a graph 1510 that presents turn times data for the facility, e.g., Facility 1. The graph 1510 presents the data for each day of the month. In other examples, the graph 1510 can present the data for each day of the week, each month of the year, or another appropriate time period. The graph 1510 includes a solid line 1521 that represents the percentage of trucks turned on time each day. For example, the percentage of trucks turned on time can be the percentage of trucks turned within a specified duration of time, e.g., within one hour, two hours, or another appropriate time period. The specified duration can vary based on facility. The graph 1510 also includes, for each day, a bar 1522 that represents the average turn time for the day.

The graph 1510 also includes a timing view selector element 1511, which is similar to the timing view selector elements described above. The timing view selector element 1511 allows a user to request the turn times data be presented on a different time basis, e.g., for a week or for a year. If data for a week is selected, the client device can update the graph 1510 to present turn times data for each day of the current week. Similarly, if the data for a year is selected, the client device can update the graph 1510 to present turn times data for each month of the year.

The graph 1510 also includes a legend 1514 and a time period selector element 1515 that allows a user to change the time period for which safety data is presented, similar to the time period selector elements described above. The graph 1510 also includes a value element 1512 that presents the actual value for a day, e.g., a day that has been hovered over by a pointer.

The turn times user interface 1500 also includes a total loads value element 1516 that presents the total number of loads (e.g., total number of trucks) that have been loaded or unloaded at the facility for the current time period, e.g., November 2017. The turn times user interface 1500 also includes an average turn time value element 1517 that presents the average turn time for the facility for the current time period. The turn times user interface 1500 also includes an on time percentage value element 1518 that presents the percentage of trucks that were turned within the specified duration of time at the facility during the current time period.

The turn times user interface 1500 also includes a turn times data table 1519 that presents turn times data for the facility. The turn times data table 1519 presents the total number of loads (inbound and outbound) at the facility, the average turn time for the facility, and the percentage of trucks turned within the specified duration of time. The turn times data table 1519 also includes a load type selector element 1525 that allows a user to select between total loads, inbound loads (e.g., trucks that are unloaded at the facility), and outbound loads (e.g., trucks that are loaded at the facility). The client device can update the graph 1510 and the data in the table 1519 in response to a user selection of one of the load types. For example, as shown in FIG. 15, the graph 1510 presents the turn times data for total loads (both inbound and outbound). If the user selects the radio button for inbound loads in the load type selector element 1525, the client device can update the graph 1510 to present the turn times data for inbound loads only and update the table to present the turn times data for inbound loads only.

The turn times user interface 1500 also includes an outbound dwell times data table 1520. The outbound dwell times data table 1520 presents data related to outbound dwell times, including the total number of outbound loads for which the turn time was between various durations. The outbound dwell times data table 1520 also presents a number of "live" outbound loads for which the turn time was between various durations when trucks arrived at the facility with a trailer and gets unloaded or unloaded (e.g., rather than dropping the trailer and leaving). The outbound dwell times data table 1520 also presents a number of LFM (e.g., a particular freight company) loads for which the turn time was between various durations. The outbound dwell times data table 1520 also presents a number of live LFM loads for which the turn time was between various durations when trucks of the particular freight company arrived at the facility with a trailer and gets unloaded or loaded. The total number of loads for each duration can be based on live and non-live loads from all freight companies including the LFM loads.

Figure 16:
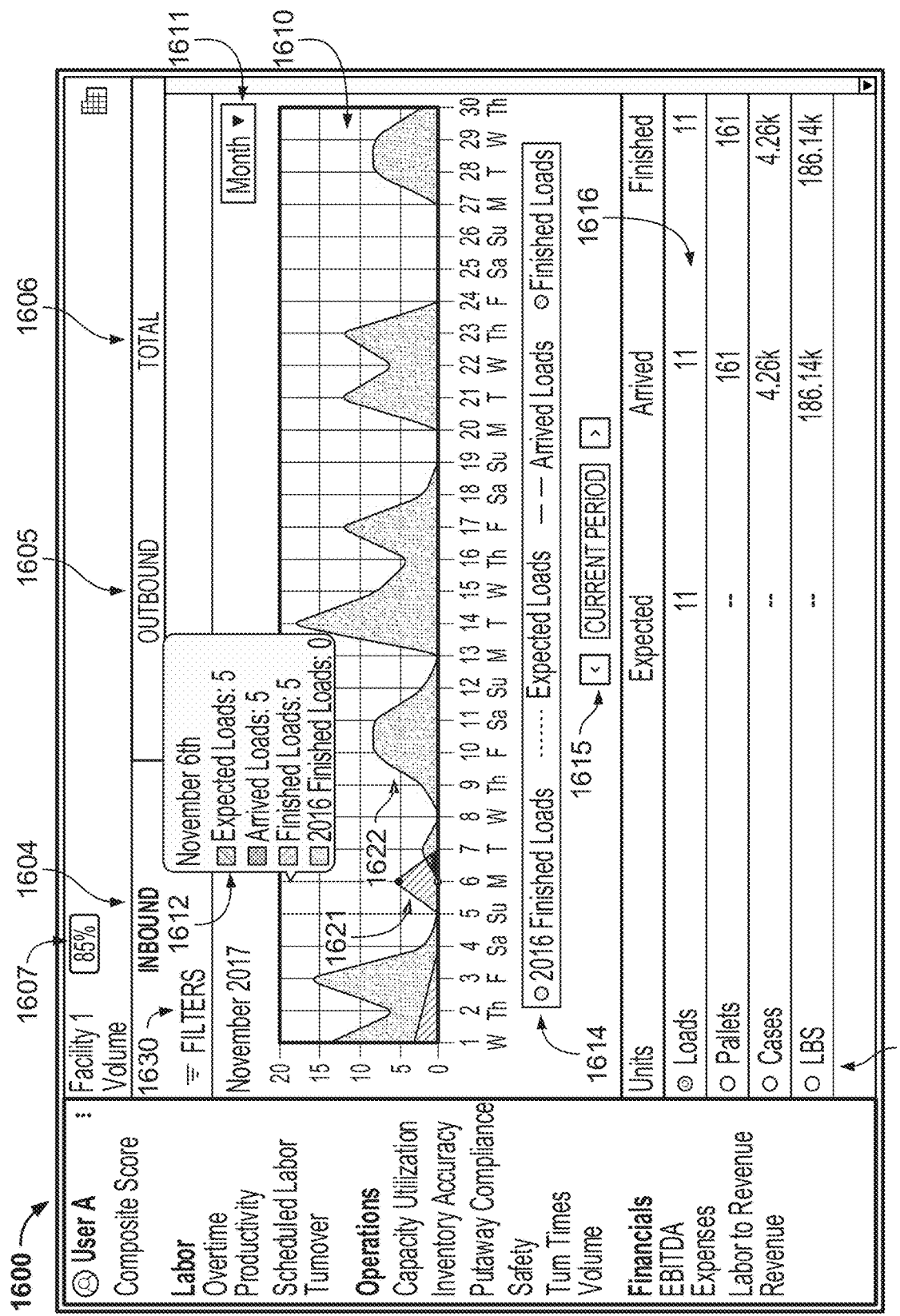
FIG. 16 depicts an example volume user interface in which data related to volume for a facility is presented.

FIG. 16 depicts an example volume user interface 1600 in which data related to volume for a facility is presented. The volume user interface 1600 can be used to view data related to expected loads to arrive at the facility, actual loads that have arrived at the facility, and the number of finished loads at the facility (e.g., the number of loads that have been closed and are ready for invoicing). The volume user interface 1600 also presents a current composite score indicator 1607 of the facility.

The volume user interface 1600 includes three tabs 1604-1606. The tab 1604, when selected, causes the client device to present volume data for inbound loads. Similarly, the tab 1605, when selected, causes the client device to present volume data for outbound loads and the tab 1606, when selected, causes the client device to present total volume data for inbound and outbound loads combined. Each tab can present the data similarly, e.g., using the same graph and table.

The volume user interface 1600 includes a graph 1610 that presents volume data for the facility for each day of a month. In other examples, the graph 1610 can present the data for each day of the week, each month of the year, or another appropriate time period. The graph 1610 includes a solid line 1621 that represents the number of arrived loads and a dashed line (that tracks the solid line in this example but may differ in other examples) that represents the number of expected loads for each day of the current month of the current year, 2017 in this example. The graph 1610 also includes shading under the solid line 1621 that represents the number of finished loads. The graph also includes shading 1622 that represents the number of finished loads for each day in the same month for the previous year, e.g., 2016 in this example.

The graph 1610 also includes a value element 1612 that presents the actual values for a day, e.g., a day that has been hovered over by a pointer. In this example, the value element 1612 presents the number of expected loads, the number of arrived loads, and the number of finished loads for Nov. 6, 2017. The value element 1612 also presents the number of finished loads for Nov. 6, 2016. The graph 1610 can also present volume data in terms of other units than loads, e.g., pallets, cases, or pounds of product in response to user interaction with a volume type selector element 1625, as described below.

The graph 1610 also includes a timing view selector element 1611, which is similar to the timing view selector elements described above. The timing view selector element 1611 allows a user to request the volume data be presented on a different time basis, e.g., for a week or for a year. If data for a week is selected, the client device can update the graph 1610 to present volume data for each day of the current week. Similarly, if the data for a year is selected, the client device can update the graph 1510 to present volume data for each month of the year.

The graph 1610 also includes a legend 1614 and a time period selector element 1615 that allows a user to change the time period for which safety data is presented, similar to the time period selector elements described above.

The volume user interface 1600 also includes a volume data table 1616 that presents data related to volume for the facility. For example, the volume data table 1616 presents the number of expected units, the number of arrived units, and the number of finished units in terms of loads, pallets, cases, and pounds.

The volume data table 1616 includes the volume type selector element 1625. The volume type selector element 1625 allows a user to view the graph 1610 in terms of loads, pallets, cases, or pounds. For example, selection of the radio button for pallets can cause the client device to update the graph 1610 to present the volume data in terms of pallets rather than loads.

The volume user interface 1600 also includes a filter element 1630. The filter element 1630 allows a user to filter the volume data that is presented in the volume user interface 1600 based on a parameter, e.g., based on a customer. For example, a user may want to view the volume data for a particular customer that stores products at the facility.

Figure 17:
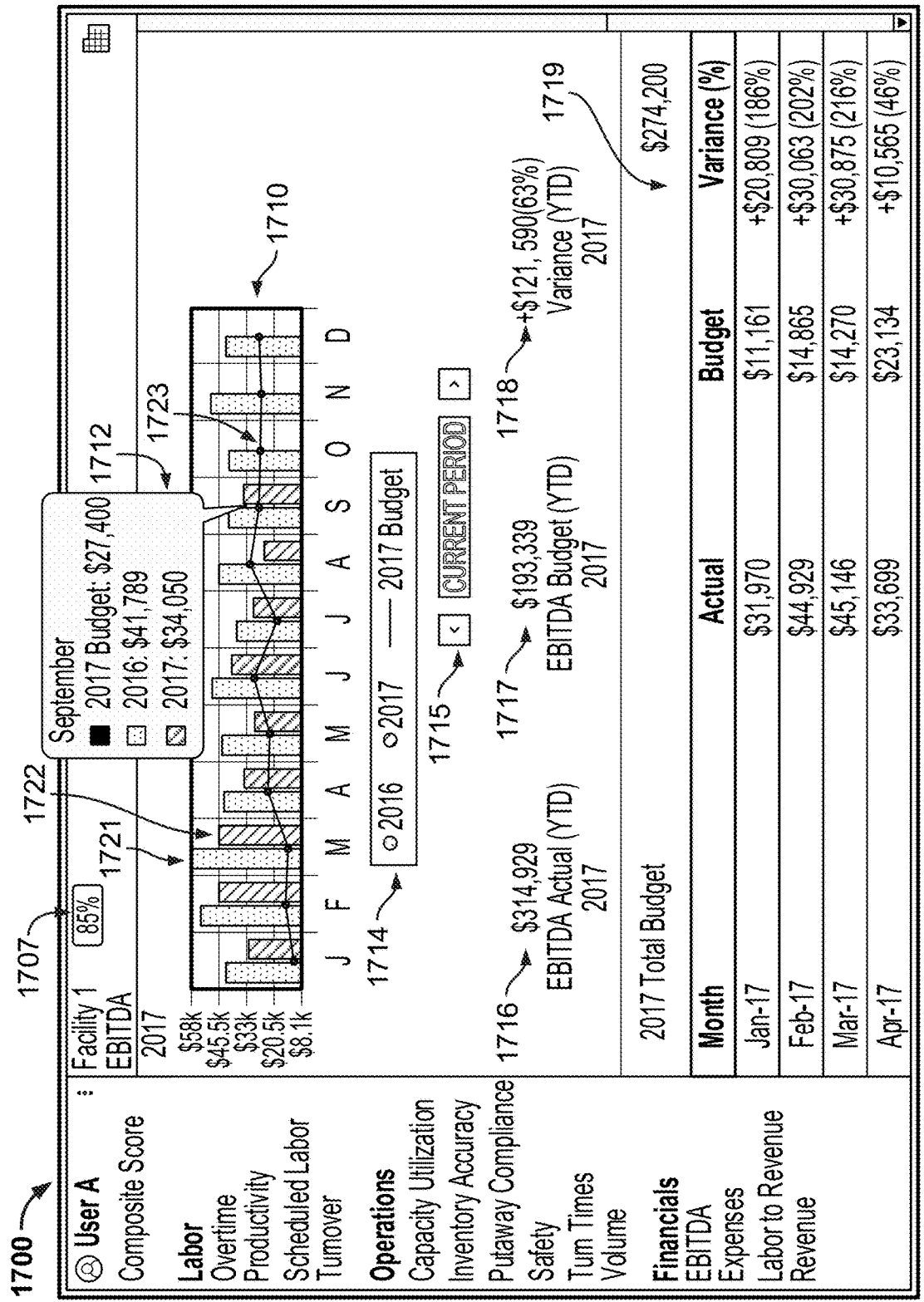
FIG. 17 depicts an example performance user interface in which data related to performance of a facility is presented.

FIG. 17 depicts an example performance user interface 1700 in which data related to performance of a facility is presented. In this example, the performance is presented in terms of EBITDA. The performance user interface 1700 can be used to view operating performance for the facility. As described above, the performance can be used as a metric in determining the composite score for the facility, as shown in a current composite score indicator 1707.

The performance user interface 1700 includes a graph 1710 that presents performance data for the facility for each month of a year. In other examples, the graph 1710 can present the data for each day of the week, each day of the month, or another appropriate time period. The graph 1710 includes, for each month, a first bar 1721 that represents the EBITDA for the month in the previous year (2016 in this example) and a second bar 1722 that represents the EBITDA for the month in the current year (2017 in this example). The graph 1710 also includes a line that represents the budgeted EBITDA for each month during the current year.

The graph 1710 also includes a legend 1714 and a time period selector element 1715 that allows a user to change the time period for which safety data is presented, similar to the time period selector elements described above. The graph 1710 also includes a value element 1712 that presents the actual values of the EBITDA for a month, e.g., a month that has been hovered over by a pointer.

The performance user interface 1700 also includes a year-to-date actual EBITDA value element 1716 that presents the year-to-date actual EBITDA for the facility. The performance user interface 1700 also includes a year-to-date budgeted EBITDA value element 1717 that presents the year-to-date budgeted EBITDA for the facility. The performance user interface 1700 also includes a variance value element 1718 that presents the variance between the year-to-date budgeted EBITDA and the year-to-date actual EBITDA for the facility.

The performance user interface 1700 also includes a performance data table 1719 that presents performance data for the facility. The performance data table 1719 presents the current year budgeted EBITDA for the facility, the actual EBITDA for each month, the budgeted EBITDA for each month, and the variance between the budgeted and actual EBITDA for each month.

Figure 18:
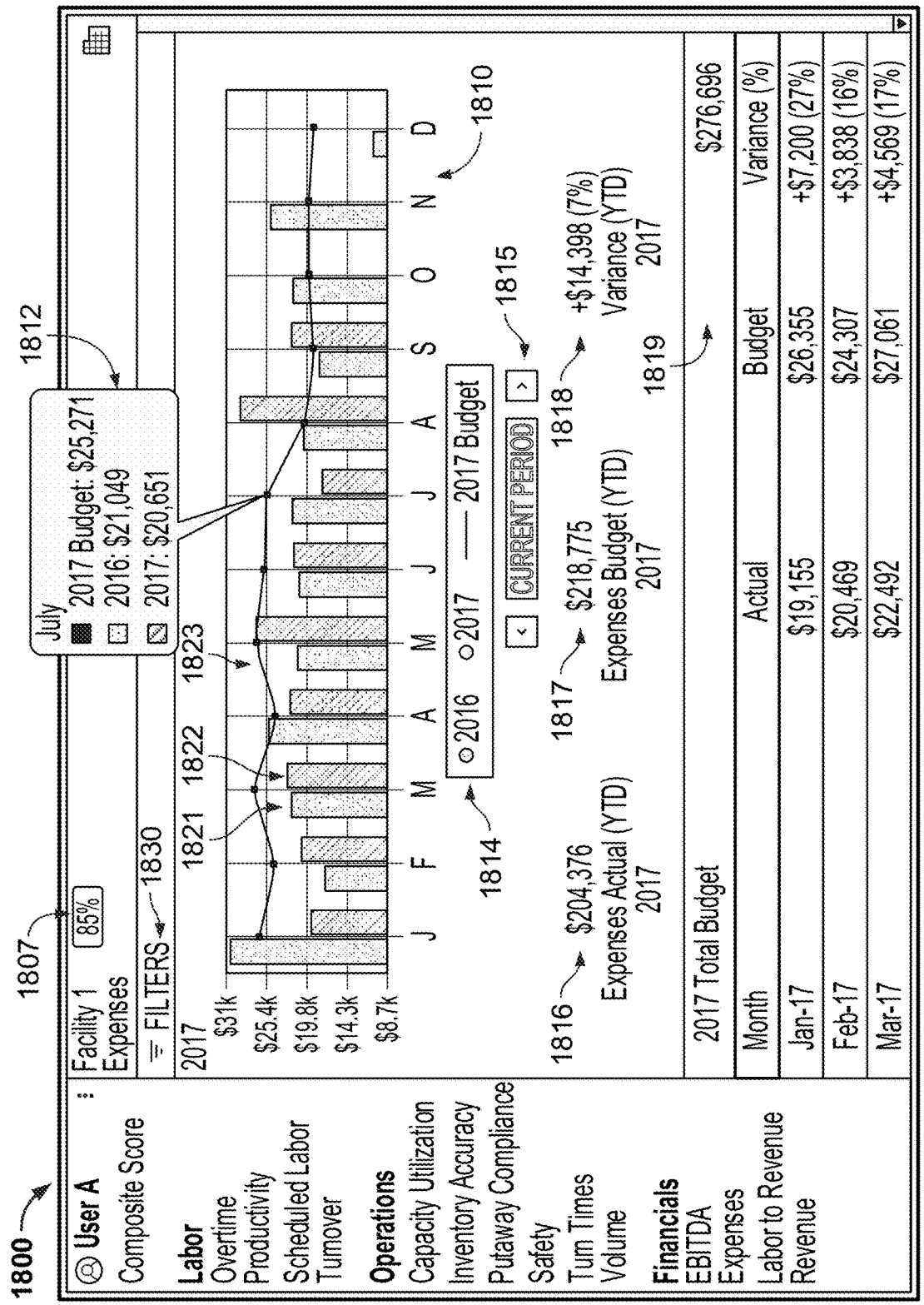
FIG. 18 depicts an example expenses user interface in which data related to expenses for a facility is presented.

FIG. 18 depicts an example expenses user interface 1800 in which data related to expenses for a facility is presented. The expenses user interface 1800 allows a user to view a facility's expenses for various time periods. The expenses user interface 1800 also presents a current composite score indicator 1807 for the facility.

The expenses user interface 1800 includes a graph 1810 that presents expenses data for the facility for each month of a year. In other examples, the graph 1810 can present the data for each day of the week, each day of the month, or another appropriate time period. The graph 1810 includes, for each month, a first bar 1821 that represents the expenses for the month in the previous year (2016 in this example) and a second bar 1822 that represents the expenses for the month in the current year (2017) in this example. The graph 1810 also includes a line 1823 that represents the budgeted expenses for each month.

The graph 1810 also includes a legend 1814 and a time period selector element 1815 that allows a user to change the time period for which expenses data is presented, similar to the time period selector elements described above. The graph 1810 also includes a value element 1812 that presents the actual values of the expenses data for a month, e.g., a month that has been hovered over by a pointer.

The expenses user interface 1800 also includes a year-to-date expenses value element 1816 that presents the actual year-to-date expenses for the facility. The expenses user interface 1800 also includes a year-to-date budgeted expenses value element 1817 that presents the year-to-date budgeted expenses for the facility. The expenses user interface 1800 also includes a year-to-date variance value element 1818 that presents the variance between the year-to-date budgeted expenses and the year-to-date actual expenses for the facility.

The expenses user interface 1800 also includes an expenses data table 1819 that presents expenses data for the facility. For example, the expenses data table 1819 presents the total budget for the facility for the year and, for each month, the actual expenses, the budgeted expenses, and the variance between the budgeted and actual expenses.

The expenses user interface 1800 also includes a filter element 1830. The filter element 1830 allows a user to filter the expenses data presented in the expenses user interface 1800 based on a parameter, e.g., based on a category of expenses. For example, a user may want to view data related to labor expenses or utilities expenses.

Figure 19:
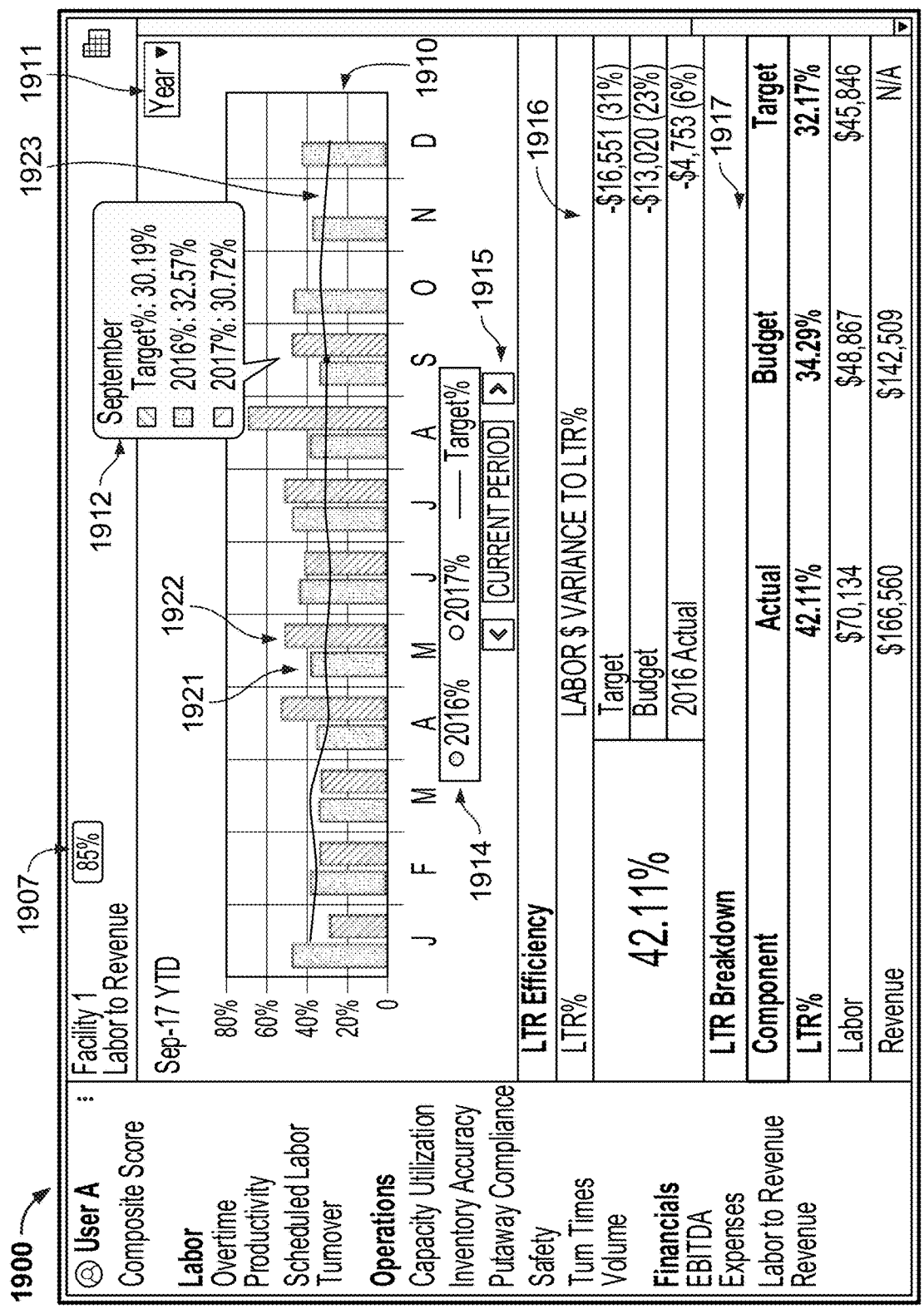
FIG. 19 depicts an example labor and revenue user interface in which data related to labor and revenue for a facility is presented.

FIG. 19 depicts an example labor and revenue user interface 1900 in which data related to labor and revenue for a facility is presented. The labor and revenue user interface 1900 presents data related to the cost of labor relative to the amount of revenue for the facility, e.g., as a percentage of the revenue. The labor and revenue user interface 1900 also presents a current composite score indicator 1907 for the facility.

The labor and revenue user interface 1900 also includes a graph 1910 that presents the labor to revenue (LTR) percentage (e.g., labor cost/revenue) for each month of the year. In other examples, the graph 1910 can present the data for each day of the week, each day of the month, or another appropriate time period. The graph 1910 includes, for each month, a first bar 1921 that represents the LTR percentage for the month in the previous year and a second bar 1922 that represents the LTR percentage for the month in the current year. The graph 1910 also includes a line 1923 that represents the target year-to-date LTR percentage at each month.

The graph 1920 also includes a timing view selector element 1911, which is similar to the timing view selector elements described above. The timing view selector element 1911 allows a user to request the LTR data be presented on a different time basis, e.g., for a week or for a month. If data for a week is selected, the client device can update the graph 1910 to present LTR data for each day of the current week. Similarly, if the data for a month is selected, the client device can update the graph 1910 to present LTR data for each day of the month.

The graph 1910 also includes a legend 1914 and a time period selector element 1915 that allows a user to change the time period for which LTR data is presented, similar to the time period selector elements described above. The graph 1910 also includes a value element 1912 that presents the actual values of the LTR data for a month, e.g., a month that has been hovered over by a pointer.

The labor and revenue user interface 1900 also includes an LTR efficiency table 1916 that presents data related to LTR efficiency for the facility. The LTR efficiency table 1916 presents the year-to-date LTR for the facility, a variance between the actual year-to-date LTR and the target year-to-date LTR for the facility, a variance between the actual year-to-date LRT for the facility and the budgeted LTR for the facility, and a variance between the current year's actual year-to-date LTR and the previous year's actual LTR. The variances are expressed in terms of dollars and percentage.

The labor and revenue user interface 1900 also includes and LTR breakdown table 1917 that presents a breakdown of labor and revenue numbers for the facility's LTR. For example, the LTR breakdown table 1917 presents the year-to-date actual, budgeted, and target LTR values, labor values, and revenue values for the facility.

Figure 20:
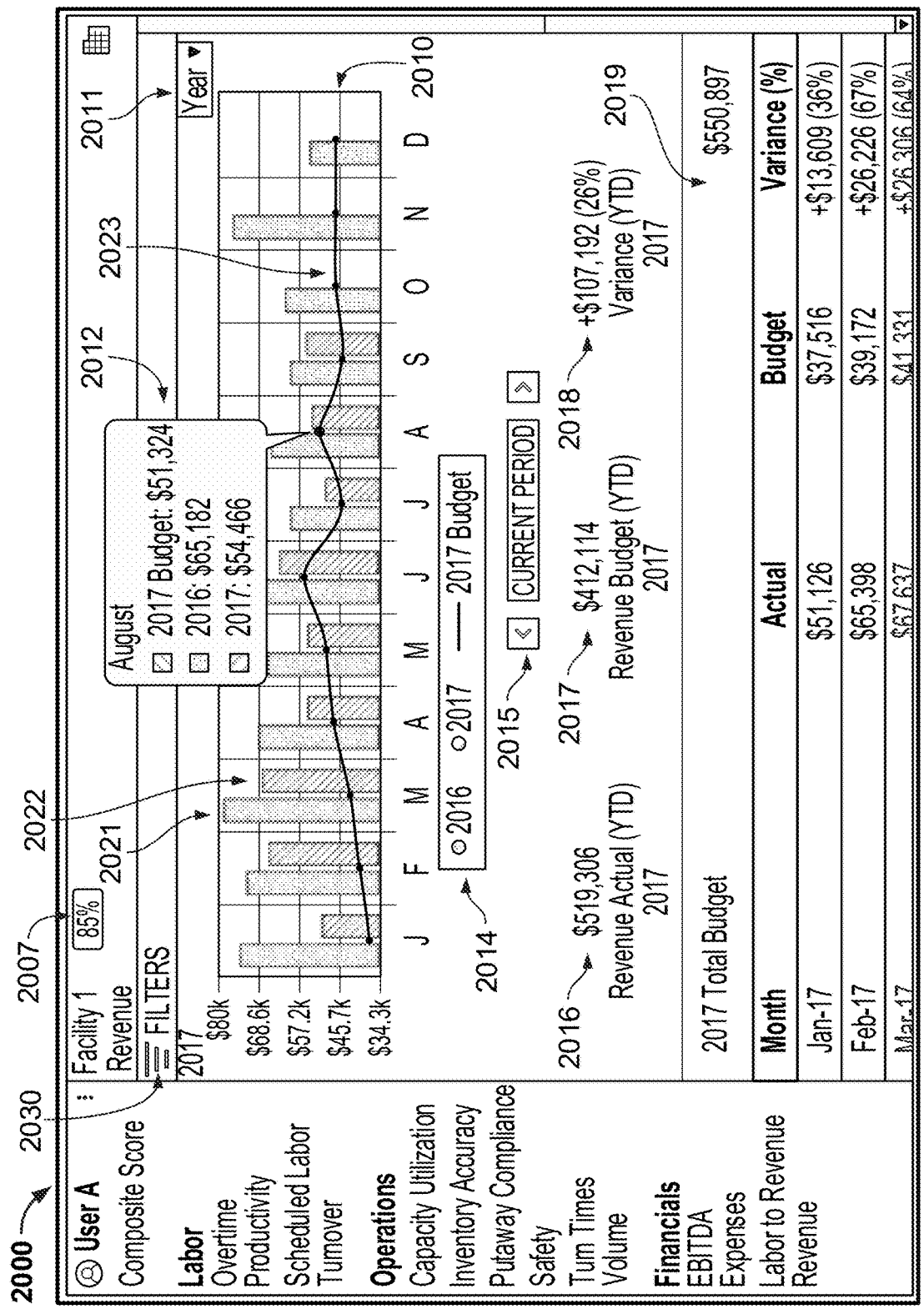
FIG. 20 depicts an example revenue user interface in which data related to revenue for a facility is presented.

FIG. 20 depicts an example revenue user interface 2000 in which data related to revenue for a facility is presented. The revenue user interface 2000 allows a user to view a facility's revenue for various time periods. The revenue user interface 2000 also presents a current composite score indicator 2007 for the facility.

The revenue user interface 2000 includes a graph 2010 that presents revenue data for the facility for each month of a year. In other examples, the graph 2010 can present the data for each day of the week, each day of the month, or another appropriate time period. The graph 2010 includes, for each month, a first bar 2021 that represents the revenue for the month in the previous year (2016 in this example) and a second bar 2022 that represents the revenue for the month in the current year (2017) in this example. The graph 2010 also includes a line 2023 that represents the budgeted revenue for each month.

The graph 2010 also includes a legend 2014 and a time period selector element 2015 that allows a user to change the time period for which revenue data is presented, similar to the time period selector elements described above. The graph 2010 also includes a value element 2012 that presents the actual values of the revenue data for a month, e.g., a month that has been hovered over by a pointer.

The expenses user interface 2000 also includes a year-to-date revenue value element 2016 that presents the actual year-to-date revenue for the facility. The revenue user interface 2000 also includes a year-to-date budgeted revenue value element 2017 that presents the year-to-date budgeted revenue for the facility. The revenue user interface 2000 also includes a year-to-date variance value element 2018 that presents the variance between the year-to-date budgeted revenue and the year-to-date actual revenue for the facility.

The expenses user interface 2000 also includes a revenue data table 2019 that presents revenue data for the facility. For example, the revenue data table 2019 presents the total budget for the facility for the year and, for each month, the actual revenue, the budgeted revenue, and the variance between the budgeted and actual revenue.

The revenue user interface 2000 also includes a filter element 2030. The filter element 2030 allows a user to filter the revenue data presented in the revenue user interface 2000 based on a parameter, e.g., based on a category of revenue. For example, a user may want to view data related to revenue for freezing products or revenue for storing products.

Figure 21:
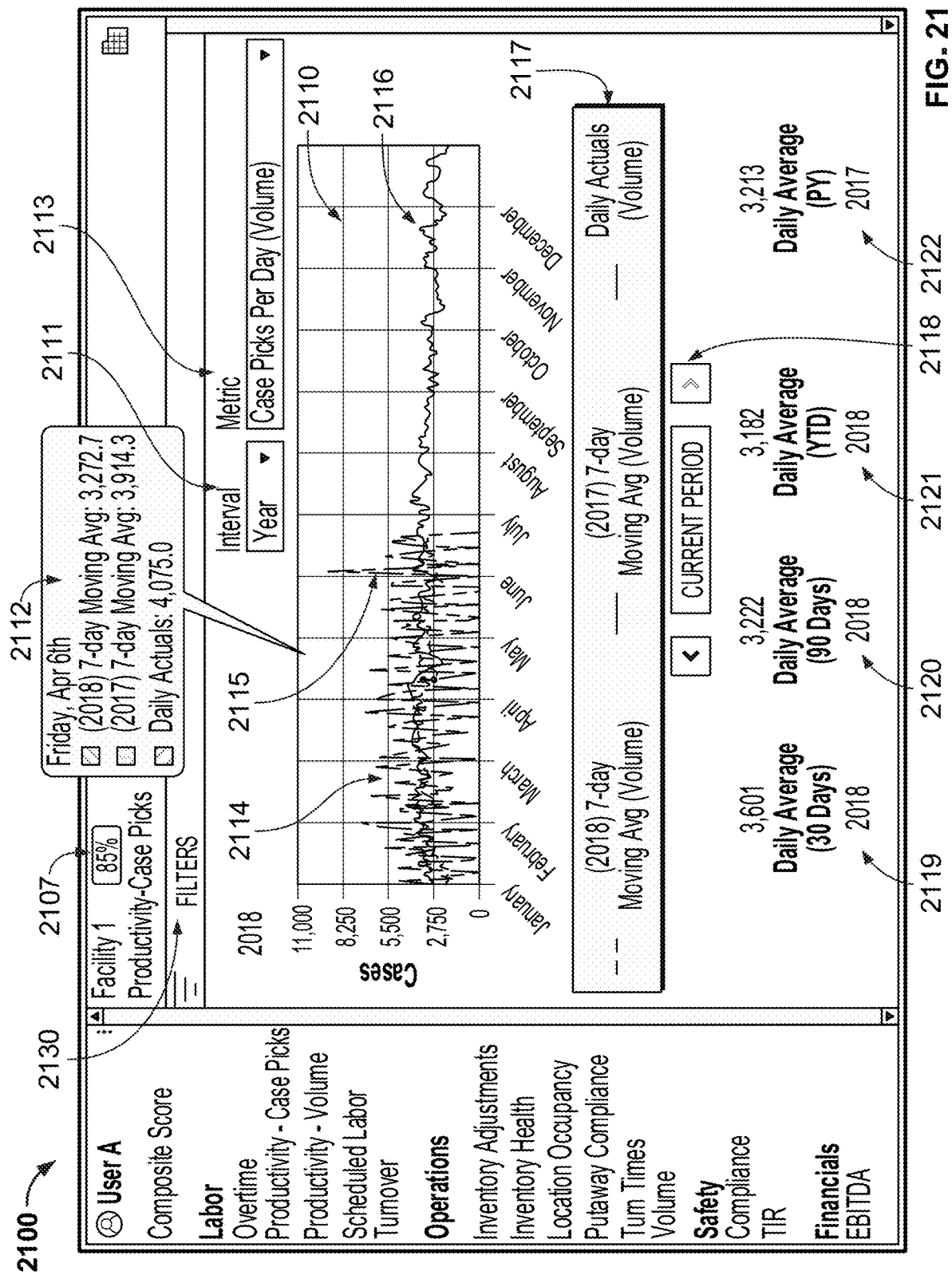
FIG. 21 depicts an example case pick productivity user interface in which data related to case pick productivity for a facility is presented.

FIG. 21 depicts an example case pick productivity user interface 2100 in which data related to case pick productivity for a facility is presented. The case pick productivity user interface 2100 allows a user to view the productivity of the facility in terms of the number of cases picked. The revenue user interface 2100 also presents a current composite score indicator 2107 for the facility.

The case pick productivity user interface 2100 includes a graph 2110 that presents the number of cases picked per day over course of the current year. The graph 2110 is a line graph that includes a first line 2114 that represents the number of cases picked each day, a second line 2115 that represents the seven day moving average as of each day, and a third line 2116 that represents the seven day moving average as of each day for the previous year.

The case pick productivity user interface 2100 also includes a timing view selector element 2111, which is similar to the timing view selector elements described above. The timing view selector element 2111 allows a user to request the view a similar graph for the current week. In the weekly view, the graph 2110 can present the a line graph that includes a first line that represents the number of cases picked each hour, a second line that represents the 24 hour average as of each hour, and a third line that represents the 24 hour moving average as of each hour for the previous week.

The case pick productivity user interface 2100 also includes a metric selector element that allows the user to view a graph of different metrics, such as the number of cases picked in terms of headcount rather than volume, or the number of lines picked rather than the number of cases. Selection of a different metric results in an update to the graph 2110 to present lines for the selected metric.

The graph 2110 also includes a legend 2117 and a time period selector element 2118 that allows a user to change the time period for which case pick productivity data is presented, similar to the time period selector elements described above. The graph 2110 also includes a value element 2112 that presents the actual values of the case pick productivity data for a day, e.g., a day that has been hovered over by a pointer.

The case pick productivity user interface 2100 also presents a summary of information at the bottom. The summary includes a 30-day average element 2119 that presents the average number of cases picked per day over the previous 30 days, a 90-day average element 2120 that presents the average number of cases picked per day over the previous 90 days, a year-to-date average element 2121 that presents the average number of cases picked per day over the course of the current year, and a last year average element 2122 that presents the average number of cases picked per day over the course of the previous year. The type of data presented in the summary can also be updated if the metric is changed or the time period is changed. For example, the summary can present per-hour averages when data for a week is presented.

The case pick productivity user interface 2100 also includes a filter element 2130 that allows the user to requests filtered data. For example, the filter element 2130 can allow the user to view case pick productivity data for a particular customer.

Figure 22:
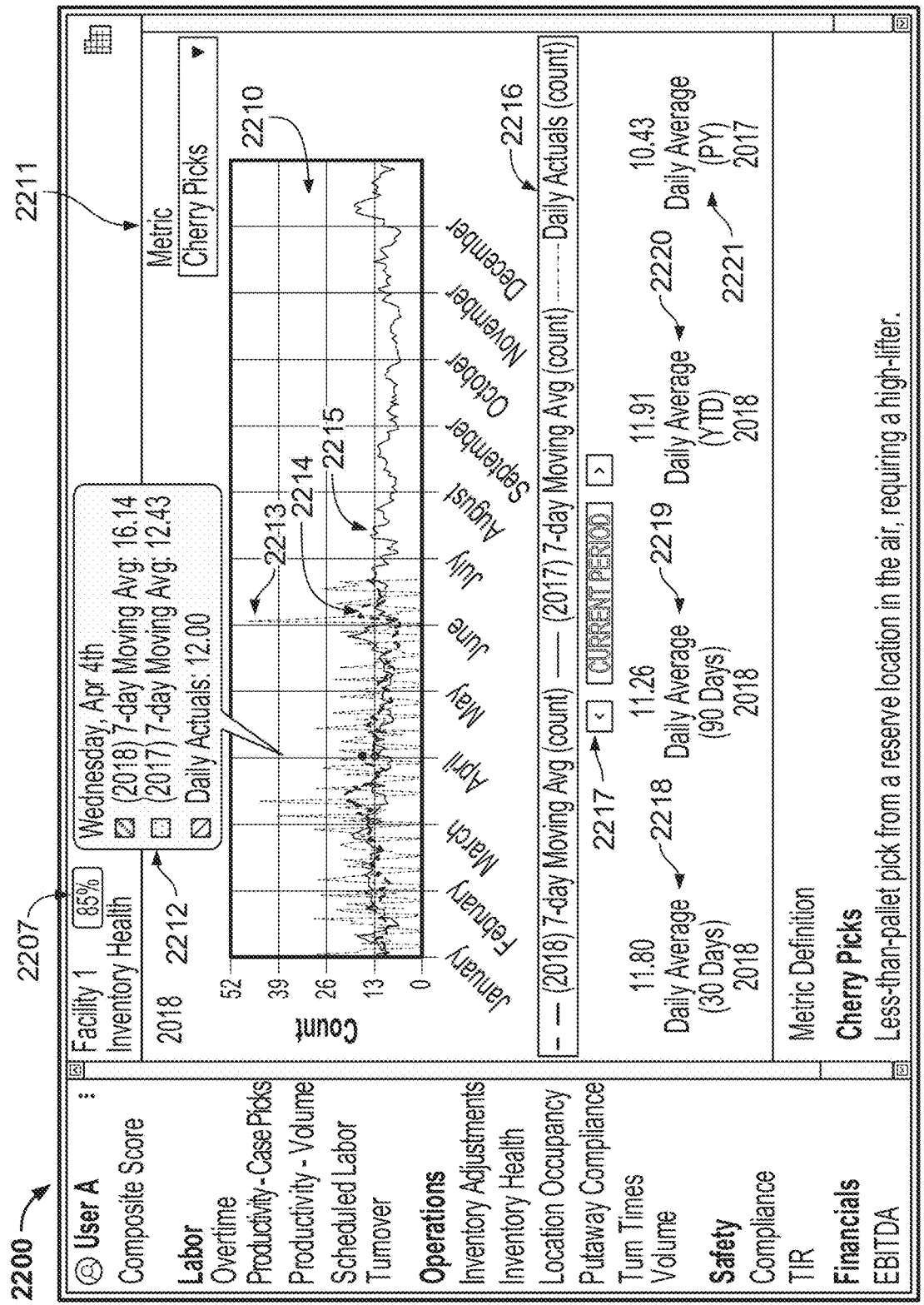
FIG. 22 depicts an example inventory health user interface in which data related to inventory health for a facility is presented.

FIG. 22 depicts an example inventory health user interface 2200 in which data related to inventory health for a facility is presented. The inventory health user interface 2200 allows a user to view the overall inventory health of a facility. The inventory health user interface 2200 also presents a current composite score indicator 2207 for the facility.

The inventory health user interface 2200 can present various metrics related to the inventory health of a facility. These metrics can include a number of cherry picks (e.g., a number of times less than a full pallet is picked from a reserve location in the air requiring a high-lifter), a number of count back audits (e.g., a number times an operator sent to case-pick reports a mismatch between expected and actual cases on the pallet), a number of non-found pallets (e.g., a number of times a high-lifter sent to retrieve full pallet cannot locate pallet in system-directed location), a number of inquiries (e.g., a number of times someone makes a special request to check the history of a pallet), a number of backorder requests (e.g., a number of times a case-picker signals that they cannot continue because insufficient cases are in the pick location to pick order line), transaction throughout (e.g., a number of activities such as receiving, picking, loading, etc. occurring in the warehouse), wait for drop time (e.g., the duration of time spent, in minutes or another appropriate time period, by case-picker waiting for product to drop in the pick line), and/or waiting for drop time (e.g., a number of times the system tells a case-picker to stop because insufficient product has been dropped into the pick line).

The inventory health user interface 2200 includes a graph 2210 and a metric selector element 2211 that allows the user to select between the metrics for which to view data in the graph 2210. In the illustrated example, the graph 2210 is a line graph that presents the number of cherry picks over the course of the year. In particular, the graph includes a first line 2213 that represents the number of cherry picks each day, a second line 2214 that represents the 7-day moving average number of cherry picks for the previous 7 days as of that day, and a third line 2215 that represents the 7-day moving average number of cherry picks for the previous 7 days as of that day the previous year. The same counts can be presented in the graph 2210 for each other metric in response to selection of the metric using the metric selector element 2211.

The graph 2210 also includes a legend 2216 and a time period selector element 2217 that allows a user to change the time period for which case pick productivity data is presented, similar to the time period selector elements described above. The graph 2210 also includes a value element 2212 that presents the actual values of the metric for each day, e.g., a day that has been hovered over by a pointer.

The inventory health user interface 2200 also presents a summary of information at the bottom. The summary includes a 30-day average element 2218 that presents the per-day average of the metric over the previous 30 days, a 90-day average element 2219 that presents the per-day average of the metric over the previous 90 days, a year-to-date average element 2220 that presents the per-day average of the metric over the course of the current year, and a last year average element 2221 that presents the per-day average of the metric over the course of the previous year. The inventory health user interface 2200 also includes a definition of the metric for which data is presented under the summary.

Figure 23:
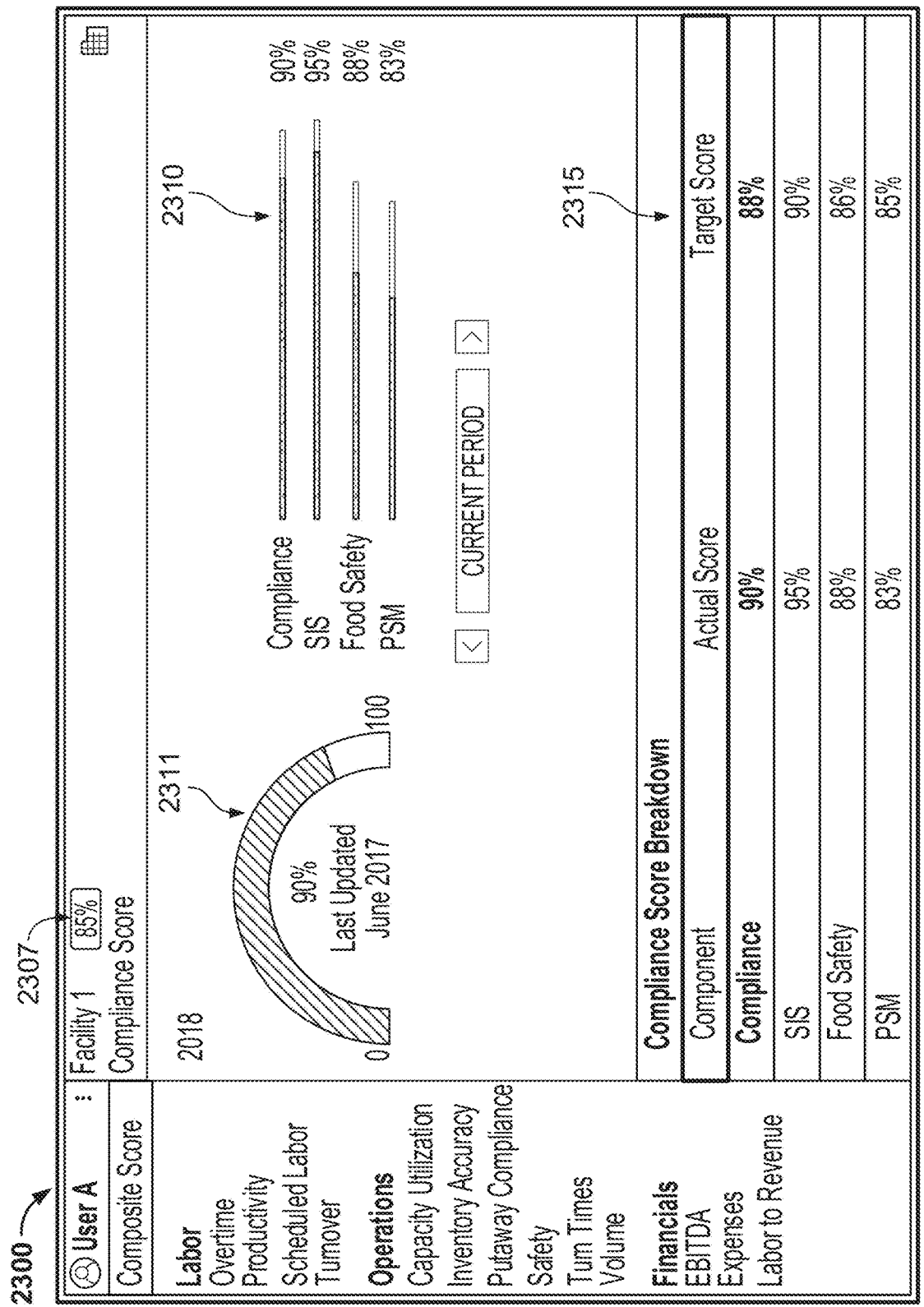
FIG. 23 depicts an example safety compliance user interface in which data related to safety compliance for a facility is presented.

FIG. 23 depicts an example safety compliance user interface 2300 in which data related to safety compliance for a facility is presented. The safety compliance user interface 2300 allows users to view an overall compliance score the facility and a breakdown of the individual scores that make up the overall compliance score. The safety compliance user interface 2300 also presents a current composite score indicator 2307 for the facility.

The safety compliance user interface 2300 includes an overall compliance score indicator 2311 that indicates the current overall compliance score for the facility. The safety compliance user interface 2300 also includes a bar graph 2310 that includes a bar for the overall compliance score and a respective bar for each individual scores. In this example, the individual scores include a safety inspection system (SIS) score (e.g., based on an inspector's scoring of the facility during an audit), a food safety score, and a process safety metric (PSM) score. The overall compliance score can be an average (e.g., weighted or unweighted average) of the individual scores. The safety compliance user interface 2300 also includes a breakdown table 2315 that presents the actual and target values of the overall compliance score and the individual scores that make up the overall compliance score.

Figure 24:
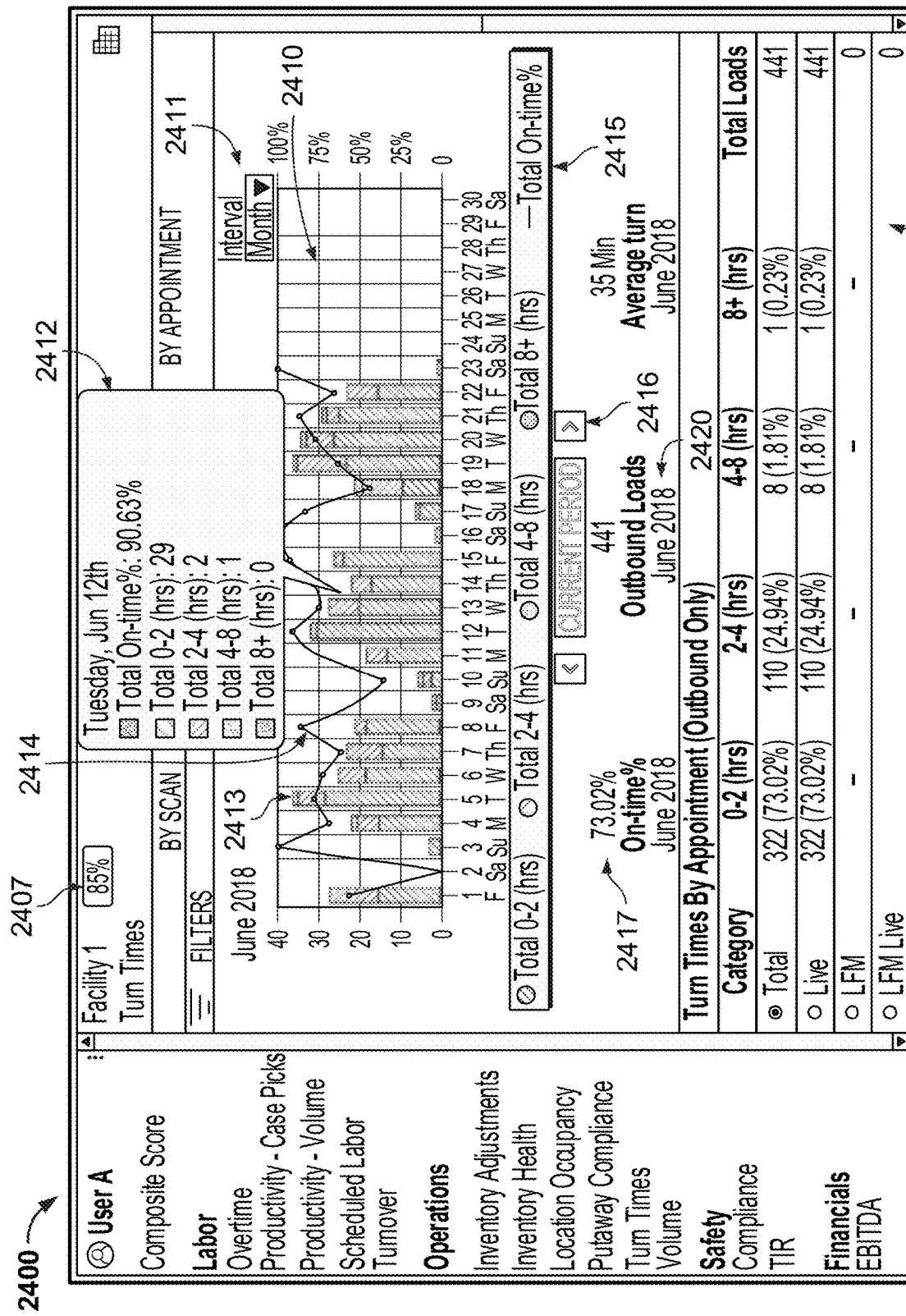
FIG. 24 depicts an example turn time by appointment user interface in which data related to turn times for a facility is presented.

FIG. 24 depicts an example turn time by appointment user interface 2400 in which data related to turn times for a facility is presented. The turn time by appointment user interface 2400 presents additional turn time data in addition to the turn time data presented in the turn time user interface 1500 of FIG. 5. The turn time by appointment user interface 2400 also presents a current composite score indicator 2407 for the facility.

The turn time by appointment user interface 2400 includes a graph 2410 that presents, for each day of the month, a bar 2413 that indicates the number of trucks that were turned within several time periods (e.g., 0-2 hours, 2-4 hours, 4-8 hours, and 8+ hours). The total size of a bar can represent the total number of trucks for that day. The bar can be color coded such that the number of trucks turned within each time period is shown by the bar. For example, the bottom of the bar for each day that had at least one truck turned within 0-2 hours can be colored a first color and be sized based on the number of trucks turned within 0-2 hours. Similarly, a second color can be used to represent the number or trucks turned within 2-4 hours can be presented above the portion of the bar for the number of trucks turned within 0-2 hours, and so on for the other time periods.

The graph 2410 also includes a line 2414 that represents the percentage of trucks turned on time for each day of the month. The graph 2410 also includes a value element 2412 that presents the number of trucks turned for each time period and the percentage of trucks turned on time for a day, e.g., a day hovered over by a pointer.

The graph 2410 also includes a timing view selector element 2411, which is similar to the timing view selector elements described above. The timing view selector element 2411 allows a user to request the view a similar graph for a week, a year, or another appropriate time period.

The graph 2410 also includes a legend 2115 and a time period selector element 2416 that allows a user to change the time period for which turn time data is presented, similar to the time period selector elements described above. The graph 2410 also includes a value element 2412 that presents the actual values of the turn time data for a day, e.g., a day that has been hovered over by a pointer.

The turn time by appointment user interface 2400 also presents a summary of information below the graph 2410. The summary includes a on time percentage element 2417 that presents the percentage of trucks that were turned on time during the month being viewed, an outbounds load element 2418 that presents the number of outbound loads for the month, and an average turn time element 2419 that presents the average time taken to turn a truck during the month.

The turn time by appointment user interface 2400 also includes a table 2420 that presents the total number of trucks that were turned within various time periods, the number of live trucks (e.g., that arrive and leave with their trailers) that were turned within the various time periods, a number of LFM trucks that were turned within the various time periods, and the number of LFM live trucks that were turned within the various time periods.

The turn times by appointment can be computed differently from the turn times presented in FIG. 15. For example, if the truck arrives within 30 minutes of its appointment, the start time may be the actual arrival time and the finish time may be the sign out time. If the truck arrives earlier than the appointment time, the start time may be the appointment time and the finish time may be the sign out time. If the truck arrives later than the appointment, the starter time may be the actual start time and the finish time may be the sign out time.

Figure 25:
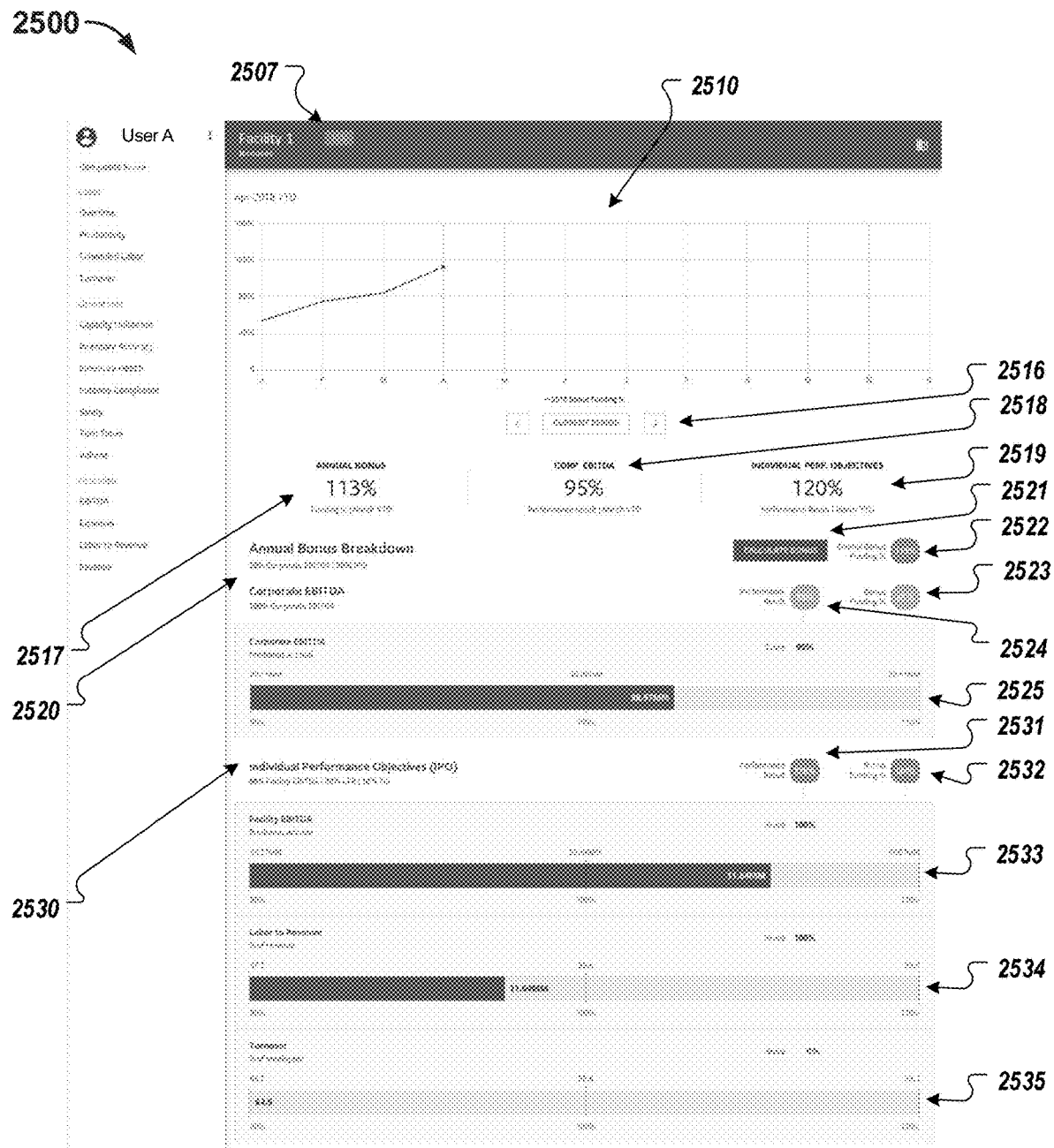
FIG. 25 depicts an example bonus user interface in which data related to an employee's bonus is presented.

FIG. 25 depicts an example bonus user interface 2500 in which data related to an employee's bonus is presented. In this example, an employee's year end bonus can be based on metrics related to the performance of the corporation and the performance of the employee. The performance of the employee can be based on performance metrics of the facility in which the employee works. The bonus user interface 2500 presents these metrics and their effect on the employee's bonus. Using this interface 2500, an employee can track the expected amount, e.g., based on the percentage of a target bonus, and determine what metrics might be improved to improve the bonus amount.

The bonus user interface 2500 presents a current composite score indicator 2507 for the facility in which the employee works. The bonus user interface 2500 also includes a bonus graph 2510 that depicts the year to date expected percentage of the target bonus at each month of the year. For example, the value at each month is the percentage of the bonus the employee would receive if the year ended that month.

The bonus user interface 2500 also includes also a time period selector element 2516 that allows a user to change the time period for which bonus data is presented, similar to the time period selector elements described above. The bonus user interface 2500 also includes a bonus percentage element 2517 that presents the year to date percentage for the employee's bonus as of the time period, e.g., month, selected using the time period selector element 2516.

The bonus user interface 2500 also includes a corporate performance element 2518 that presents the year to date corporate performance metric that is used to determine the employee's bonus percentage as of the time period selected using the time period selector element 2516. In this example, the corporation's EBITDA is used as the corporate performance metric.

The bonus user interface 2500 also includes an employee performance element 2519 that presents the year to date employee performance metric that is used to determine the employee's bonus as of the time period selected using the time period selector element 2516. In this example, the employee performance metric is based on the EBITDA of the facility in which the employee works, the LTR of the facility, and the employee turnover at the facility.

Figure 26:
FIG. 26 depicts an example bonus calculator user interface.

The bonus user interface 2500 also includes a calculate bonus button 2521 that, when selected, causes the facility data management system to present the bonus calculator user interface 2600 of FIG. 26. As described below, the bonus calculator user interface 2600 calculates an employee's bonus based on the metrics presented in FIG. 25 and the employee's salary and target bonus.

The bonus user interface 2500 also includes a corporate performance area 2520 that includes text describing the corporate performance metrics and a graph 2525 that indicates the corporate performance metric relative to values of the metric for bonus percentages between 90 and 110 percent. The graph 2525 shows how the current EBITDA of the facility falls in this bonus percentage range. The corporate performance area 2520 also includes a current corporate performance indicator 2524 that indicates the current corporate percentage used to determine the employee's bonus. The corporate performance area 2520 also includes a corporate bonus funding element 2523 that indicates the percentage of the employee's bonus based on the corporate performance that has been funded to date.

The bonus user interface 2500 also includes an employee performance area 2530 that includes text describing how the employee metrics affect the employee's bonus. The employee performance area 2530 also includes a current employee performance indicator 2531 that indicates the current employee percentage used to determine the employee's bonus, which is based on the EBITDA of the facility in which the employee works, the LTR of the facility, and the employee turnover at the facility. The employee performance area 2530 also includes an employee bonus funding element 2532 that indicates the percentage of the employee's bonus based on the employee performance that has been funded to date.

The employee performance area 2530 also includes an EBITDA graph 2533, an LTR graph 2534, and a turnover graph 2535. Each graph 2533-2525 shows the value of its respective metric with respect to the percentages of the bonus that correspond to the values.

FIG. 26 depicts an example bonus calculator user interface 2600. As described above, the bonus calculator user interface 2600 can be presented in response to user selection of the calculate bonus button 2521 of the bonus user interface 2500. The bonus calculator user interface 2600 can be presented in a pop up window over the bonus user interface 2500 of FIG. 25. The bonus calculator user interface 2600 enables an employee to enter information that is used to calculate a forecasted bonus amount. In particular, the bonus calculator user interface 2600 includes an estimated salary box 2602 in which employees can enter an estimated annual salary and a bonus target percentage box 2604 in which the employees can enter their bonus target percentage.

The bonus calculator user interface 2600 also includes a calculate button 2610 that, when selected, causes a calculator (e.g., a bonus calculator module of the facility data management system 110 of FIG. 1) to calculate an employee's forecasted bonus based on the information entered into the boxes 2602 and 2604 and the metrics used to determine the employee's bonus presented in FIG. 25 and described above.

The employee's forecasted bonus is presented in an estimated bonus element 2606. The bonus calculator user interface 2600 also includes an estimated total compensation element 2608 that presents the employee's estimated total compensation, which in this example is a sum of the employee's estimated salary and the forecasted bonus amount. The bonus calculator user interface 2600 also includes a clear button 2612 that, when selected by a user, clears the information in the boxes 2602 and 2604.

Figure 27:
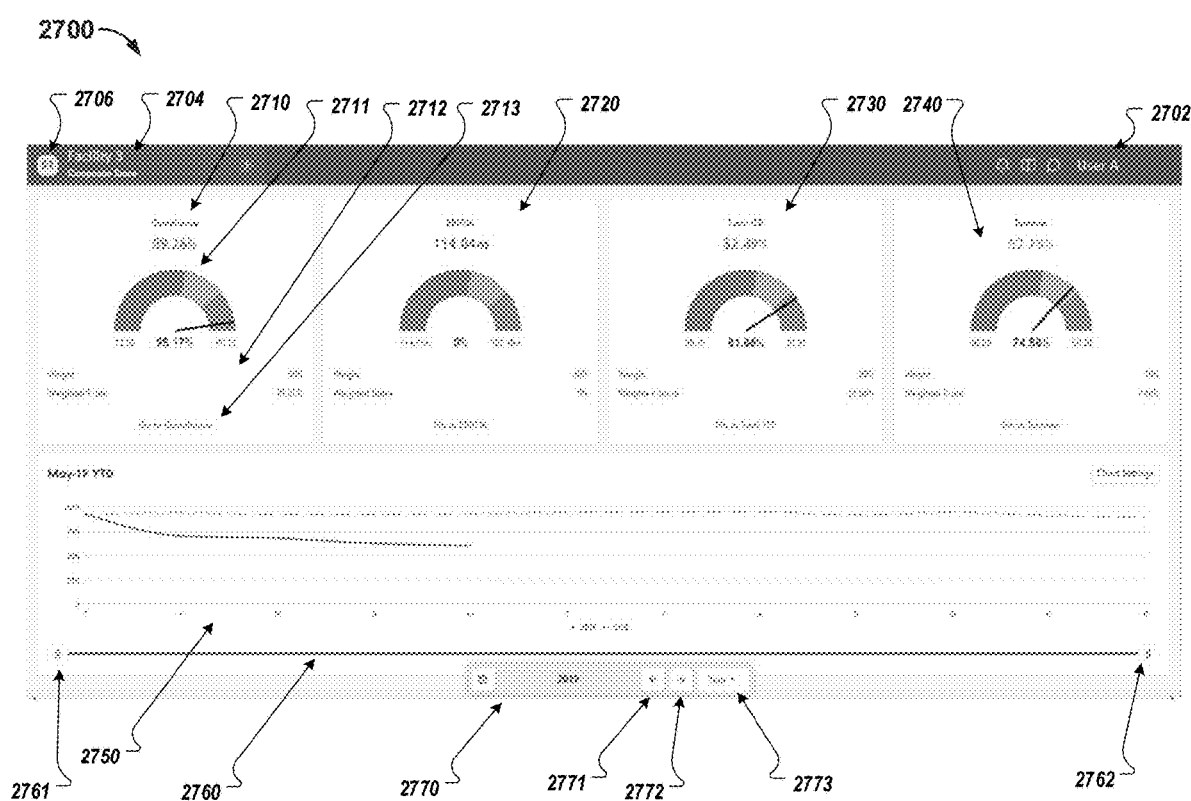
FIG. 27 depicts an example composite score user interface.

FIG. 27 depicts an example composite score user interface 2700. The composite score user interface 2700 presents information related to the composite score for a facility. The composite score user interface 2700 includes a user login element 2702 that displays the name of the user that is logged into the facility data management system and enables a user to login to the system, similar to the user login element 202 of FIG. 2. The composite score user interface 2700 also includes a facility identifier 2704 that identifies the name of the facility ("Facility 1") for which data is being presented. The composite score user interface 2700 also includes a composite score indicator 2706 that presents the current composite score for the facility, similar to the composite score indicator 206 of FIG. 2.

The composite score user interface 2700 includes display elements that present information for each metric that is used to compute the metric. In particular, the composite score user interface 2700 includes a putaway compliance display element 2710, a performance display element 2720, a total LTR display element 2730, and a turnover display element 2740.

The putaway compliance display element 2710 presents the putaway compliance value (89.26%) for the facility over a time period, which in this example is the year 2019 and can be changed using an interactive time selector control 2760 and a hovering interactive time selector control 2770 as described below. The putaway compliance display element 2710 also includes a dial user interface element 2711 that includes a target range for the putaway compliance for the facility and a needle indicator that indicates where the actual putaway compliance value for the facility falls within the target range. In this example, the target range is from 72.10% and 90.13% and the putaway compliance value is 95.17% of the goal of 90.13% shown on the right side of the dial user interface element 2711.

The dial user interface element 2711 can be color coded to show a good range of values for the putaway compliance (e.g., in green), an acceptable range of values (e.g., in yellow), and a bad range of values (e.g., in red). Of course, other colors or visual indicators (e.g., shading or hatching) can be used to show the various ranges.

The putaway compliance display element 2710 also presents composite score information 2712 that includes a weight of the putaway compliance on the composite score for the facility and a weighted score for the putaway compliance which is based on the putaway compliance value and the weight of the putaway compliance on the composite score for the facility. The putaway compliance display element 2710 also includes a link 2713 to a putaway compliance user interface that provides more detail about the facility's putaway compliance, e.g., the putaway compliance user interface 1200 of FIG. 12. The performance display element 2720, the total LTR display element 2730, and the turnover display element 2740 can each include similar elements and information for their respective metrics as the putaway compliance display element 2710.

The composite score user interface 2700 also includes a graph 2750 that shows the composite score for the facility over a given time period. In this example, the graph 2750 shows the composite score for each month of 2018 and each completed month of 2019.

A user can interact with the interactive time selector control 2760 and/or the hovering interactive time selector control 2770 to change the time period for which the elements 2710, 2720, 2730, and 2740 present information and the time period for the graph 2750. For example, the user can change the time period for which information is presented using the hovering interactive time selector control 2770. In this example, the hovering interactive time selector control 2770 indicates that the information being presented is for the year 2019. The user can select the right arrow 2772 to view information for the next year or the left arrow 2772 to view information for the previous year. The user can also select the drop down menu 2773 to change the type of time period, e.g., from yearly information to monthly information or weekly information. As described below with reference to FIGS. 30 and 31, the hovering interactive time selector control 2770 can hover over the rest of the user interface and remain in the same position when a user scrolls the user interface in either direction.

A user can interact with the interactive time selector control 2760 to view the data for a particular portion of the time period selected suing the hovering interactive time selector control 2770. For example, the user can select (e.g., by placing a cursor over and clicking a mouse button or touching on a touchscreen device) the left control 2761 and drag the left control 2761 left or right to adjust the start date for the information presented in the user interface 2700. Similarly, the user can select the right control 2762 and drag the right control 2762 left or right to adjust the start end for the information presented in the user interface 2700. The interactive time selector control 2760 is described in more detail with reference to FIGS. 28 and 29.

Figure 28:
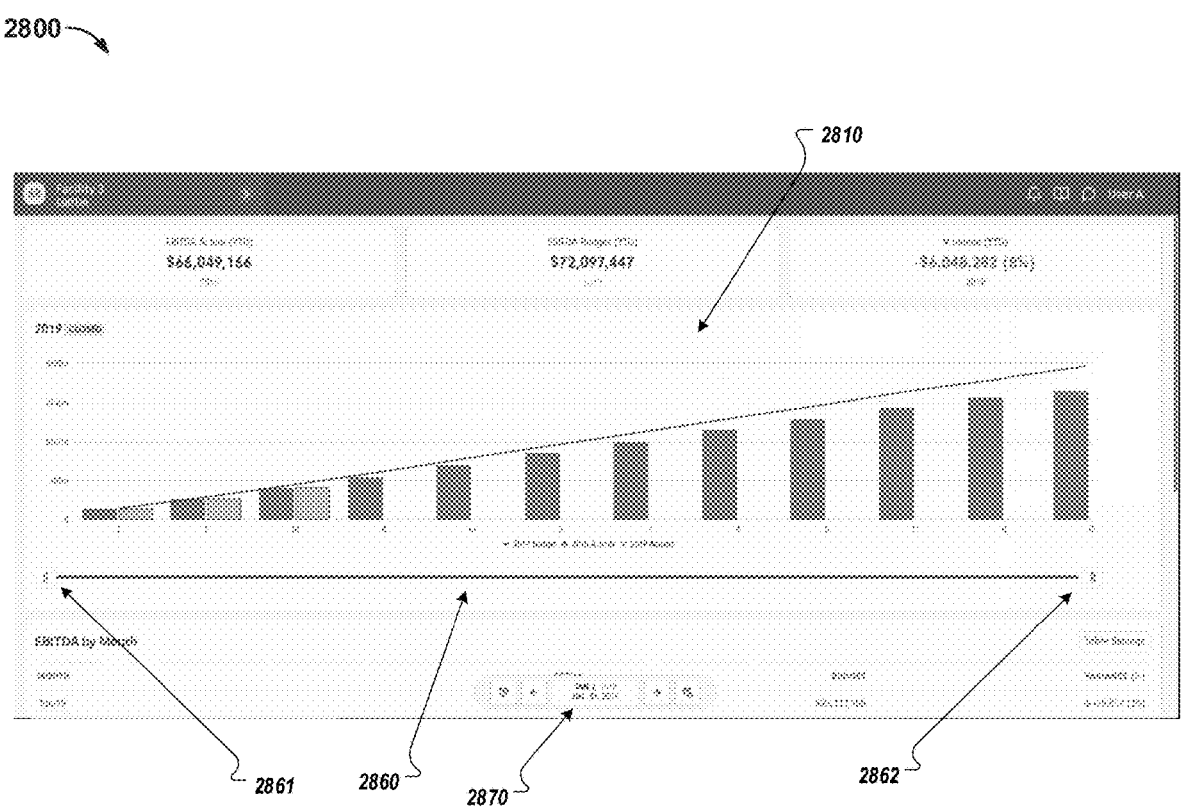
FIG. 28 depicts an example performance user interface that includes an interactive time selector control.

FIG. 28 depicts an example performance user interface 2800 that includes an interactive time selector control 2860. The user interface includes a graph 2810 of a performance metric for a facility. The graph 2810 depicts the value of the performance metric over a time period from Jan. 1, 2019 to Dec. 31, 2019. The graph 2810 also shows the performance information for the previous year, 2018. A user can select this time period using a hovering interactive time selector control 2870, which is similar to the hovering interactive time selector control 2770 of FIG. 27.

A user can interact with the interactive time selector control 2860 to focus on a particular portion of the time period. In particular, the user can select and drag the left control 2861 and/or the right control 2862 to select a portion of the time period for which the graph 2810 presents the performance metric. If the user drags the left control 2861 to the right, the start date for the graph 2810 will move forward in time (e.g, from January $1^{st}$ to February $1^{st}$). If the user drags the left control 2861 to the left, the start date for the graph will move backwards in time (e.g., back from February $1^{st}$ to January $1^{st}$). Similarly, if the user drags the right control 2862 to the left, the end date for the graph 2810 will move backwards in time (e.g, from December $31^{st}$ to November $30^{th}$). If the user drags the right control 2862 to the right, the end date for the graph will move forwards in time (e.g., back from November $30^{th}$ to December $31^{st}$).

The facility data application 154 presenting the user interface 2800 can detect the user interactions and update the graph based on the time period selected by user in response to detecting the user interactions. For example, if the facility data application 154 detects that the left control 2861 has been moved a distance (or to a location under the graph 2810) that corresponds to a particular start date, the facility data application 154 can update graph to present information for a time period that starts at the selected start date.

Figure 29:
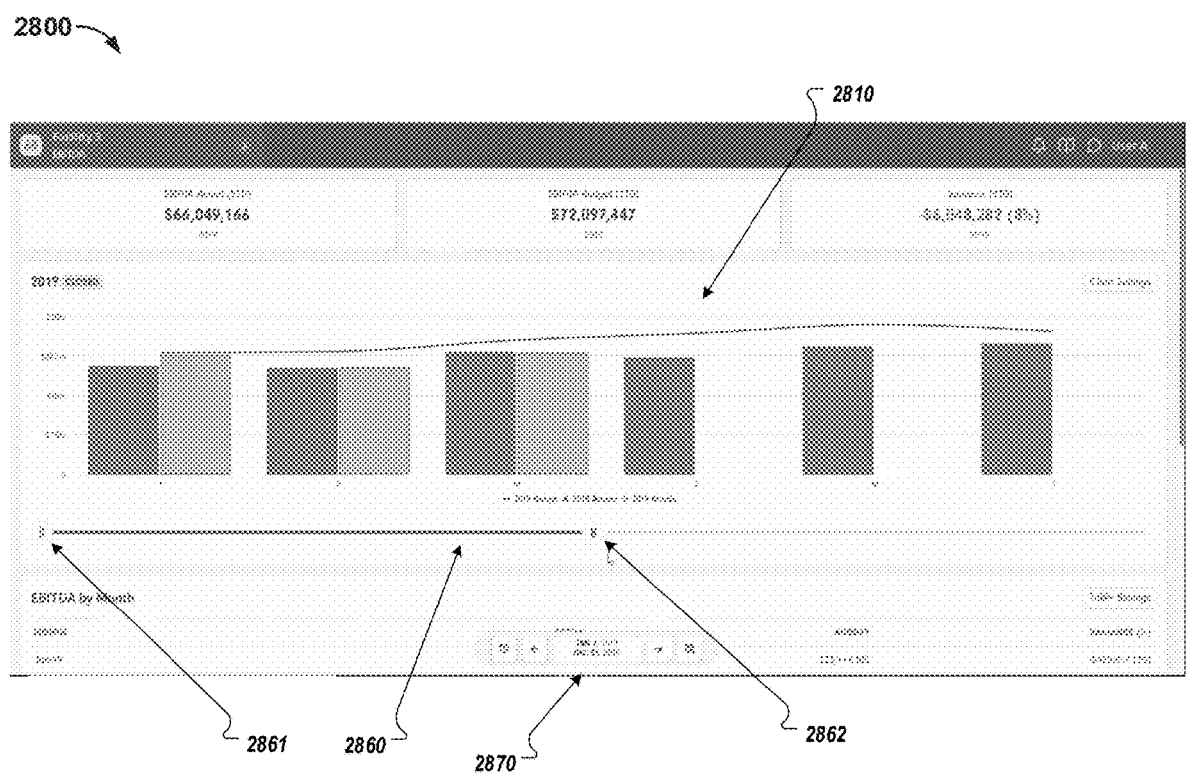
FIG. 29 depicts the performance user interface of FIG. 28 following a user interaction with the time selector control.

FIG. 29 depicts the performance user interface 2800 of FIG. 28 following a user interaction with the interactive time selector control 2860. In particular, the user has moved the right control 2862 to the left and approximately to the middle of the interactive time selector control 2860 and approximately under the middle of the graph 2810. In response, the facility data application 154 has updated the end date for the graph 2810 to June instead of December. Thus the updated graph 2810 presents the performance information for a time period from January, 2019 to June, 2019.

If the user then moved the left control 2861 to the right, the start date can also be changed. For example, if the user moved the left control 2861 to the right about one sixth of the distance to the new location of the right control 2862, the facility data application 154 can update the start date to February, 2019 and the update the graph to present performance information for the time period from February, 2019 to June, 2019. The user can interact with the left control 2861 and right control 2862 to focus the graph 2810 on particular time period.

Figure 30:
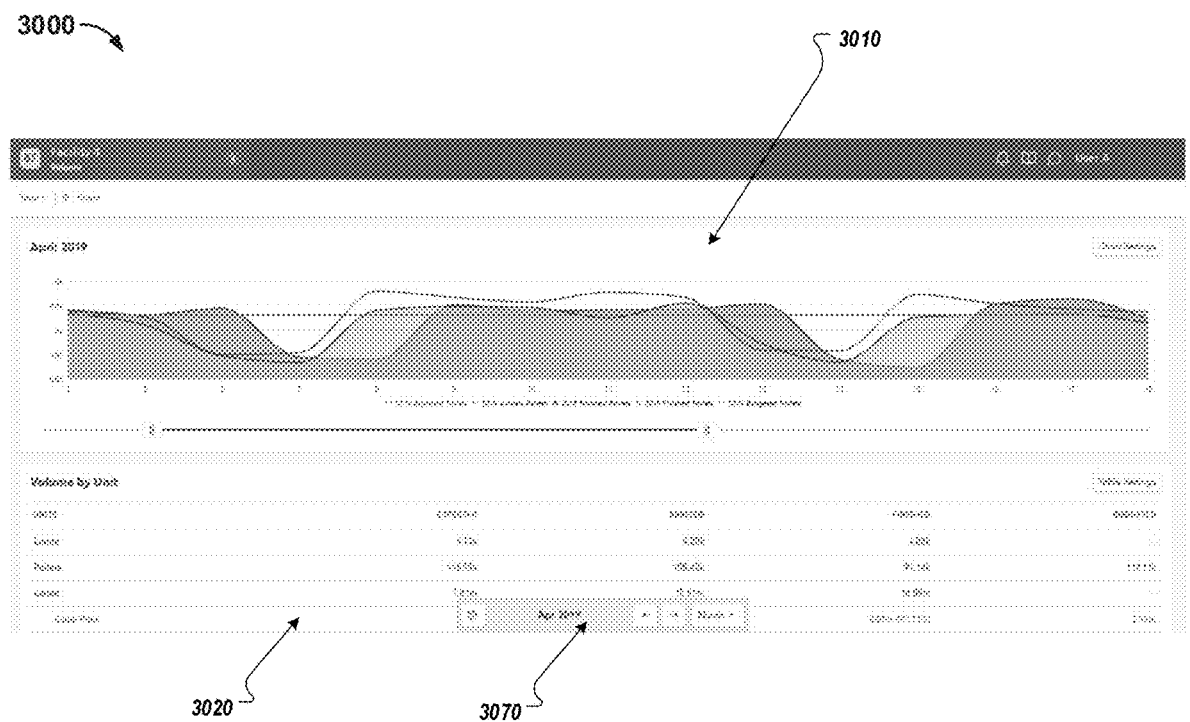
FIG. 30 depicts an example volume user interface that includes a hovering interactive time selector control.

FIG. 30 depicts an example volume user interface 3000 that includes a hovering interactive time selector control 3070. The volume user interface 3000 also includes a graph 3010 and a table 3020. A user can interact with the hovering interactive time selector control 3070 to change the time period for which information is presented in the graph 3010 and the table 3020.

In this example, the hovering interactive time selector control 3070 indicates that the information being presented is for April, 2019. The user can select the right arrow 3072 to view information for the next month (e.g., May, 2019) or the left arrow 3072 to view information for the previous month (e.g., March, 2019). The user can also select the drop down menu 3073 to change the type of time period, e.g., from monthly information to yearly information or weekly information.

The hovering interactive time selector control 3070 can hover over the other content of the user interface 3000 and remain in the same position on the display of the device displaying the user interface 3070, e.g., even if other content of the user interface 3000 is moved. For example, if the user scrolls the table downwards, the hovering interactive time selector control 3070 can remain at the bottom of the user interface 3000 hovering over whatever content is displayed at the bottom of the user interface 3000.

Figure 31:
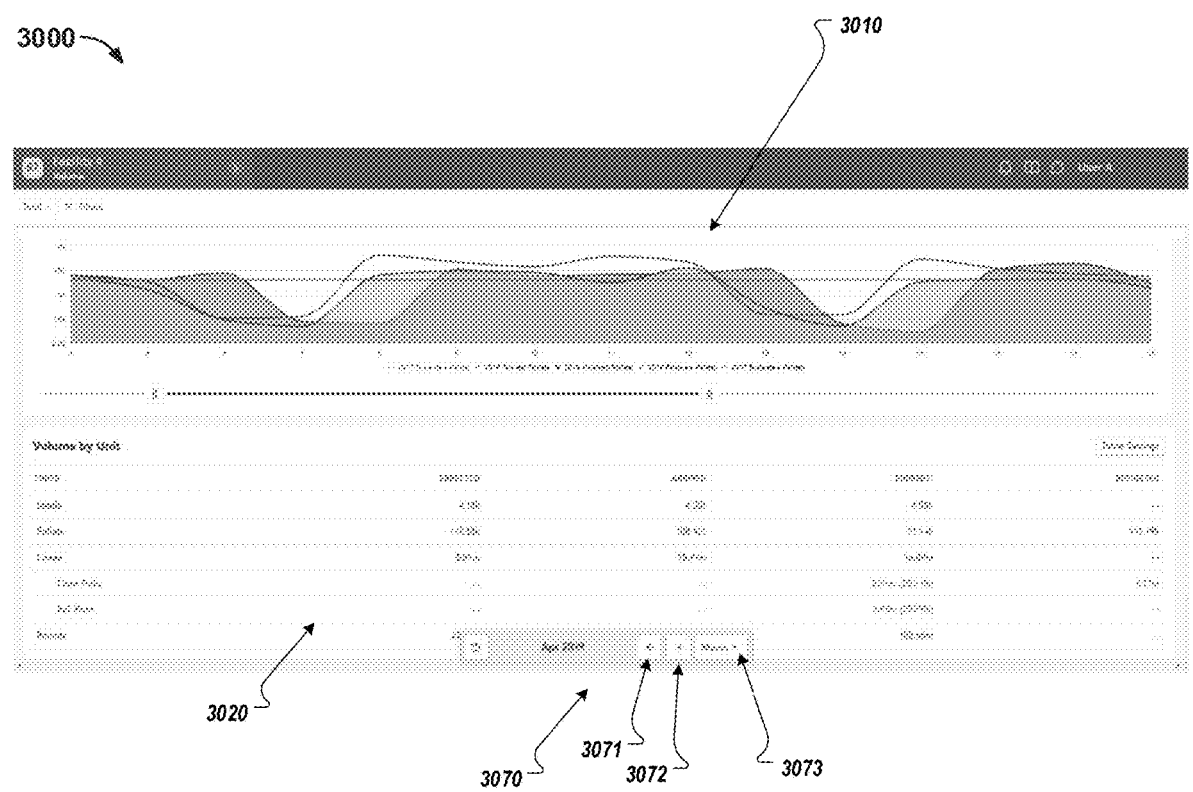
FIG. 31 depicts the volume user interface of FIG. 30 following an update to the volume user interface.

FIG. 31 depicts the volume user interface 3000 of FIG. 30 following an update to the volume user interface 3000. In particular, a user has scrolled the user interface downwards to view additional information in the table 3020. The rows for "Full Picks" and "Pounds" were not presented in FIG. 30. As shown in FIG. 31, the hovering interactive time selector control 3070 remained in the same position at the bottom of the user interface 3000, but is now covering part of the row for "Pounds" rather than part of the row for "Case Picks."

In some implementations, a user can move the hovering interactive time selector control 3070 to other locations in the user interface 3000. For example, a user can select and drag the hovering interactive time selector control 3070 to other locations in the user interface 3000.

Figure 32:
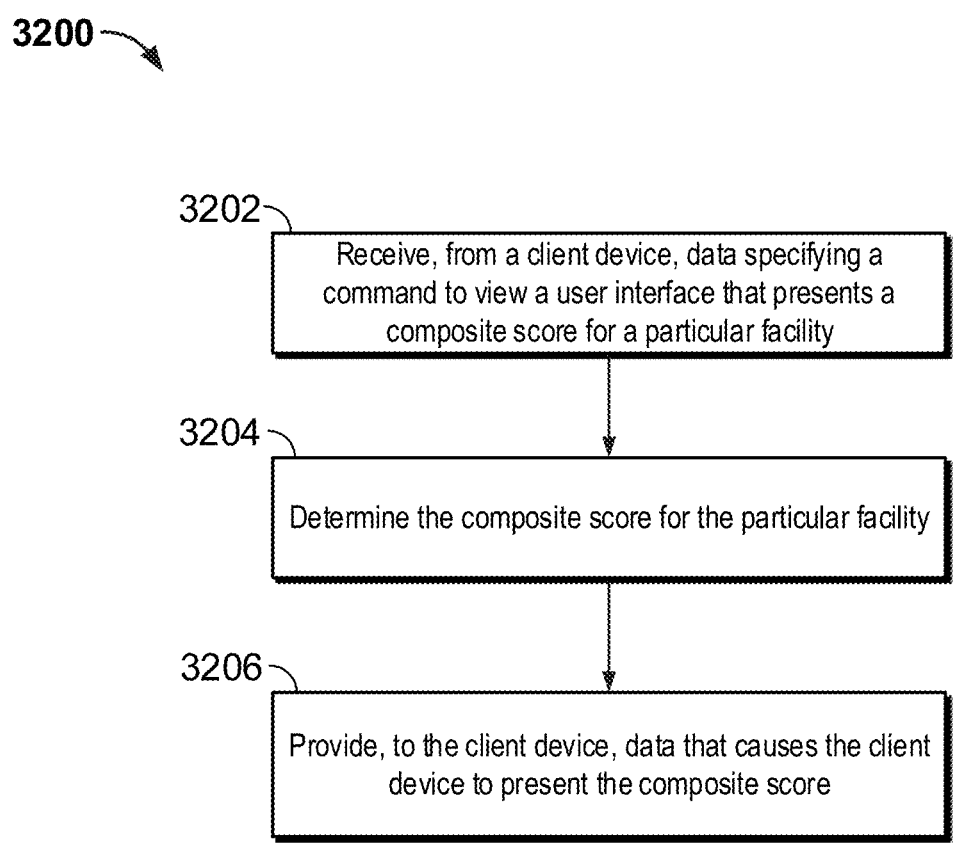
FIG. 32 is a flow diagram of an example process for providing data related to a composite score for a facility for presentation at a client device.

FIG. 32 is a flow diagram of an example process 3200 for providing data related to a composite score for a facility for presentation at a client device. Operations of the process 3200 can be implemented, for example, by a system that includes one or more data processing apparatus, such as the facility data management system 110 of FIG. 1. The process 3200 can also be implemented by instructions stored on a computer storage medium, where execution of the instructions by a system that includes a data processing apparatus cause the data processing apparatus to perform the operations of the process 3200.

The system receives, from a client device, data specifying a command to view a user interface that presents a composite score for a particular facility (3202). For example, the client device can transmit the command in response to a user navigating to a user interface that presents the composite score for the particular facility.

The system determines the composite score for the particular facility (3204). In some implementations, the system predetermines the composite score for each facility and stores the composite scores in a cache. In this way, the system can provide the composite score for presentation with reduced latency.

As described above, the composite score for a facility can be based on a combination of multiple different metrics, which can be based on data obtained from the facility. For example, the composite score for a facility can be based on two or more of an incident rate for the facility, a performance indicator for the facility, a turnover indicator for the facility, a labor indicator for the facility, an overtime indicator for the facility, and/or other appropriate metrics.

The system provides data that causes the client device to present the composite score for the particular facility (3206). In some implementations, the client device presents user interfaces in an application, e.g., a native application. In this example, the system can provide the data that will be presented in the user interface, including the composite score, to the client device. The client device can then generate the user interface with the data and present the user interface to the user.

In some implementations, the client device presents the user interface in a web browser. In this example, the system can generate a web page or portion of a web page that presents the composite score and optionally other data and provide the web page or its portion to the client device for presentation to the user.

Figure 33:
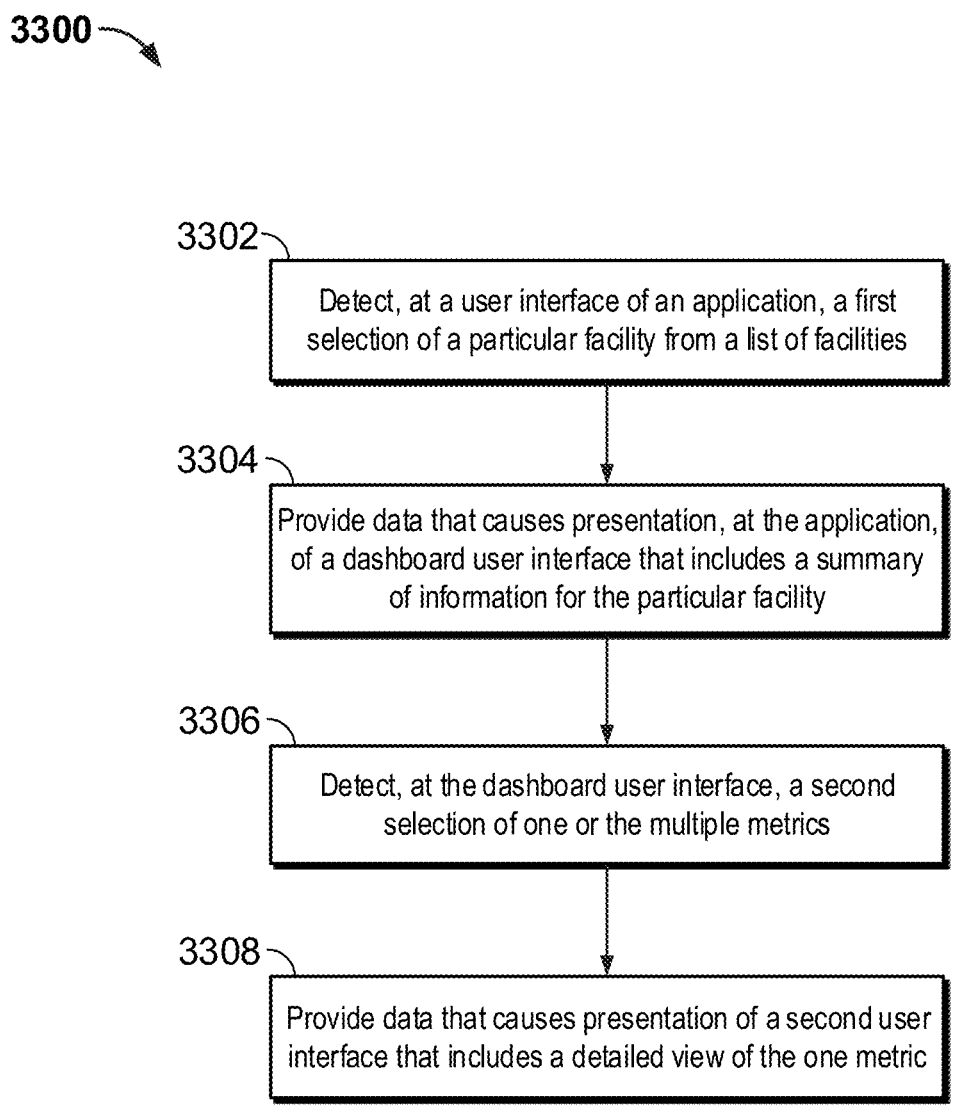
FIG. 33 is a flow diagram of an example process for presenting user interfaces that include metrics for a facility.

FIG. 33 is a flow diagram of an example process 3300 for presenting user interfaces that include metrics for a facility. Operations of the process 3300 can be implemented, for example, by a system that includes one or more data processing apparatus, such as the facility data management system 110 of FIG. 1. The process 3300 can also be implemented by instructions stored on a computer storage medium, where execution of the instructions by a system that includes a data processing apparatus cause the data processing apparatus to perform the operations of the process 3300.

The system detects a first selection of a particular facility from a list of facilities (3302). For example, an application (e.g., the facility data application 154 of FIG. 1) executing on a user device can present, in a user interface, a list of facilities. The list of facilities can include cold storage facilities for which metrics are collected, processed, and presented to users, e.g., using the application.

The system can detect the first selection of the particular facility based on data received from the user device. For example, the application can generate and transmit data identifying the particular facility in response to detecting the selection at the user interface.

The system provides, to the user device, data that causes presentation, at the application, of a dashboard user interface that includes a summary of information for the particular facility (3304). The system can provide the data in response to detecting the first selection. The data provided by the system can include the dashboard user interface. For example, the system can generate and provide the dashboard user interface in response to detecting the first selection. In another example, the data provided by the system can include the summary of information that will be presented in the dashboard user interface. In this example, the application can generate and present the dashboard user interface using the data provided by the system.

The summary of information can include a composite score for the particular facility that is computed based on multiple metrics for the particular facility. The summary of information can also include a value for each of multiple metrics. For example, the dashboard user interface can be the user interface 200 of FIG. 2.

The system detects a second selection of one of the multiple metrics (3306). For example, the user can select one of the metrics at the dashboard user interface. In response, the application can generate and send data specifying the selected metric. The system can detect the second selection of the one metric based on the data received from the user device.

The system provides data that causes presentation of a second user interface that includes a detailed view of the one metric (3308). The system can provide the data in response to detecting the second selection. The data provided by the system can include the second user interface. For example, the system can generate and provide the second user interface in response to detecting the second selection. In another example, the data provided by the system can include the detailed information related to the one metric that will be presented in the dashboard user interface. In this example, the application can generate and present the second user interface using the data provided by the system.

The second user interface can include one of the user interfaces 400-3100 illustrated in FIGS. 4-31. For example, if the user selected the overtime metric from the dashboard user interface, the system can provide data that causes presentation of the user interface 400 of FIG. 4. Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a legend board and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
   detecting, at a computing device, a first selection of a particular facility from a list of facilities presented by a display device;
   presenting, by the computing device on the display device in response to the computing device detecting the first selection of the particular facility, a dashboard user interface that includes a summary of information for the particular facility, including a concurrent presentation of:
   a composite score for the particular facility that is computed based on multiple metrics, including a first metric and a second metric;
   for the first metric that is used in computing the composite score:

(i) a first actual value of the first metric for the particular facility, (ii) a first weight provided to the first metric in computing the composite score, (iii) a first lower range value that identifies a lower bound for the first actual value of the first metric, the first lower range value being a non-zero value, (iv) a first upper range value that identifies an upper bound for the first actual value of the first metric, the first upper range value being a non-zero value, and (v) a first percentage value of the first metric that is computed based on normalizing the first actual value for the first metric between the first lower range value and the first upper range value according to a process that assigns a percentage value of 0% to first actual values below the first lower range value and a percentage value of 100% to first actual values above the first upper range value, the first percentage value being different from the first actual value; and for the second metric that is used in computing the composite score:

(i) a second actual value of the second metric for the particular facility, (ii) a second weight provided to the second metric in computing the composite score, the second weight being different from the first weight, (iii) a second lower range value that identifies a lower bound for the second actual value of the second metric, the second lower range value being different from the first lower range value and being a non-zero value, (iv) a second upper range value that identifies an upper bound for the second actual value of the second metric, the second upper range value being different from the first upper range value and being a non-zero value, and (v) a second percentage value of the second metric that is computed based on normalizing the second actual value between the second lower range value and the second upper range value according to a process that assigns the percentage value of 0% to second actual values below the second lower range value and the percentage value of 100% to second actual values above the second upper range value, the second percentage value being different from the second actual value and the first percentage value;

detecting, at the dashboard user interface and based on data received from the device, a second selection of one metric of the multiple metrics; and presenting, by the computing device on the display device in response to detecting the second selection, a second user interface that includes a detailed view of information of the one metric.

2. The method of claim 1, further comprising:

presenting, by the computing device in the second user interface, a graph of information related to the one metric and an interactive time selector control that enables user input to adjust a time period for the graph by selecting and dragging a first control that represents a start time for the graph and selecting and dragging a second control that represents an end time for the graph;

detecting a new position of the first control or the second control responsive to selecting and dragging of the first control or the second control; and updating the graph to present information related to the one metric for an updated time period that is based on the new position of the first control or the second control.

3. The method of claim 1, further comprising:

presenting, in a particular location on the second user interface, a hovering interactive time selector control;

updating the second user interface to present different content in response to a user interaction to scroll content presented by the second user interface; and maintaining presentation of the hovering interactive time selector control in the particular location, such that the hovering interactive time selector control is positioned over different content of the second user interface based on the scrolling.

4. The method of claim 1, wherein the composite score is based on a combination of two or more of:

an incident rate value that indicates a rate of injuries or sicknesses of workers at the particular facility;

a turnover indicator value that indicates employee turnover for the particular facility;

a labor indicator value that indicates labor cost relative to revenue for the particular facility; or an overtime indicator value that indicates an amount of employee overtime for the particular facility.

5. The method of claim 1, wherein the presentation of the composite score includes populating a user interface element with the composite score for the particular facility and presenting the composite score or a background of the user interface element in a color that is selected among multiple different colors based on a value of the composite score.

6. The method of claim 5, wherein presenting the composite score or the background of the user interface element in the color that is selected among multiple different colors based on the value of the composite score comprises:

comparing the value of the composite score to two or more score ranges that are each assigned a respective color;

determining, based on the comparing, that the value of the composite score is within a particular score range of the two or more score ranges; and in response to determining that the value of the composite score is within the particular score range, selecting the color to match the respective color for the particular score range.

7. The method of claim 1, wherein the concurrent presentation by the dashboard user interface includes a concurrent presentation of:

(i) an incident rate value that indicates a rate of injuries or sicknesses of workers at the particular facility;

(ii) a turnover indicator value that indicates employee turnover for the particular facility;

(iii) a labor indicator value that indicates labor cost relative to revenue for the particular facility; and (iv) an overtime indicator value that indicates an amount of employee overtime for the particular facility.

8. The method of claim 1, wherein the concurrent presentation by the dashboard user interface includes a graph that illustrates changes to the composite score over a period of time.

9. The method of claim 1, wherein:

the first lower range value represents a subpar value for the first actual value of the first metric;

the first upper range value represents a target value for the first actual value of the first metric;

the second lower range value represents a subpar value for the second actual value of the second metric; and the second upper range value represents a target value for the second actual value of the second metric.

10. The method of claim 1, wherein the dashboard user interface further concurrently presents:
a first line representing a span of actual values for the first metric, with the first lower range value presented at a left side of the first line and the first upper range value presented at a right side of the first line; and
a second line representing a span of actual values for the second metric, with the second lower range value presented at a left side of the second line and the second upper range value presented at a right side of the second line.

11. The method of claim 10, wherein the dashboard user interface further concurrently presents:
a first user interface element positioned along the first line at a first location that represents the first actual value of the first metric, the first location being based on where the first actual value falls along the first line between the first lower range value and the first upper range value; and
a second user interface element positioned along the second line at a second location that represents the second actual value of the second metric, the second location being based on where the second actual value falls along the second line between the second lower range value to the second upper range value.

12. The method of claim 11, wherein a first distance between the first lower range value and the first user interface element is different from a second distance between the second lower range value and the second user interface element.

13. The method of claim 11, wherein the dashboard user interface concurrently presents:
the first actual value at the first location at which the first user interface element is positioned along the first line; and
the second actual value at the second location at which the second user interface element is positioned along the second line.

14. A system, comprising:
a data processing apparatus; and a memory storage apparatus in data communication with the data processing apparatus, the memory storage apparatus storing instructions that are executable by the data processing apparatus and that upon such execution cause the data processing apparatus to perform operations comprising:
detecting, at a computing device, a first selection of a particular facility from a list of facilities presented by a display device;
presenting, by the computing device on the display device in response to the computing device detecting the first selection of the particular facility, a dashboard user interface that includes a summary of information for the particular facility, including a concurrent presentation of:
a composite score for the particular facility that is computed based on multiple metrics, including a first metric and a second metric;
for the first metric that is used in computing the composite score:
(i) a first actual value of the first metric for the particular facility,
(ii) a first weight provided to the first metric in computing the composite score,
(iii) a first lower range value that identifies a lower bound for the first actual value of the first metric, the first lower range value being a non-zero value,
(iv) a first upper range value that identifies an upper bound for the first actual value of the first metric, the first upper range value being a non-zero value, and
(v) a first percentage value of the first metric that is computed based on normalizing the first actual value for the first metric between the first lower range value and the first upper range value according to a process that assigns a percentage value of 0% to first actual values below the first lower range value and a percentage value of 100% to first actual values above the first upper range value, the first percentage value being different from the first actual value; and
for the second metric that is used in computing the composite score:
(i) a second actual value of the second metric for the particular facility,
(ii) a second weight provided to the second metric in computing the composite score, the second weight being different from the first weight,
(iii) a second lower range value that identifies a lower bound for the second actual value of the second metric, the second lower range value being different from the first lower range value and being a non-zero value,
(iv) a second upper range value that identifies an upper bound for the second actual value of the second metric, the second upper range value being different from the first upper range value and being a non-zero value, and
(v) a second percentage value of the second metric that is computed based on normalizing the second actual value between the second lower range value and the second upper range value according to a process that assigns the percentage value of 0% to second actual values below the second lower range value and the percentage value of 100% to second actual values above the second upper range value, the second percentage value being different from the second actual value and the first percentage value;
detecting, at the dashboard user interface and based on data received from the device, a second selection of one metric of the multiple metrics; and
presenting, by the computing device on the display device in response to detecting the second selection, a second user interface that includes a detailed view of information of the one metric.

15. The system of claim 14, wherein the composite score is based on a combination of two or more of:
an incident rate value that indicates a rate of injuries or sicknesses of workers at the particular facility;
a turnover indicator value that indicates employee turnover for the particular facility;
a labor indicator value that indicates labor cost relative to revenue for the particular facility; or
an overtime indicator value that indicates an amount of employee overtime for the particular facility.

16. The system of claim 14, wherein the presentation of the composite score includes populating a user interface element with the composite score for the particular facility and presenting the composite score or a background of the user interface element in a color that is selected among multiple different colors based on a value of the composite score.

17. The system of claim 16, wherein presenting the composite score or the background of the user interface element in the color that is selected among multiple different colors based on the value of the composite score comprises:
- comparing the value of the composite score to two or more score ranges that are each assigned a respective color;
- determining, based on the comparing, that the value of the composite score is within a particular score range of the two or more score ranges; and
- in response to determining that the value of the composite score is within the particular score range, selecting the color to match the respective color for the particular score range.

18. The system of claim 14, wherein the concurrent presentation by the dashboard user interface includes a concurrent presentation of:
- (i) an incident rate value that indicates a rate of injuries or sicknesses of workers at the particular facility;
- (ii) a turnover indicator value that indicates employee turnover for the particular facility;
- (iii) a labor indicator value that indicates labor cost relative to revenue for the particular facility; and
- (iv) an overtime indicator value that indicates an amount of employee overtime for the particular facility.

* * * * *